(12) United States Patent
Huang et al.

(10) Patent No.: US 12,197,040 B2
(45) Date of Patent: Jan. 14, 2025

(54) PHOTOGRAPHING LENS SYSTEM, IMAGE CAPTURING UNIT AND ELECTRONIC DEVICE

(71) Applicant: LARGAN PRECISION CO., LTD., Taichung (TW)

(72) Inventors: Hsin-Hsuan Huang, Taichung (TW); Meng-Kuan Cho, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 473 days.

(21) Appl. No.: 17/516,470

(22) Filed: Nov. 1, 2021

(65) Prior Publication Data

US 2022/0404582 A1    Dec. 22, 2022

(30) Foreign Application Priority Data

Jun. 11, 2021    (TW) .................................. 110121545

(51) Int. Cl.
*G02B 9/64* (2006.01)
*G02B 13/00* (2006.01)
*G02B 27/00* (2006.01)

(52) U.S. Cl.
CPC ........... *G02B 9/64* (2013.01); *G02B 13/0045* (2013.01); *G02B 27/0025* (2013.01)

(58) Field of Classification Search
CPC ... G02B 9/64; G02B 13/0045; G02B 27/0025
USPC ....................................................... 359/754
See application file for complete search history.

(56) References Cited

U.S. PATENT DOCUMENTS

| 2017/0045714 | A1 | 2/2017 | Huang |
| 2019/0056568 | A1* | 2/2019 | Huang .................... G02B 9/64 |
| 2020/0132969 | A1 | 4/2020 | Huang |
| 2021/0149158 | A1 | 5/2021 | Hsueh et al. |

(Continued)

FOREIGN PATENT DOCUMENTS

| CN | 105445902 A | 3/2016 |
| CN | 107831588 A | 3/2018 |
| CN | 207164344 U | 3/2018 |

(Continued)

OTHER PUBLICATIONS

IN Examination Report in Application No. 202234001518 Dated Jan. 9, 2023.
TW Office Action in Application No. 110121545 Dated May 3, 2022.

*Primary Examiner* — Wyatt A Stoffa
*Assistant Examiner* — Mitchell T Oestreich
(74) *Attorney, Agent, or Firm* — Maschoff Brennan

(57) ABSTRACT

A photographing lens system includes eight lens elements which are, in order from an object side to an image side along an optical path: a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side. The first lens element has positive refractive power. The second lens element has negative refractive power. The seventh lens element has negative refractive power. The image-side surface of the eighth lens element is concave in a paraxial region thereof, and the image-side surface of the eighth lens element has at least one inflection point.

28 Claims, 28 Drawing Sheets

(56) References Cited

U.S. PATENT DOCUMENTS

2022/0236540 A1   7/2022   Chen et al.

FOREIGN PATENT DOCUMENTS

| | | |
|---|---|---|
| CN | 108363162 A | 8/2018 |
| CN | 108363163 A | 8/2018 |
| CN | 108919464 A | 11/2018 |
| CN | 109375349 A | 2/2019 |
| CN | 110174748 A | 8/2019 |
| CN | 110531500 A | 12/2019 |
| CN | 111045199 A | 4/2020 |
| CN | 111308660 A | 6/2020 |
| CN | 111624738 A | 9/2020 |
| CN | 111722375 A | 9/2020 |
| CN | 111929815 A | 11/2020 |
| CN | 112180540 A | 1/2021 |
| CN | 112394483 A | 2/2021 |
| CN | 112965226 A | 6/2021 |
| CN | 213987001 U | 8/2021 |
| TW | 201932899 A | 8/2019 |
| TW | 201932904 A | 8/2019 |
| TW | 202127092 A | 7/2021 |
| WO | 2020-141466 A1 | 7/2020 |
| WO | 2021184164 A1 | 9/2021 |

\* cited by examiner

PHOTOGRAPHING LENS SYSTEM, IMAGE CAPTURING UNIT AND ELECTRONIC DEVICE

RELATED APPLICATIONS

This application claims priority to Taiwan Application 110121545, filed on Jun. 11, 2021, which is incorporated by reference herein in its entirety.

BACKGROUND

Technical Field

The present disclosure relates to a photographing lens system, an image capturing unit and an electronic device, more particularly to a photographing lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has positive refractive power. The second lens element has negative refractive power. The seventh lens element has negative refractive power. The image-side surface of the eighth lens element is concave in a paraxial region thereof, and the image-side surface of the eighth lens element has at least one inflection point.

When a focal length of the photographing lens system is f, a focal length of the seventh lens element is f7, a focal length of the eighth lens element is f8, an axial distance between the object-side surface of the first lens element and an image surface is TL, a maximum image height of the photographing lens system is ImgH, and a curvature radius of the object-side surface of the sixth lens element is R11, the following conditions are satisfied:

$-0.30 < f/f8 < 5.0;$ $-2.30 < f/f7 < -0.42;$ $0.50 < TL/ImgH < 1.70;$ and $-3.0 < f/R11 < 0.25.$ According to one aspect of the present disclosure, a photographing lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has positive refractive power. The second lens element has negative refractive power. The object-side surface of the fifth lens element is convex in a paraxial region thereof. The seventh lens element has negative refractive power. The eighth lens element has positive refractive power. The object-side surface of the eighth lens element is convex in a paraxial region thereof. The image-side surface of the eighth lens element is concave in a paraxial region thereof, and the image-side surface of the eighth lens element has at least one inflection point.

When a focal length of the photographing lens system is f, a focal length of the seventh lens element is f7, a focal length of the eighth lens element is f8, a curvature radius of the object-side surface of the fifth lens element is R9, a central thickness of the first lens element is CT1, a central thickness of the seventh lens element is CT7, and a central thickness of the eighth lens element is CT8, the following condition is satisfied:

$0 < f/f8 < 5.0;$ $-5.0 < f/f7 < 0;$ $0.35 < R9/f < 2.0;$ and $1.50 < (CT1+CT8)/CT7 < 5.0.$ According to another aspect of the present disclosure, an image capturing unit includes one of the aforementioned photographing lens systems and an image sensor, wherein the image sensor is disposed on the image surface of the photographing lens system.

According to another aspect of the present disclosure, an electronic device includes at least two image capturing units facing the same side, wherein the at least two image capturing units include a first image capturing unit and a second image capturing unit. The first image capturing unit includes one of the aforementioned photographing lens systems and an image sensor that is disposed on the image surface of the photographing lens system. The second image capturing unit includes an optical lens assembly and an image sensor that is disposed on an image surface of the optical lens assembly. A maximum field of view of the first image capturing unit and a maximum field of view of the second image capturing unit differ by at least 30 degrees.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
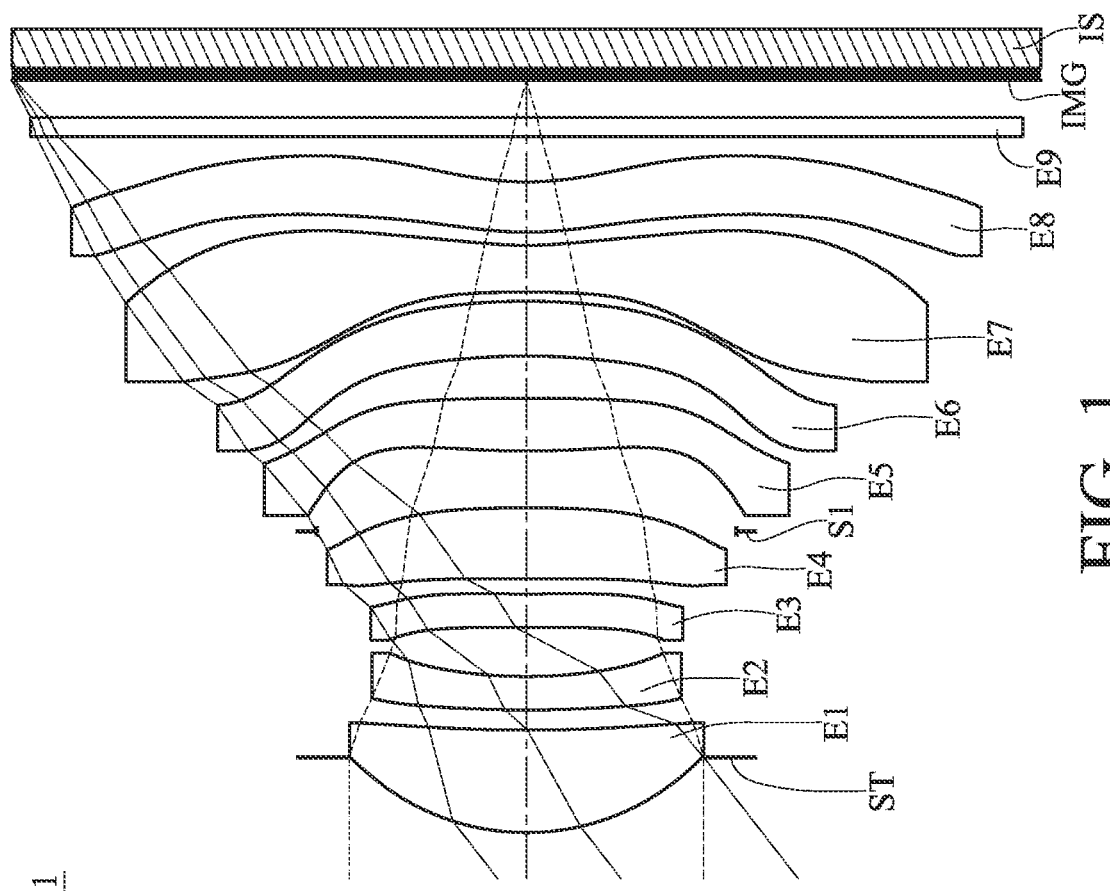
FIG. 1 is a schematic view of an image capturing unit according to the 1st embodiment of the present disclosure.

A photographing lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has positive refractive power. Therefore, it is favorable for providing significant light convergence so as to effectively reduce the size of the photographing lens system, thereby meeting the miniaturization requirement. The object-side surface of the first lens element can be convex in a paraxial region thereof, and the image-side surface of the first lens element can be concave in a paraxial region thereof. Therefore, it is favorable for correcting astigmatism.

The second lens element has negative refractive power. Therefore, it is favorable for correcting aberrations of the photographing lens system. The object-side surface of the second lens element can be convex in a paraxial region thereof, and the image-side surface of the second lens element can be concave in a paraxial region thereof. Therefore, it is favorable for correcting aberrations generated by the first lens element.

The object-side surface of the third lens element can be convex in a paraxial region thereof, and the image-side surface of the third lens element can be concave in a paraxial region thereof. Therefore, it is favorable for controlling light rays in both tangential and sagittal directions so as to correct astigmatism of the photographing lens system.

The fifth lens element can have positive refractive power. Therefore, it is favorable for effectively distributing light convergence so as to correct aberrations. The object-side surface of the fifth lens element can be convex in a paraxial region thereof. Therefore, it is favorable for obtaining a proper configuration in the lens shape of the object-side surface of the fifth lens element so as to better control aberrations.

The seventh lens element has negative refractive power. Therefore, it is favorable for obtaining a balanced configuration between the seventh and the second lens elements so as to correct aberrations. The image-side surface of the seventh lens element can be concave in a paraxial region thereof, and the image-side surface of the seventh lens element can have at least one convex shape in an off-axis region thereof. Therefore, it is favorable for ensuring good image quality at the image periphery while capturing images at different object distances.

The eighth lens element can have positive refractive power. Therefore, it is favorable for enhancing the symmetry of the photographing lens system so as to improve image quality. The image-side surface of the eighth lens element is concave in a paraxial region thereof. Therefore, it is favorable for reducing the back focal length and the size of the photographing lens system. The object-side surface of the eighth lens element can be convex in a paraxial region thereof, and the image-side surface of the eighth lens element is concave in a paraxial region thereof. Therefore, it is favorable for correcting aberrations at the image side of the photographing lens system so as to reduce distortion and field curvature.

Figure 25:
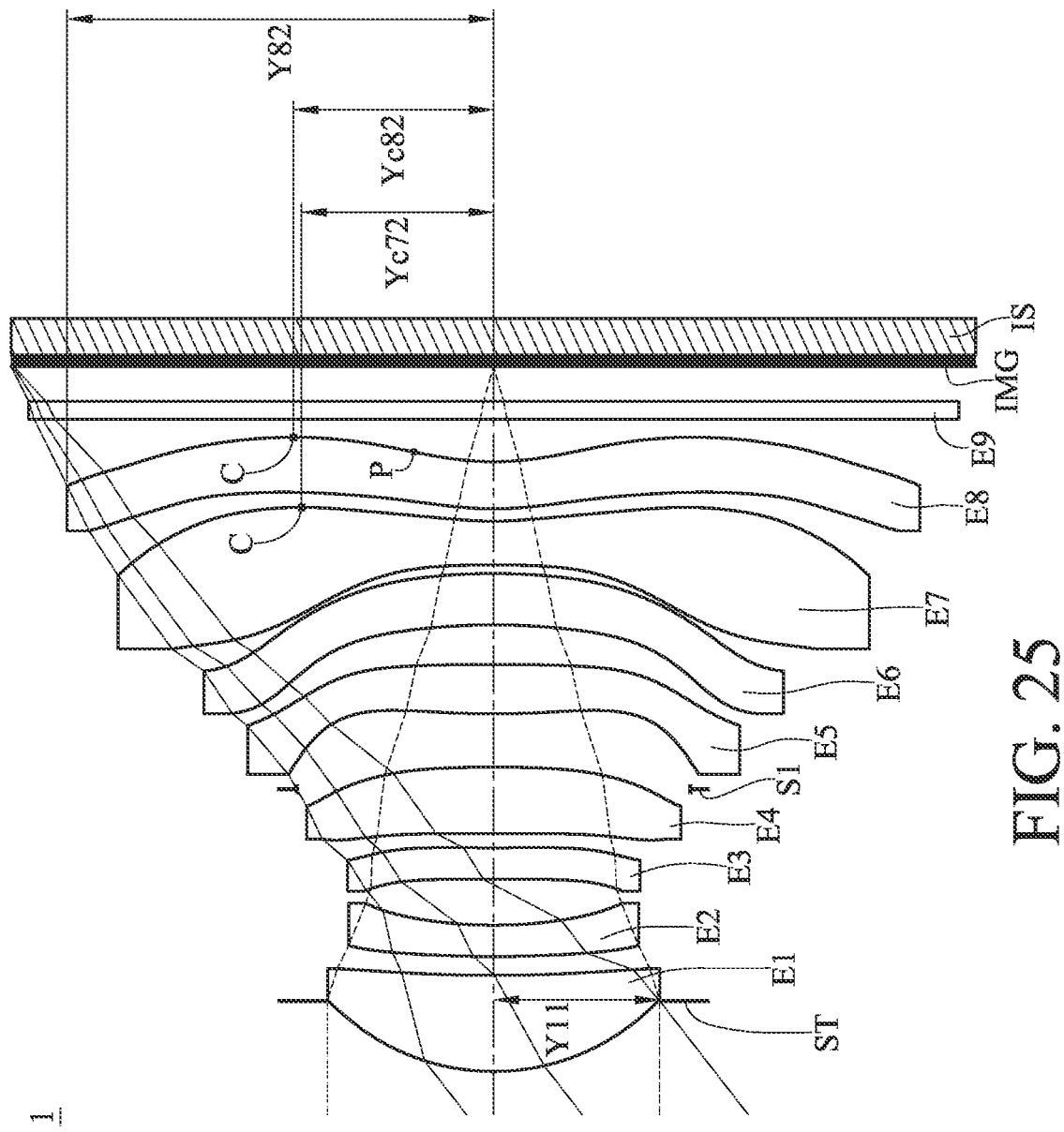
FIG. 25 shows a schematic view of Y11, Y82, Yc72, Yc82 and several inflection points and critical points of lens elements according to the 1st embodiment of the present disclosure.

The image-side surface of the eighth lens element has at least one inflection point. Therefore, it is favorable for reducing the angle between light rays and the lens surface so as to prevent total reflection. Please refer to FIG. 25, which shows a schematic view of an inflection point P on the image-side surface of the eighth lens element E8 according to the 1st embodiment of the present disclosure. The inflection point on the image-side surface of the eighth lens element in FIG. 25 is only exemplary. The other lens surfaces may also have one or more inflection points.

The image-side surface of the eighth lens element can have at least one critical point in an off-axis region thereof. Therefore, it is favorable for effectively controlling field curvature and relative illuminance. Please refer to FIG. 25, which shows a schematic view of a critical point C on the image-side surface of the eighth lens element E8 according to the 1st embodiment of the present disclosure.

According to the present disclosure, at least four lens elements of the photographing lens system can be made of plastic material. Therefore, it is favorable for effectively increasing design flexibility so as to correct off-axis aberrations while reducing manufacturing costs.

When a focal length of the photographing lens system is f, and a focal length of the eighth lens element is f8, the following condition is satisfied: $-0.30<f/f8<5.0$. Therefore, it is favorable for balancing the refractive power of the eighth lens element so as to correct aberrations. Moreover, the following condition can also be satisfied: $-0.10<f/f8<5.0$. Moreover, the following condition can also be satisfied: $0<f/f8<5.0$. Moreover, the following condition can also be satisfied: $0<f/f8<2.0$. Moreover, the following condition can also be satisfied: $0<f/f8<1.0$.

When the focal length of the photographing lens system is f, and a focal length of the seventh lens element is f7, the following condition is satisfied: $-5.0<f/f7<0$. Therefore, it is favorable for reducing the back focal length so as to control the total track length of the photographing lens system. Moreover, the following condition can also be satisfied: $-2.30<f/f7<-0.42$. Moreover, the following condition can also be satisfied: $-2.30<f/f7<-0.75$.

When an axial distance between the object-side surface of the first lens element and an image surface is TL, and a maximum image height of the photographing lens system (which can be half of a diagonal length of an effective photosensitive area of an image sensor) is ImgH, the following condition can be satisfied: $0.50<TL/ImgH<1.70$. Therefore, it is favorable for ensuring a sufficiently large light receiving area while reducing the total track length of the photographing lens system so as to prevent vignetting at the image periphery. Moreover, the following condition can also be satisfied: $0.70<TL/ImgH<1.50$.

When the focal length of the photographing lens system is f, and a curvature radius of the object-side surface of the sixth lens element is R11, the following condition can be satisfied: $-3.0<f/R11<0.25$. Therefore, it is favorable for effectively controlling the curvature radius of the object-side surface of the sixth lens element in a proper range so as to prevent excessive aberrations. Moreover, the following condition can also be satisfied: $-1.80<f/R11<0.10$. Moreover, the following condition can also be satisfied: $-1.80<f/R11<0$.

When a curvature radius of the object-side surface of the fifth lens element is R9, and the focal length of the photographing lens system is f, the following condition can be satisfied: $0.35<R9/f<2.0$. Therefore, it is favorable for ensuring the object-side surface of the fifth lens element to have proper characteristics in a convex shape so as to provide a proper refraction in light path. Moreover, the following condition can also be satisfied: $0.45<R9/f<1.50$.

When a central thickness of the first lens element is CT1, a central thickness of the seventh lens element is CT7, and a central thickness of the eighth lens element is CT8, the following condition can be satisfied: $1.50<(CT1+CT8)/CT7<5.0$. Therefore, it is favorable for balancing the space configuration of the photographing lens system so as to ensure proper thicknesses of lens elements at the object side and the image side thereof.

When a minimum value among Abbe numbers of all lens elements of the photographing lens system is Vmin, the following condition can be satisfied: $5.0<Vmin<21.0$. Therefore, it is favorable for controlling the light path of the photographing lens system and balancing light convergence at different wavelengths so as to correct chromatic aberration. Moreover, the following condition can also be satisfied: $5.0<Vmin<20.0$.

When a maximum value among refractive indices of all lens elements of the photographing lens system is Nmax, the following condition can be satisfied: $1.50<Nmax<1.80$. Therefore, it is favorable for reducing difficulty in manufacturing lens elements so as to increase the feasibility in lens commercialization. Moreover, the following condition can also be satisfied: $1.60<Nmax<1.75$. Moreover, the following condition can also be satisfied: $1.65<Nmax<1.72$. Moreover, the following condition can also be satisfied: $1.68 \leq Nmax<1.72$.

When the focal length of the photographing lens system is f, and the maximum image height of the photographing lens system is ImgH, the following condition can be satisfied: $0.50<f/ImgH<1.50$. Therefore, it is favorable for ensuring a sufficient image capturing range so as to meet the specification.

When the curvature radius of the object-side surface of the fifth lens element is R9, and a curvature radius of the image-side surface of the fifth lens element is R10, the following condition can be satisfied: $-2.0<(R9-R10)/(R9+R10)<0$. Therefore, it is favorable for effectively controlling the lens shapes of the fifth lens element so as to ensure sufficient aberration corrections at the object side of the fifth lens element.

When a curvature radius of the image-side surface of the seventh lens element is R14, and a curvature radius of the object-side surface of the eighth lens element is R15, the following condition can be satisfied: $-0.50<(R14-R15)/(R14+R15)<0.40$. Therefore, it is favorable for configuring adjacent lens surfaces in paraxial regions of the seventh and eighth lens elements so as to correct aberrations at the image periphery.

When a maximum effective radius of the object-side surface of the first lens element is Y11, and a maximum effective radius of the image-side surface of the eighth lens element is Y82, the following condition can be satisfied: $0.10<Y11/Y82<0.55$. Therefore, it is favorable for controlling the ratio of effective radii between the object side and the image side of the photographing lens system so as to prevent poor aesthetics due to an overly large opening. Please refer to FIG. 25, which shows a schematic view of Y11 and Y82 according to the 1st embodiment of the present disclosure.

When the focal length of the photographing lens system is f, and an entrance pupil diameter of the photographing lens system is EPD, the following condition can be satisfied: $0.80<f/EPD<2.0$. Therefore, it is favorable for effectively controlling the aperture and the amount of incident light of the photographing lens system so as to increase image brightness. Moreover, the following condition can also be satisfied: $0.80<f/EPD<1.85$.

When the axial distance between the object-side surface of the first lens element and the image surface is TL, and the focal length of the photographing lens system is f, the following condition can be satisfied: $0.90<TL/f<1.30$.

Therefore, it is favorable for balancing the total track length and the field of view of the photographing lens system so as to meet various application requirements.

When an Abbe number of the fifth lens element is V5, the following condition can be satisfied: 10.0<V5<50.0. Therefore, it is favorable for having stronger control on light path of the fifth lens element so as to correct aberrations of the photographing lens system.

When a focal length of the first lens element is f1, and the focal length of the eighth lens element is f8, the following condition can be satisfied: −0.05<f1/f8<0.55. Therefore, it is favorable for balancing refractive power between the object side and the image side so as to reduce the size of the photographing lens system, thereby controlling the total track length thereof. Moreover, the following condition can also be satisfied: 0<f1/f8<0.45.

When the curvature radius of the object-side surface of the eighth lens element is R15, and a curvature radius of the image-side surface of the eighth lens element is R16, the following condition can be satisfied: −0.30<(R15−R16)/(R15+R16)<0.50. Therefore, it is favorable for configuring the eighth lens element as a correction lens while preventing overly large curvatures of the lens surfaces so as to correct aberrations from adjacent lens elements thereof. Moreover, the following condition can also be satisfied: −0.10<(R15−R16)/(R15+R16)<0.20.

When the focal length of the photographing lens system is f, the curvature radius of the image-side surface of the seventh lens element is R14, and the curvature radius of the image-side surface of the eighth lens element is R16, the following condition can be satisfied: 2.7<f/R14+f/R16<9.0. Therefore, it is favorable for controlling the image-side surfaces of lens elements at the image side of the photographing lens system so as to control the back focal length, thereby maintaining miniaturization thereof. Moreover, the following condition can also be satisfied: 3.0<f/R14+f/R16<7.0.

When the focal length of the photographing lens system is f, the focal length of the first lens element is f1, a focal length of the second lens element is f2, a focal length of the third lens element is f3, a focal length of the fourth lens element is f4, a focal length of the fifth lens element is f5, a focal length of the sixth lens element is f6, the focal length of the seventh lens element is f7, the focal length of the eighth lens element is f8, a focal length of the i-th lens element is fi, and a maximum value of |f/fi| is |f/fi|max, the following condition can be satisfied: |f/fi|max<1.90, wherein i=1, 2, 3, 4, 5, 6, 7 or 8. Therefore, it is favorable for providing proper refractive power of the photographing lens system so as to prevent excessive aberrations due to overly large refractive power of one lens element. Moreover, the following condition can also be satisfied: 0.30<|f/fi|max<1.60, wherein i=1, 2, 3, 4, 5, 6, 7 or 8.

When an Abbe number of the second lens element is V2, and an Abbe number of the third lens element is V3, the following condition can be satisfied: 10.0<V2+V3<76.0. Therefore, it is favorable for correcting chromatic aberration of the second and third lens elements so as to prevent image shift due to light at different wavelengths. Moreover, the following condition can also be satisfied: 10.0<V2+V3<65.0. Moreover, the following condition can also be satisfied: 10.0<V2+V3<55.0.

When the curvature radius of the image-side surface of the eighth lens element is R16, and the focal length of the photographing lens system is f, the following condition can be satisfied: 0<R16/f<0.50. Therefore, it is favorable for correcting field curvature so as to flatten Petzval surface and miniaturize the photographing lens system.

When the maximum image height of the photographing lens system is ImgH, and an axial distance between the image-side surface of the eighth lens element and the image surface is BL, the following condition can be satisfied: 3.50<ImgH/BL<10.0. Therefore, it is favorable for reducing the back focal length while having a large light receiving area. Moreover, the following condition can also be satisfied: 4.0<ImgH/BL<9.0. Moreover, the following condition can also be satisfied: 4.50<ImgH/BL<8.0.

When a curvature radius of the object-side surface of the fourth lens element is R7, and a curvature radius of the image-side surface of the fourth lens element is R8, the following condition can be satisfied: −0.80<(R7+R8)/(R7−R8)<10.0. Therefore, it is favorable for controlling the lens shape of the fourth lens element so as to better control light path at the image side of the fourth lens element. Moreover, the following condition can also be satisfied: −0.30<(R7+R8)/(R7−R8)<6.0. Moreover, the following condition can also be satisfied: −0.20<(R7+R8)/(R7−R8)<2.80.

When a maximum value among central thicknesses of all lens elements of the photographing lens system is CTmax, and the maximum image height of the photographing lens system is ImgH, the following condition can be satisfied: 0.05<CTmax/ImgH<0.50. Therefore, it is favorable for effectively balancing lens thicknesses of the photographing lens system so as to prevent poor lens molding due to overly large lens thicknesses. Moreover, the following condition can also be satisfied: 0.10<CTmax/ImgH<0.30.

When a maximum value among axial distances between each of all adjacent lens elements of the photographing lens system is ATmax, and the maximum image height of the photographing lens system is ImgH, the following condition can be satisfied: 0.01<ATmax/ImgH<0.30. Therefore, it is favorable for improving space utilization of the photographing lens system so as to prevent interference between lens elements due to an overly small distance therebetween or to prevent bad portability of the overall device due to an overly large distance between lens elements. Moreover, the following condition can also be satisfied: 0.01<ATmax/ImgH<0.20.

When an Abbe number of the first lens element is V1, the Abbe number of the second lens element is V2, the Abbe number of the third lens element is V3, an Abbe number of the fourth lens element is V4, the Abbe number of the fifth lens element is V5, an Abbe number of the sixth lens element is V6, an Abbe number of the seventh lens element is V7, an Abbe number of the eighth lens element is V8, and an Abbe number of the i-th lens element is Vi, at least four lens elements of the photographing lens system can satisfy the following condition: Vi<50.0, wherein i=1, 2, 3, 4, 5, 6, 7 or 8. Therefore, it is favorable for ensuring sufficient light control from proper lens materials of the photographing lens system so as to balance focus positions of different wavelengths, thereby avoiding image overlaps.

When half of a maximum field of view of the photographing lens system is HFOV, the following condition can be satisfied: 30.0 [deg.]<HFOV<80.0 [deg.]. Therefore, it is favorable for having a sufficient field of view of the photographing lens system so as to meet various usage requirements. Moreover, the following condition can also be satisfied: 35.0 [deg.]<HFOV<70.0 [deg.].

According to the present disclosure, the photographing lens system can further include an aperture stop. When an axial distance between the aperture stop and the image-side surface of the eighth lens element is SD, and an axial distance between the object-side surface of the first lens element and the image-side surface of the eighth lens element is TD, the following condition can be satisfied: $0.60<SD/TD<1.10$. Therefore, it is favorable for allocating the aperture stop at a proper position so as to control the size of the photographing lens system. Moreover, the following condition can also be satisfied: $0.70<SD/TD<1.0$. Moreover, the following condition can also be satisfied: $0.80<SD/TD<1.0$.

When the maximum image height of the photographing lens system is ImgH, the following condition can be satisfied: $5.0$ [mm]$<$ImgH$<10.0$ [mm]. Therefore, it is favorable for controlling the light receiving area so as to ensure image brightness and meet specification requirements. Moreover, the following condition can also be satisfied: $5.50$ [mm]$<$ImgH$<9.0$ [mm].

When the axial distance between the object-side surface of the first lens element and the image surface is TL, the following condition can be satisfied: $4.0$ [mm]$<$TL$<15.0$ [mm]. Therefore, it is favorable for miniaturizing the photographing lens system so as to reduce the size of the overall electronic device, thereby expanding product applications and satisfying market demands. Moreover, the following condition can also be satisfied: $5.0$ [mm]$<$TL$<12.0$ [mm]. Moreover, the following condition can also be satisfied: $6.0$ [mm]$<$TL$<10.0$ [mm].

When a vertical distance between a critical point on the image-side surface of the seventh lens element and an optical axis is Yc72, and a vertical distance between a critical point on the image-side surface of the eighth lens element and the optical axis is Yc82, the following condition can be satisfied: $0.30<Yc72/Yc82<5.0$. Therefore, it is favorable for increasing the effective radius of the seventh lens element and correct the image periphery so as to maintain good image quality at different object distances. Moreover, the following condition can also be satisfied: $0.50<Yc72/Yc82<3.0$. Moreover, the following condition can also be satisfied: $0.70<Yc72/Yc82<2.0$. Please refer to FIG. 25, which shows a schematic view of Yc72, Yc82 and critical points C on the image-side surface of the seventh lens element E7 and the image-side surface of the eighth lens element E8 according to the 1st embodiment of the present disclosure. The critical points on the image-side surface of the seventh lens element and the image-side surface of the eighth lens element in FIG. 25 are only exemplary. The other lens surfaces may also have one or more critical points.

When the Abbe number of the fifth lens element is V5, and the Abbe number of the eighth lens element is V8, the following condition can be satisfied: $0.20<V5/V8\leq1.20$. Therefore, it is favorable for obtaining a balanced material configuration between the fifth and eighth lens elements so as to correct chromatic aberration. Moreover, the following condition can also be satisfied: $0.30<V5/V8\leq1.0$. Moreover, the following condition can also be satisfied: $0.30<V5/V8<0.95$.

According to the present disclosure, the aforementioned features and conditions can be utilized in numerous combinations so as to achieve corresponding effects.

According to the present disclosure, the lens elements of the photographing lens system can be made of either glass or plastic material. When the lens elements are made of glass material, the refractive power distribution of the photographing lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element designs allow more control variables for eliminating aberrations thereof and reducing the required number of lens elements, and the total track length of the photographing lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing lens system, based on the corresponding image sensor, can be flat or curved, especially a curved surface being concave facing towards the object side of the photographing lens system.

According to the present disclosure, an image correction unit, such as a field flattener, can be optionally disposed between the lens element closest to the image side of the photographing lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 26:
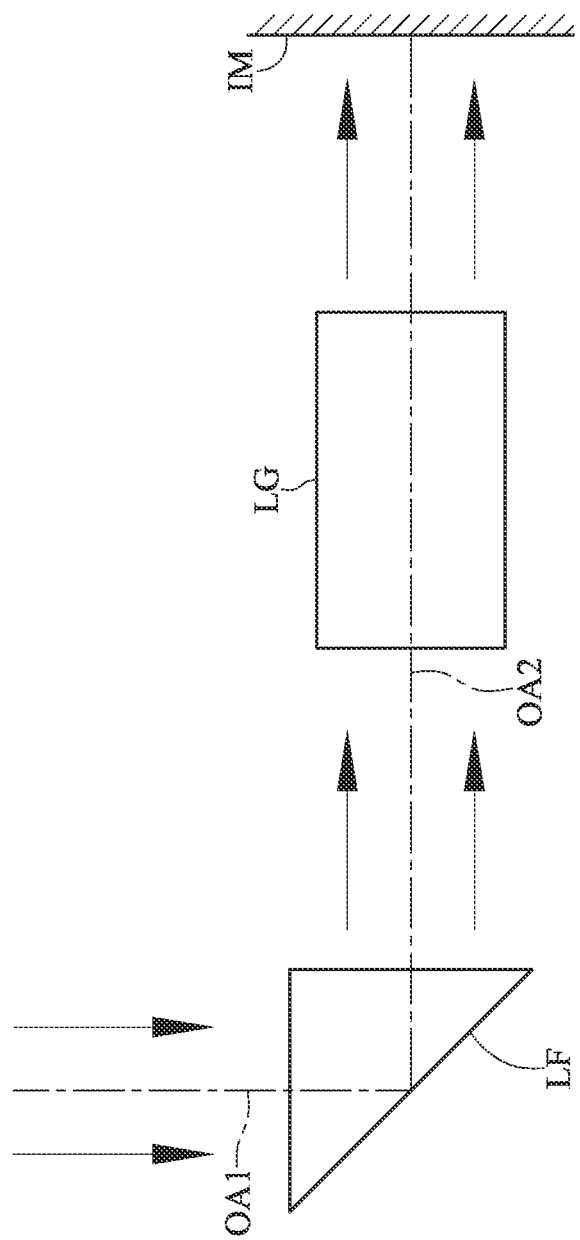
FIG. 26 shows a schematic view of a configuration of a light-folding element in a photographing lens system according to one embodiment of the present disclosure.
Figure 27:
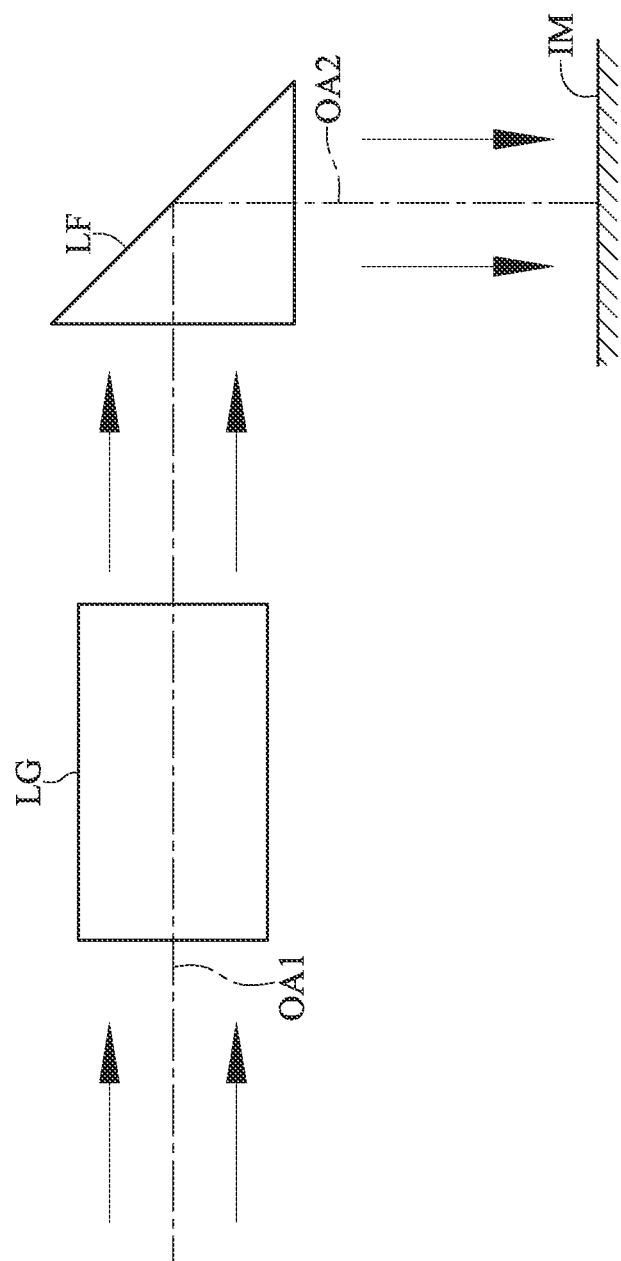
FIG. 27 shows a schematic view of another configuration of a light-folding element in a photographing lens system according to one embodiment of the present disclosure.
Figure 28:
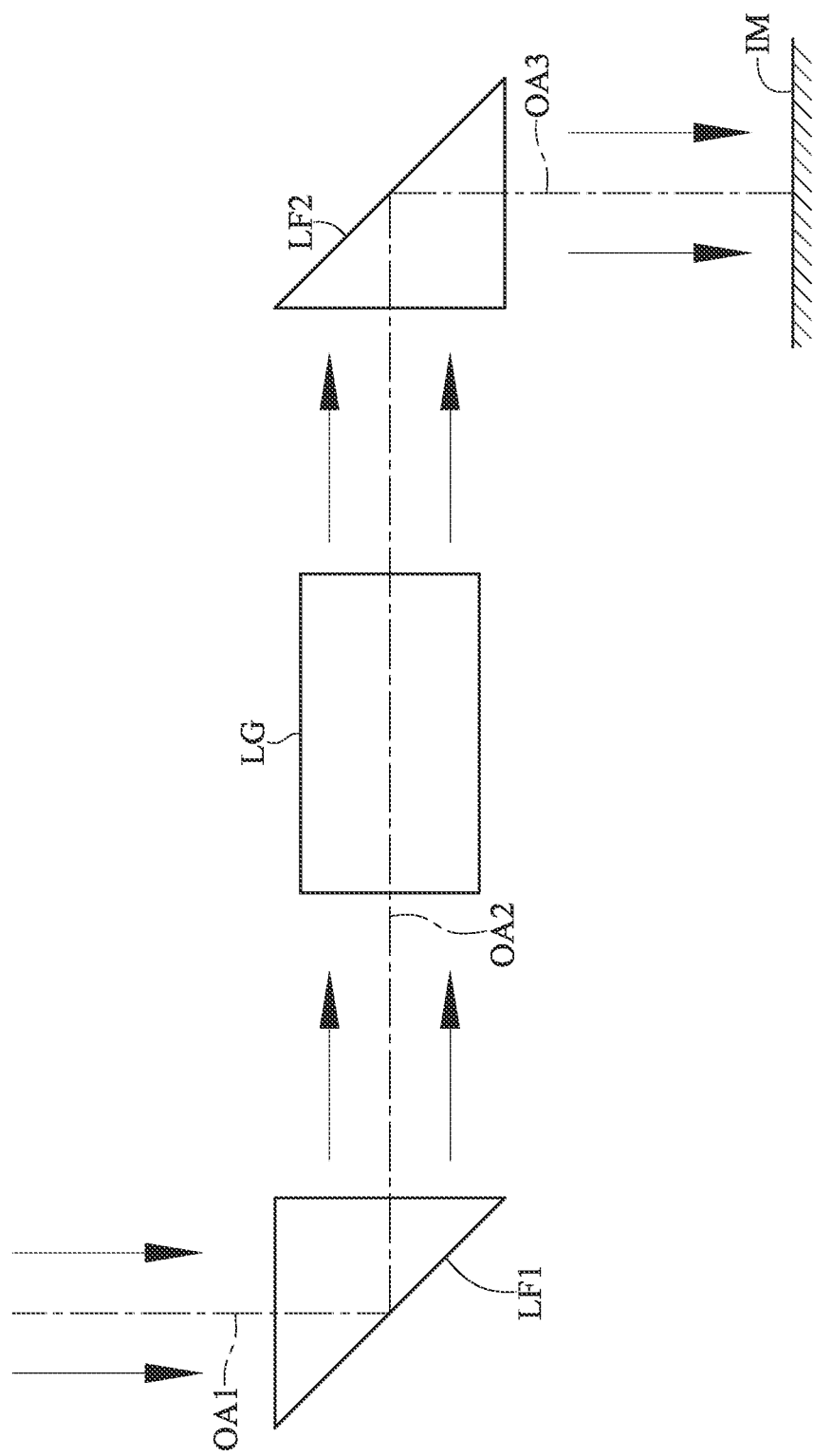
FIG. 28 shows a schematic view of a configuration of two light-folding elements in a photographing lens system according to one embodiment of the present disclosure.

According to the present disclosure, at least one light-folding element, such as a prism or a mirror, can be optionally disposed between an imaged object and the image surface on the imaging optical path, such that the photographing lens system can be more flexible in space arrangement, and therefore the dimensions of an electronic device is not restricted by the total track length of the photographing lens system. Specifically, please refer to FIG. 26 and FIG. 27. FIG. 26 shows a schematic view of a configuration of a light-folding element in a photographing lens system according to one embodiment of the present disclosure, and FIG. 27 shows a schematic view of another configuration of a light-folding element in a photographing lens system according to one embodiment of the present disclosure. In FIG. 26 and FIG. 27, the photographing lens system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the photographing lens system as shown in FIG. 26 or disposed between a lens group LG of the photographing lens system and the image surface IM as shown in FIG. 27. Furthermore, please refer to FIG. 28, which shows a schematic view of a configuration of two light-folding elements in a photographing lens system according to one embodiment of the present disclosure. In FIG. 28, the photographing lens system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the photographing lens system, the second light-folding element LF2 is disposed between the lens group LG of the photographing lens system and the image surface IM, and the travelling direction of light on the first optical axis OA1 can be the same direction as the travelling direction of light on the third optical axis OA3 as shown in FIG. 28. The photographing lens system can be optionally provided with three or more light-folding elements, and the present disclosure is not limited to the type, amount and position of the light-folding elements of the embodiments disclosed in the aforementioned figures.

According to the present disclosure, the photographing lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing lens system and thereby provides a wider field of view for the same.

According to the present disclosure, the photographing lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
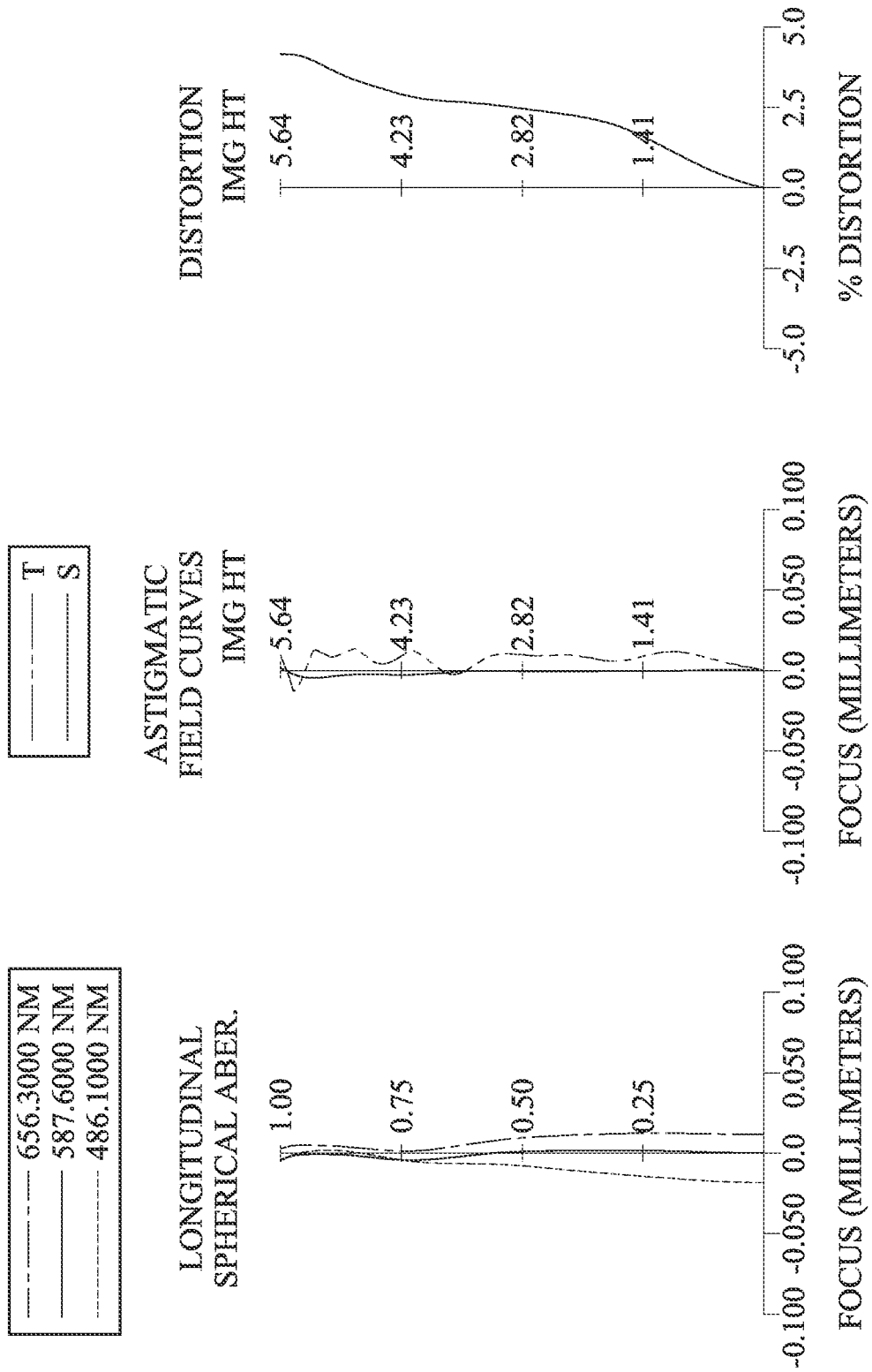
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the photographing lens system (its reference numeral is omitted) of the present disclosure and an image sensor IS. The photographing lens system includes, in order from an object side to an image side along an optical axis, an aperture stop ST, a first lens element E1, a second lens element E2, a third lens element E3, a fourth lens element E4, a stop S1, a fifth lens element E5, a sixth lens element E6, a seventh lens element E7, an eighth lens element E8, a filter E9 and an image surface IMG. The photographing lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one convex shape in an off-axis region thereof. The image-side surface of the seventh lens element E7 has at least one critical point in the off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The image-side surface of the eighth lens element E8 has at least one inflection point. The image-side surface of the eighth lens element E8 has at least one critical point in an off-axis region thereof.

The filter E9 is made of glass material and located between the eighth lens element E8 and the image surface IMG, and will not affect the focal length of the photographing lens system. The image sensor IS is disposed on or near the image surface IMG of the photographing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24 and 26.

In the photographing lens system of the image capturing unit according to the 1st embodiment, when a focal length of the photographing lens system is f, an f-number of the photographing lens system is Fno, and half of a maximum field of view of the photographing lens system is HFOV, these parameters have the following values: f=6.96 millimeters (mm), Fno=1.78, HFOV=37.9 degrees (deg.).

When a maximum value among refractive indices of all lens elements of the photographing lens system is Nmax, the following condition is satisfied: Nmax=1.669. In this embodiment, a refractive index of the second lens element E2 is substantially equal to a refractive index of the third lens element E3 and is larger than refractive indices of the other lens elements of the photographing lens system, and Nmax is equal to the refractive index of the second lens element E2 or the refractive index of the third lens element E3.

When a minimum value among Abbe numbers of all lens elements of the photographing lens system is Vmin, the following condition is satisfied: Vmin=19.5. In this embodiment, an Abbe number of the second lens element E2 is substantially equal to an Abbe number of the third lens element E3 and is smaller than Abbe numbers of the other lens elements of the photographing lens system, and Vmin is equal to the Abbe number of the second lens element E2 or the Abbe number of the third lens element E3.

When the Abbe number of the second lens element E2 is V2, and the Abbe number of the third lens element E3 is V3, the following condition is satisfied: V2+V3=39.0.

When an Abbe number of the fifth lens element E5 is V5, the following condition is satisfied: V5=28.3.

When the Abbe number of the fifth lens element E5 is V5, and an Abbe number of the eighth lens element E8 is V8, the following condition is satisfied: V5/V8=1.00.

When a central thickness of the first lens element E1 is CT1, a central thickness of the seventh lens element E7 is CT7, and a central thickness of the eighth lens element E8 is CT8, the following condition is satisfied: (CT1+CT8)/CT7=3.27.

When a curvature radius of the object-side surface of the fifth lens element E5 is R9, and the focal length of the photographing lens system is f, the following condition is satisfied: R9/f=1.24.

When the focal length of the photographing lens system is f, and a curvature radius of the object-side surface of the sixth lens element E6 is R11, the following condition is satisfied: f/R11=−0.91.

When a curvature radius of the image-side surface of the eighth lens element E8 is R16, and the focal length of the photographing lens system is f, the following condition is satisfied: R16/f=0.47.

When a curvature radius of the object-side surface of the fourth lens element E4 is R7, and a curvature radius of the image-side surface of the fourth lens element E4 is R8, the following condition is satisfied: (R7+R8)/(R7−R8)=0.36.

When the curvature radius of the object-side surface of the fifth lens element E5 is R9, and a curvature radius of the image-side surface of the fifth lens element E5 is R10, the following condition is satisfied: (R9-R10)/(R9+R10)=−1.84.

When a curvature radius of the image-side surface of the seventh lens element E7 is R14, and a curvature radius of the object-side surface of the eighth lens element E8 is R15, the following condition is satisfied: (R14-R15)/(R14+R15)=0.06.

When the curvature radius of the object-side surface of the eighth lens element E8 is R15, and the curvature radius of the image-side surface of the eighth lens element E8 is R16, the following condition is satisfied: (R15−R16)/(R15+R16)=0.01.

When the focal length of the photographing lens system is f, the curvature radius of the image-side surface of the seventh lens element E7 is R14, and the curvature radius of the image-side surface of the eighth lens element E8 is R16, the following condition is satisfied: f/R14+f/R16=3.97.

When the focal length of the photographing lens system is f, and a focal length of the seventh lens element E7 is f7, the following condition is satisfied: f/f7=−1.29.

When the focal length of the photographing lens system is f, and a focal length of the eighth lens element E8 is f8, the following condition is satisfied: f/f8=0.06.

When a focal length of the first lens element E1 is f1, and the focal length of the eighth lens element E8 is f8, the following condition is satisfied: f1/f8=0.05.

When the focal length of the photographing lens system is f, the focal length of the first lens element E1 is f1, a focal length of the second lens element E2 is f2, a focal length of the third lens element E3 is f3, a focal length of the fourth lens element E4 is f4, a focal length of the fifth lens element E5 is f5, a focal length of the sixth lens element E6 is f6, the focal length of the seventh lens element E7 is f7, the focal length of the eighth lens element E8 is f8, a focal length of the i-th lens element is fi, and a maximum value of |f/fi| is |f/fi|max, the following condition is satisfied: |f/fi|max=1.29, wherein i=1, 2, 3, 4, 5, 6, 7 or 8. In this embodiment, |f/f7| is larger than |f/f2|, |f/f3|, |f/f4|, |f/f5|, |f/f6| or |f/f8|, and therefore|f/fi|max is equal to |f/f7|.

When a maximum value among central thicknesses of all lens elements of the photographing lens system is CTmax, and a maximum image height of the photographing lens system is ImgH, the following condition is satisfied: CTmax/ImgH=0.20. In this embodiment, the central thickness of the first lens element E1 is larger than central thicknesses of the other lens elements of the photographing lens system, and CTmax is equal to the central thickness of the first lens element E1 (i.e., CT1).

When a maximum value among axial distances between each of all adjacent lens elements of the photographing lens system is ATmax, and the maximum image height of the photographing lens system is ImgH, the following condition is satisfied: ATmax/ImgH=0.11. In this embodiment, an axial distance between the fourth lens element E4 and the fifth lens element E5 is larger than axial distances between all the other two adjacent lens elements of the photographing lens system, and ATmax is equal to the axial distance between the fourth lens element E4 and the fifth lens element E5. In this embodiment, an axial distance between two adjacent lens elements is a distance in a paraxial region between two adjacent lens surfaces of the two adjacent lens elements.

When the focal length of the photographing lens system is f, and the maximum image height of the photographing lens system is ImgH, the following condition is satisfied: f/ImgH=1.23.

When the focal length of the photographing lens system is f, and an entrance pupil diameter of the photographing lens system is EPD, the following condition is satisfied: f/EPD=1.78.

When an axial distance between the aperture stop ST and the image-side surface of the eighth lens element E8 is SD, and an axial distance between the object-side surface of the first lens element E1 and the image-side surface of the eighth lens element E8 is TD, the following condition is satisfied: SD/TD=0.88. When the maximum image height of the photographing lens system is ImgH, and an axial distance between the image-side surface of the eighth lens element E8 and the image surface IMG is BL, the following condition is satisfied: ImgH/BL=5.05.

When a maximum effective radius of the object-side surface of the first lens element E1 is Y11, and a maximum effective radius of the image-side surface of the eighth lens element E8 is Y82, the following condition is satisfied: Y11/Y82=0.39.

When a vertical distance between a critical point on the image-side surface of the seventh lens element E7 and an optical axis is Yc72, and a vertical distance between a critical point on the image-side surface of the eighth lens element E8 and the optical axis is Yc82, the following condition is satisfied: Yc72/Yc82=0.96.

When an axial distance between the object-side surface of the first lens element E1 and the image surface IMG is TL, the following condition is satisfied: TL=8.29 [mm].

When the axial distance between the object-side surface of the first lens element E1 and the image surface IMG is TL, and the focal length of the photographing lens system is f, the following condition is satisfied: TL/f=1.19.

When the axial distance between the object-side surface of the first lens element E1 and the image surface IMG is TL, and the maximum image height of the photographing lens system is ImgH, the following condition is satisfied: TL/ImgH=1.47.

When the maximum image height of the photographing lens system is ImgH, the following condition is satisfied: ImgH=5.64 [mm].

The detailed optical data of the 1st embodiment are shown in Table 1 and the aspheric surface data are shown in Table 2 below.

TABLE 1

1st Embodiment
f = 6.96 mm, Fno = 1.78, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.830 | | | | |
| 2 | Lens 1 | 2.6571 | (ASP) | 1.129 | Plastic | 1.545 | 56.1 | 5.82 |
| 3 | | 13.9492 | (ASP) | 0.223 | | | | |
| 4 | Lens 2 | 12.0636 | (ASP) | 0.369 | Plastic | 1.669 | 19.5 | −14.45 |
| 5 | | 5.3003 | (ASP) | 0.539 | | | | |
| 6 | Lens 3 | 64.5786 | (ASP) | 0.371 | Plastic | 1.669 | 19.5 | −77.94 |
| 7 | | 28.7827 | (ASP) | 0.165 | | | | |
| 8 | Lens 4 | 43.8470 | (ASP) | 0.784 | Plastic | 1.544 | 56.0 | 25.72 |
| 9 | | −20.4194 | (ASP) | −0.259 | | | | |
| 10 | Stop | Plano | | 0.885 | | | | |
| 11 | Lens 5 | 8.6501 | (ASP) | 0.584 | Plastic | 1.587 | 28.3 | 11.43 |
| 12 | | −29.1545 | (ASP) | 0.464 | | | | |
| 13 | Lens 6 | −7.6800 | (ASP) | 0.604 | Plastic | 1.587 | 28.3 | 95.85 |
| 14 | | −6.9545 | (ASP) | 0.100 | | | | |
| 15 | Lens 7 | −20.8756 | (ASP) | 0.515 | Plastic | 1.587 | 28.3 | −5.41 |
| 16 | | 3.7809 | (ASP) | 0.145 | | | | |
| 17 | Lens 8 | 3.3238 | (ASP) | 0.555 | Plastic | 1.587 | 28.3 | 120.48 |
| 18 | | 3.2722 | (ASP) | 0.500 | | | | |
| 19 | Filter | Plano | | 0.210 | Glass | 1.517 | 64.2 | — |

TABLE 1-continued

1st Embodiment
f = 6.96 mm, Fno = 1.78, HFOV = 37.9 deg.

| Surface # | | Curvature Radius | Thickness | Material | Index | Abbe # | Focal Length |
|---|---|---|---|---|---|---|---|
| 20 | | Plano | 0.409 | | | | |
| 21 | Image | Plano | — | | | | |

Note:
Reference wavelength is 587.6 nm (d-line).
An effective radius of the stop S1 (Surface 10) is 2.311 mm.

TABLE 2

Aspheric Coefficients

| Surface # | 2 | 3 | 4 | 5 |
|---|---|---|---|---|
| k = | −8.39555E−01 | −6.61204E+01 | 2.06255E+01 | 5.29351E+00 |
| A4 = | 5.63535E−03 | −5.02941E−03 | −1.58126E−02 | −1.02119E−02 |
| A6 = | 6.60261E−04 | 2.62910E−03 | 8.72657E−03 | 6.84033E−03 |
| A8 = | −1.86719E−04 | −6.67057E−04 | −1.65730E−03 | 1.53561E−04 |
| A10 = | 1.93691E−04 | 4.82685E−05 | −2.23890E−04 | −2.03966E−03 |
| A12 = | −8.85955E−05 | 9.31175E−06 | 2.60527E−04 | 1.40808E−03 |
| A14 = | 2.05337E−05 | −2.11583E−06 | −6.16462E−05 | −4.35867E−04 |
| A16 = | −2.09629E−06 | — | 5.83927E−06 | 5.95504E−05 |

| Surface # | 6 | 7 | 8 | 9 |
|---|---|---|---|---|
| k = | 3.30551E+01 | 3.70641E+01 | 8.14439E+01 | 7.76809E+01 |
| A4 = | −2.60756E−02 | −3.40279E−02 | −2.67118E−02 | −2.62452E−02 |
| A6 = | 3.95675E−03 | 1.53011E−02 | 1.58262E−02 | 8.46968E−03 |
| A8 = | −8.57307E−03 | −1.84558E−02 | −1.14573E−02 | −4.73455E−03 |
| A10 = | 6.55817E−03 | 1.34374E−02 | 6.51235E−03 | 2.65367E−03 |
| A12 = | −3.35791E−03 | −6.65751E−03 | −3.17390E−03 | −1.08219E−03 |
| A14 = | 1.00184E−03 | 2.15939E−03 | 1.22634E−03 | 2.74449E−04 |
| A16 = | −1.16413E−04 | −3.75331E−04 | −2.98281E−04 | −4.02263E−05 |
| A18 = | — | 2.61026E−05 | 3.89015E−05 | 2.95888E−06 |
| A20 = | — | — | −2.07420E−06 | −6.18211E−08 |

| Surface # | 11 | 12 | 13 | 14 |
|---|---|---|---|---|
| k = | −6.01288E+01 | −6.18577E−01 | −7.01829E+01 | −9.90000E+01 |
| A4 = | −1.37121E−02 | −1.48612E−02 | −2.51397E−02 | −2.31892E−02 |
| A6 = | 1.14666E−02 | 2.54480E−02 | 2.74075E−02 | 8.13093E−03 |
| A8 = | −1.58126E−02 | −2.53782E−02 | −2.20748E−02 | −7.24490E−03 |
| A10 = | 9.82802E−03 | 1.32353E−02 | 9.60678E−03 | 3.66555E−03 |
| A12 = | −3.87369E−03 | −4.46308E−03 | −2.58187E−03 | −1.02191E−03 |
| A14 = | 9.73157E−04 | 9.99825E−04 | 4.39113E−04 | 1.69156E−04 |
| A16 = | −1.49563E−04 | −1.45572E−04 | −4.67860E−05 | −1.71228E−05 |
| A18 = | 1.26667E−05 | 1.31598E−05 | 3.01416E−06 | 1.04410E−06 |
| A20 = | −4.46781E−07 | −6.69543E−07 | −1.07162E−07 | −3.53344E−08 |
| A22 = | — | 1.46365E−08 | 1.61200E−09 | 5.11128E−10 |

| Surface # | 15 | 16 | 17 | 18 |
|---|---|---|---|---|
| k = | 1.97767E+01 | −6.53598E+01 | −4.57091E+01 | −6.71170E−01 |
| A4 = | −4.11638E−02 | −9.46592E−03 | 1.87219E−02 | −2.53999E−02 |
| A6 = | 7.18838E−03 | 3.18454E−03 | −2.41936E−02 | −2.97245E−03 |
| A8 = | −8.44105E−04 | 1.65439E−04 | 1.13236E−02 | 2.13823E−03 |
| A10 = | 7.98061 E−05 | −3.80455E−04 | −2.97609E−03 | −4.76232E−04 |
| A12 = | 1.01498E−05 | 1.04011E−04 | 4.91754E−04 | 6.02510E−05 |
| A14 = | −4.85664E−06 | −1.44784E−05 | −5.38241 E−05 | −4.74397E−06 |
| A16 = | 7.25231E−07 | 1.20656E−06 | 3.99865E−06 | 2.32663E−07 |
| A18 = | −5.82554E−08 | −6.25936E−08 | −2.02582E−07 | −6.54308E−09 |
| A20 = | 2.70246E−09 | 1.98381E−09 | 6.89154E−09 | 6.84186E−11 |
| A22 = | −6.84754E−11 | −3.51968E−11 | −1.50586E−10 | 1.41696E−12 |
| A24 = | 7.36433E−13 | 2.68006E−13 | 1.90966E−12 | −4.98724E−14 |
| A26 = | — | — | −1.06847E−14 | 4.32994E−16 |

In Table 1, the curvature radius, the thickness and the focal length are shown in millimeters (mm). Surface numbers 0-21 represent the surfaces sequentially arranged from the object side to the image side along the optical axis. In Table 2, k represents the conic coefficient of the equation of the aspheric surface profiles. A4-A26 represent the aspheric coefficients ranging from the 4th order to the 26th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
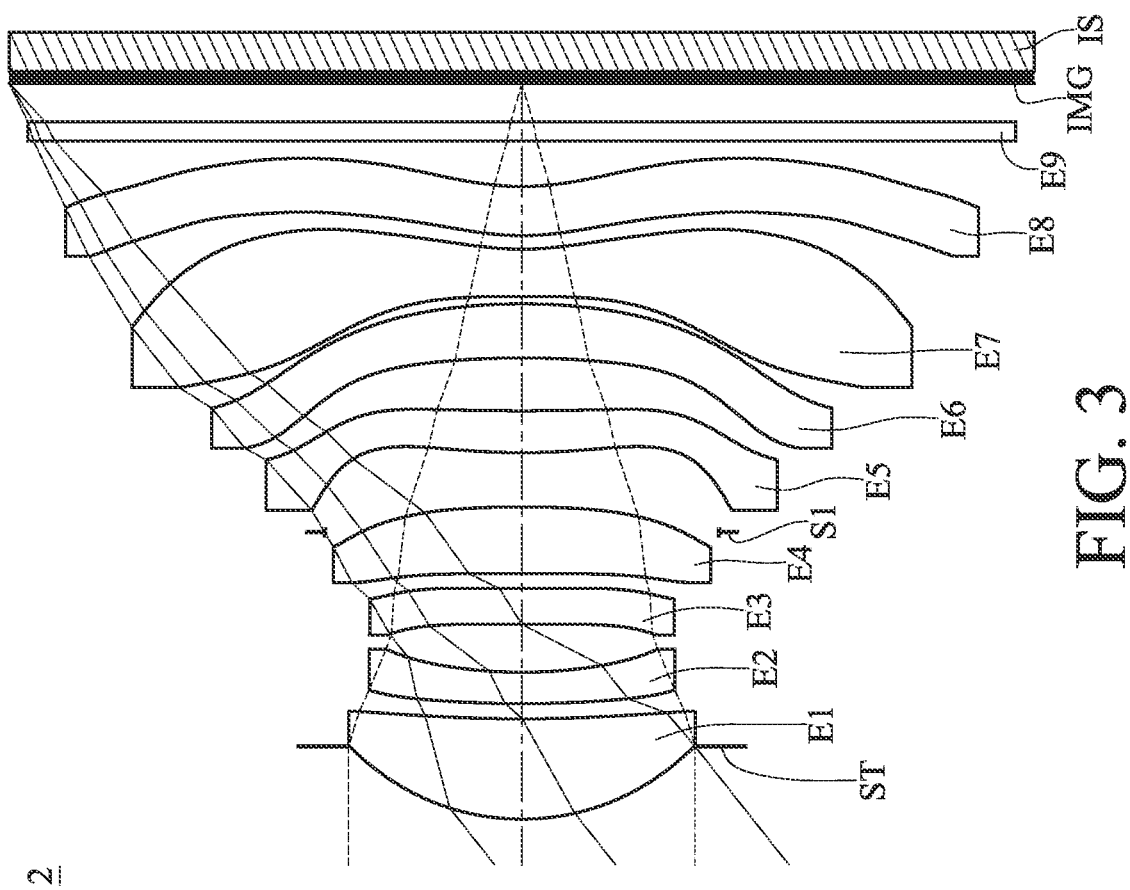
FIG. 3 is a schematic view of an image capturing unit according to the 2nd embodiment of the present disclosure.
Figure 4:
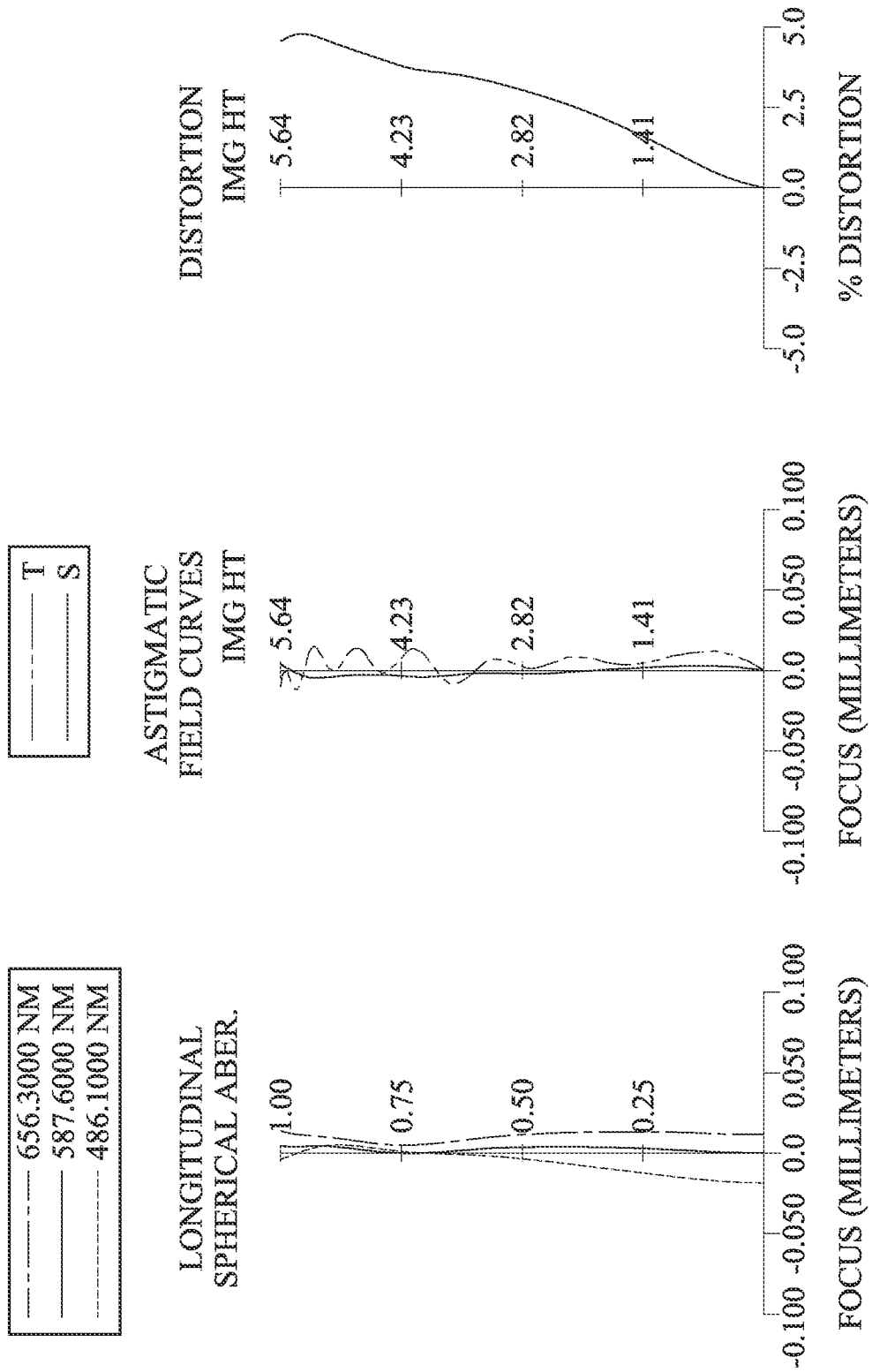
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the photographing lens system (its reference numeral is omitted) of the present disclosure and an image sensor IS. The photographing lens system includes, in order from an object side to an image side along an optical axis, an aperture stop ST, a first lens element E1, a second lens element E2, a third lens element E3, a fourth lens element E4, a stop S1, a fifth lens element E5, a sixth lens element E6, a seventh lens element E7, an eighth lens element E8, a filter E9 and an image surface IMG. The photographing lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one convex shape in an off-axis region thereof. The image-side surface of the seventh lens element E7 has at least one critical point in the off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The image-side surface of the eighth lens element E8 has at least one inflection point. The image-side surface of the eighth lens element E8 has at least one critical point in an off-axis region thereof.

The filter E9 is made of glass material and located between the eighth lens element E8 and the image surface IMG, and will not affect the focal length of the photographing lens system. The image sensor IS is disposed on or near the image surface IMG of the photographing lens system.

The detailed optical data of the 2nd embodiment are shown in Table 3 and the aspheric surface data are shown in Table 4 below.

TABLE 3

2nd Embodiment
f = 6.81 mm, Fno = 1.78, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.800 | | | | |
| 2 | Lens 1 | 2.6345 | (ASP) | 1.106 | Plastic | 1.545 | 56.1 | 5.75 |
| 3 | | 14.0730 | (ASP) | 0.167 | | | | |
| 4 | Lens 2 | 10.7691 | (ASP) | 0.347 | Plastic | 1.679 | 18.4 | −15.24 |
| 5 | | 5.2095 | (ASP) | 0.528 | | | | |
| 6 | Lens 3 | 45.9634 | (ASP) | 0.393 | Plastic | 1.686 | 18.4 | −57.31 |
| 7 | | 21.1170 | (ASP) | 0.165 | | | | |
| 8 | Lens 4 | 84.1607 | (ASP) | 0.735 | Plastic | 1.544 | 56.0 | 23.96 |
| 9 | | −15.3734 | (ASP) | −0.278 | | | | |
| 10 | Stop | Plano | | 0.877 | | | | |
| 11 | Lens 5 | 6.9579 | (ASP) | 0.462 | Plastic | 1.587 | 28.3 | 15.46 |
| 12 | | 29.0344 | (ASP) | 0.582 | | | | |
| 13 | Lens 6 | −10.1247 | (ASP) | 0.598 | Plastic | 1.566 | 37.4 | 23.59 |
| 14 | | −5.8813 | (ASP) | 0.081 | | | | |
| 15 | Lens 7 | −29.9480 | (ASP) | 0.520 | Plastic | 1.566 | 37.4 | −4.63 |
| 16 | | 2.8919 | (ASP) | 0.150 | | | | |

TABLE 3-continued

2nd Embodiment
f = 6.81 mm, Fno = 1.78, HFOV = 38.4 deg.

| Surface # | | Curvature Radius | | Thickness | Material | Index | Abbe # | Focal Length |
|---|---|---|---|---|---|---|---|---|
| 17 | Lens 8 | 2.7112 | (ASP) | 0.542 | Plastic | 1.614 | 25.6 | 31.95 |
| 18 | | 2.9066 | (ASP) | 0.500 | | | | |
| 19 | Filter | Plano | | 0.210 | Glass | 1.517 | 64.2 | — |
| 20 | | Plano | | 0.423 | | | | |
| 21 | Image | Plano | | — | | | | |

Note:
Reference wavelength is 587.6 nm (d-line).
An effective radius of the stop S1 (Surface 10) is 2.172 mm.

TABLE 4

| Aspheric Coefficients | | | | |
|---|---|---|---|---|
| Surface # | 2 | 3 | 4 | 5 |
| k = | −8.28360E−01 | −5.98364E+01 | 2.16467E+01 | 5.17091E+00 |
| A4 = | 5.83604E−03 | −6.51134E−03 | −1.67851E−02 | −1.03066E−02 |
| A6 = | 4.52357E−04 | 4.41679E−03 | 1.07722E−02 | 7.11824E−03 |
| A8 = | 1.25744E−04 | −1.51800E−03 | −3.36907E−03 | −1.66481E−04 |
| A10 = | −1.99633E−05 | 2.68963E−04 | 5.38397E−04 | −2.24295E−03 |
| A12 = | −9.20825E−06 | −2.15638E−05 | 5.33971E−05 | 1.68040E−03 |
| A14 = | 5.28382E−06 | −1.43045E−07 | −2.69576E−05 | −5.37226E−04 |
| A16 = | −9.91693E−07 | — | 3.38377E−06 | 7.35326E−05 |
| Surface # | 6 | 7 | 8 | 9 |
| k = | 8.93959E+01 | 7.19573E+01 | −9.90000E+01 | 4.11908E+01 |
| A4 = | −2.57195E−02 | −3.08055E−02 | −2.24199E−02 | −2.49751E−02 |
| A6 = | 1.80643E−03 | 9.69676E−03 | 1.34775E−02 | 1.00083E−02 |
| A8 = | −5.08697E−03 | −1.22500E−02 | −1.26002E−02 | −8.11526E−03 |
| A10 = | 3.58493E−03 | 8.66258E−03 | 9.47853E−03 | 5.62918E−03 |
| A12 = | −1.85930E−03 | −4.39265E−03 | −5.96740E−03 | −2.56745E−03 |
| A14 = | 5.99991E−04 | 1.53202E−03 | 2.62653E−03 | 6.96508E−04 |
| A16 = | −7.27492E−05 | −2.83373E−04 | −6.88290E−04 | −1.03255E−04 |
| A18 = | — | 2.08712E−05 | 9.64784E−05 | 6.52621E−06 |
| A20 = | — | — | −5.59059E−06 | — |
| Surface # | 11 | 12 | 13 | 14 |
| k = | −3.66014E+01 | −9.89961E+01 | −9.89990E+01 | −9.50995E+01 |
| A4 = | −5.65007E−03 | −3.70262E−03 | −1.60036E−02 | −3.33531E−02 |
| A6 = | 7.77303E−03 | 1.16327E−02 | 1.37315E−02 | 2.07179E−02 |
| A8 = | −1.63805E−02 | −1.58654E−02 | −1.18091E−02 | −1.33851E−02 |
| A10 = | 1.13733E−02 | 8.53174E−03 | 5.02195E−03 | 5.36136E−03 |
| A12 = | −4.89645E−03 | −2.86556E−03 | −1.30135E−03 | −1.31299E−03 |
| A14 = | 1.33104E−03 | 6.32398E−04 | 2.11992E−04 | 2.01328E−04 |
| A16 = | −2.20562E−04 | −8.98871E−05 | −2.13047E−05 | −1.94091E−05 |
| A18 = | 2.00724E−05 | 7.89963E−06 | 1.26361E−06 | 1.14384E−06 |
| A20 = | −7.56867E−07 | −3.91336E−07 | −3.99239E−08 | −3.76995E−08 |
| A22 = | — | 8.37832E−09 | 5.05229E−10 | 5.33115E−10 |
| Surface # | 15 | 16 | 17 | 18 |
| k = | 2.89749E+01 | −3.36847E+01 | −2.40285E+01 | −7.89873E−01 |
| A4 = | −3.72663E−02 | 8.19557E−03 | 2.37059E−02 | −3.48732E−02 |
| A6 = | 7.80607E−03 | −1.51813E−02 | −3.33660E−02 | −1.64154E−03 |
| A8 = | −2.45384E−03 | 8.47232E−03 | 1.63155E−02 | 2.65411E−03 |
| A10 = | 7.51117E−04 | −2.59332E−03 | −4.41658E−03 | −7.14966E−04 |
| A12 = | −1.41486E−04 | 4.77772E−04 | 7.44430E−04 | 1.04473E−04 |
| A14 = | 1.69366E−05 | −5.58557E−05 | −8.25922E−05 | −9.51135E−06 |
| A16 = | −1.35551E−06 | 4.24048E−06 | 6.19590E−06 | 5.61310E−07 |
| A18 = | 7.33055E−08 | −2.08217E−07 | −3.16283E−07 | −2.14627E−08 |
| A20 = | −2.58785E−09 | 6.37019E−09 | 1.08282E−08 | 5.12072E−10 |
| A22 = | 5.39099E−11 | −1.10194E−10 | −2.37966E−10 | −6.88091E−12 |
| A24 = | −5.01735E−13 | 8.21492E−13 | 3.03418E−12 | 3.83535E−14 |
| A26 = | — | — | −1.70661E−14 | 2.86391E−17 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.81 | f/f7 | −1.47 |
| Fno | 1.78 | f/f8 | 0.21 |
| HFOV [deg.] | 38.4 | f1/f8 | 0.18 |
| Nmax | 1.686 | \|f/fi\|max | 1.47 |
| Vmin | 18.4 | CTmax/ImgH | 0.20 |
| V2 + V3 | 36.8 | ATmax/ImgH | 0.11 |
| V5 | 28.3 | f/ImgH | 1.21 |
| V5/V8 | 1.11 | f/EPD | 1.78 |
| (CT1 + CT8)/CT7 | 3.17 | SD/TD | 0.89 |
| R9/f | 1.02 | ImgH/BL | 4.98 |
| f/R11 | −0.67 | Y11/Y82 | 0.38 |
| R16/f | 0.43 | Yc72/Yc82 | 0.89 |
| (R7 + R8)/(R7 − R8) | 0.69 | TL [mm] | 8.11 |
| (R9 − R10)/(R9 + R10) | −0.61 | TL/f | 1.19 |
| (R14 − R15)/(R14 + R15) | 0.03 | TL/ImgH | 1.44 |
| (R15 − R16)/(R15 + R16) | −0.03 | ImgH [mm] | 5.64 |
| f/R14 + f/R16 | 4.70 | — | — |

3rd Embodiment

Figure 5:
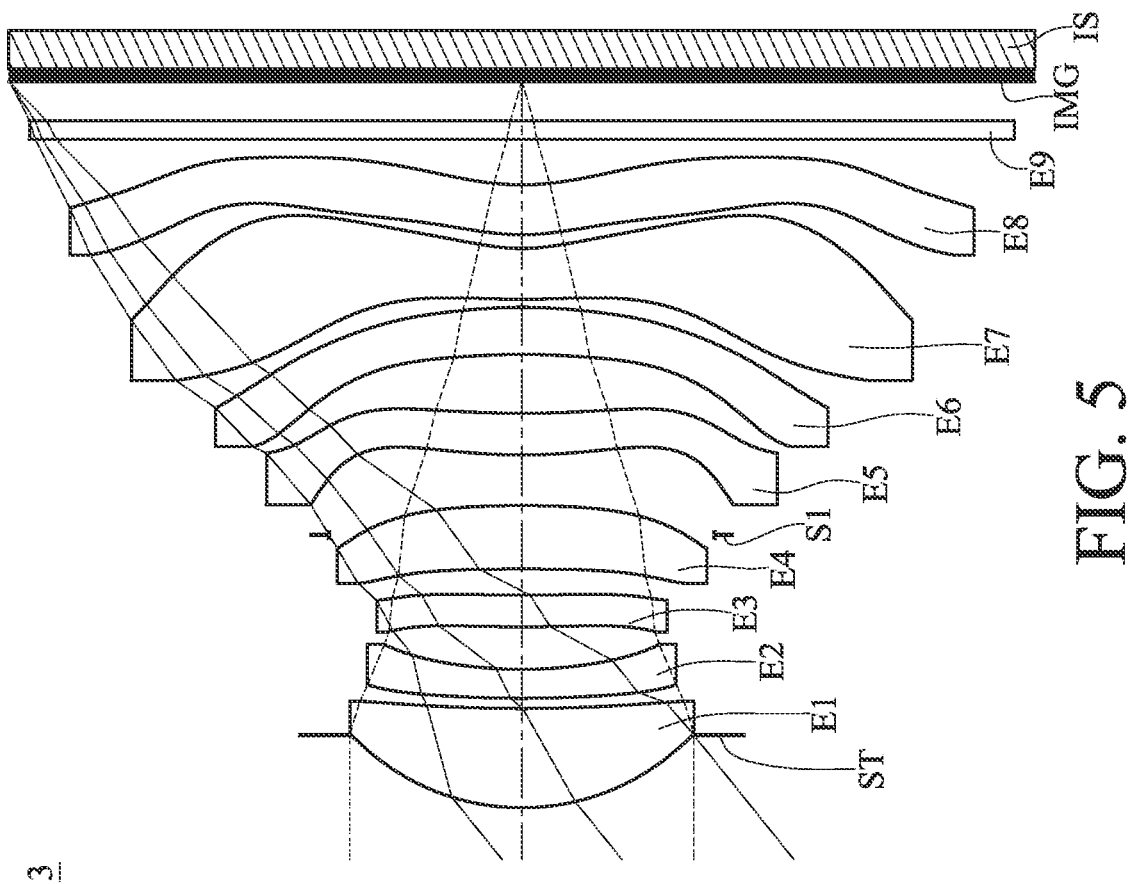
FIG. 5 is a schematic view of an image capturing unit according to the 3rd embodiment of the present disclosure.
Figure 6:
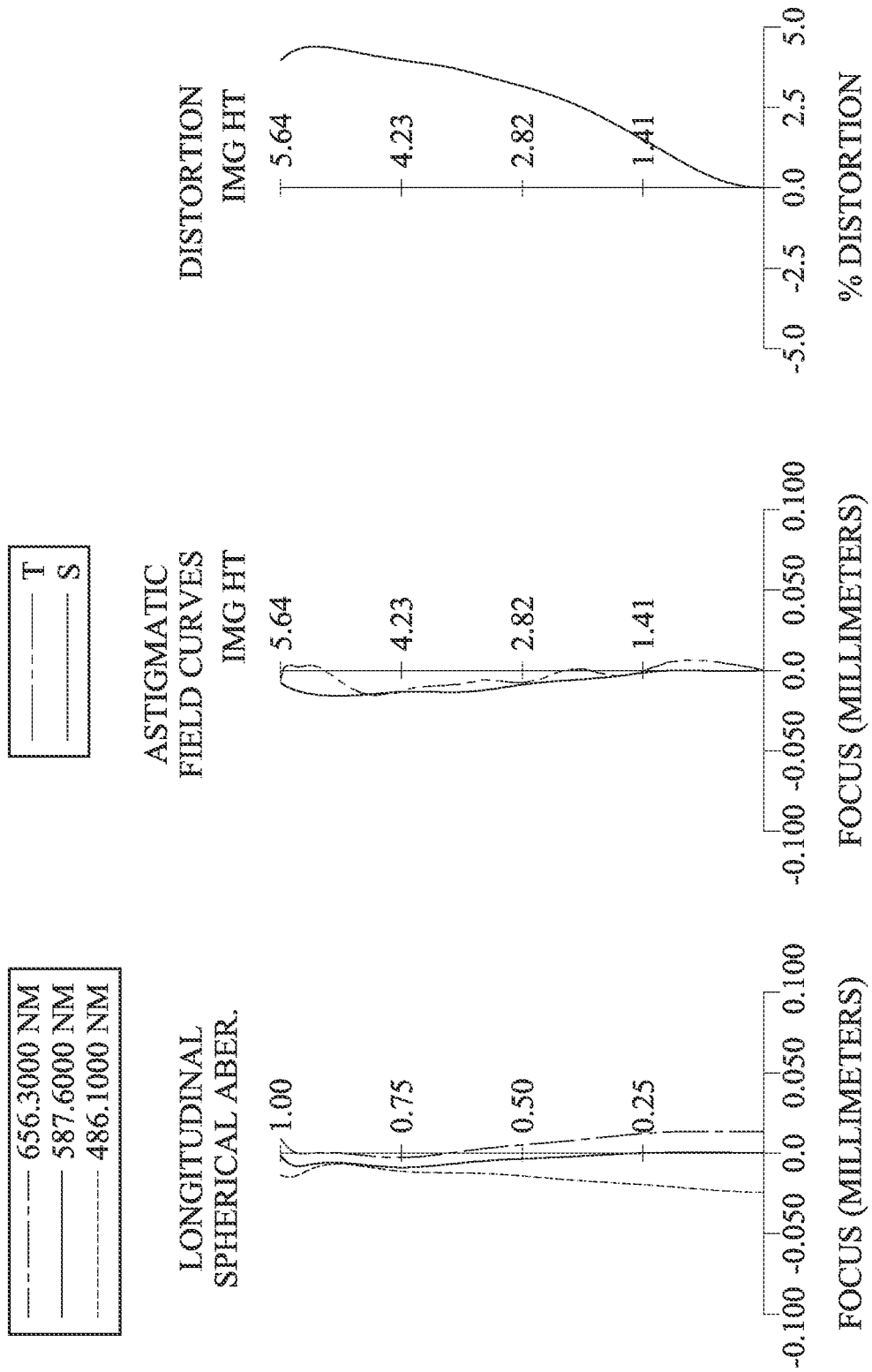
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the photographing lens system (its reference numeral is omitted) of the present disclosure and an image sensor IS. The photographing lens system includes, in order from an object side to an image side along an optical axis, an aperture stop ST, a first lens element E1, a second lens element E2, a third lens element E3, a fourth lens element E4, a stop S1, a fifth lens element E5, a sixth lens element E6, a seventh lens element E7, an eighth lens element E8, a filter E9 and an image surface IMG. The photographing lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one convex shape in an off-axis region thereof. The image-side surface of the seventh lens element E7 has at least one critical point in the off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The image-side surface of the eighth lens element E8 has at least one inflection point. The image-side surface of the eighth lens element E8 has at least one critical point in an off-axis region thereof.

The filter E9 is made of glass material and located between the eighth lens element E8 and the image surface IMG, and will not affect the focal length of the photographing lens system. The image sensor IS is disposed on or near the image surface IMG of the photographing lens system.

The detailed optical data of the 3rd embodiment are shown in Table 5 and the aspheric surface data are shown in Table 6 below.

TABLE 5

3rd Embodiment
f = 6.76 mm, Fno = 1.78, HFOV = 38.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.799 | | | | |

TABLE 5-continued

3rd Embodiment
f = 6.76 mm, Fno = 1.78, HFOV = 38.8 deg.

| Surface # |        | Curvature Radius |       | Thickness |       | Material | Index | Abbe # | Focal Length |
|-----------|--------|------------------|-------|-----------|-------|----------|-------|--------|--------------|
| 2         | Lens 1 | 2.5999           | (ASP) | 1.093     |       | Plastic  | 1.545 | 56.1   | 5.69         |
| 3         |        | 13.6912          | (ASP) | 0.113     |       |          |       |        |              |
| 4         | Lens 2 | 11.2581          | (ASP) | 0.320     |       | Plastic  | 1.686 | 18.4   | −13.21       |
| 5         |        | 4.9639           | (ASP) | 0.468     |       |          |       |        |              |
| 6         | Lens 3 | 14.9675          | (ASP) | 0.351     |       | Plastic  | 1.660 | 20.4   | 97.18        |
| 7         |        | 19.3416          | (ASP) | 0.287     |       |          |       |        |              |
| 8         | Lens 4 | −30.8577         | (ASP) | 0.699     |       | Plastic  | 1.544 | 56.0   | 41.00        |
| 9         |        | −13.0510         | (ASP) | −0.324    |       |          |       |        |              |
| 10        | Stop   | Plano            |       | 0.882     |       |          |       |        |              |
| 11        | Lens 5 | 6.3337           | (ASP) | 0.460     |       | Plastic  | 1.566 | 37.4   | 22.14        |
| 12        |        | 12.4706          | (ASP) | 0.648     |       |          |       |        |              |
| 13        | Lens 6 | −7.7392          | (ASP) | 0.520     |       | Plastic  | 1.566 | 37.4   | 26.23        |
| 14        |        | −5.2112          | (ASP) | 0.088     |       |          |       |        |              |
| 15        | Lens 7 | 7.8423           | (ASP) | 0.560     |       | Plastic  | 1.544 | 56.0   | −4.79        |
| 16        |        | 1.9055           | (ASP) | 0.151     |       |          |       |        |              |
| 17        | Lens 8 | 2.2732           | (ASP) | 0.550     |       | Plastic  | 1.544 | 56.0   | 18.30        |
| 18        |        | 2.6948           | (ASP) | 0.500     |       |          |       |        |              |
| 19        | Filter | Plano            |       | 0.210     |       | Glass    | 1.517 | 64.2   | —            |
| 20        |        | Plano            |       | 0.427     |       |          |       |        |              |
| 21        | Image  | Plano            |       | —         |       |          |       |        |              |

Note:
Reference wavelength is 587.6 nm (d-line).
An effective radius of the stop S1 (Surface 10) is 2.123 mm.

TABLE 6

Aspheric Coefficients

| Surface # | 2 | 3 | 4 | 5 |
|---|---|---|---|---|
| k =   | −7.91058E−01 | −6.15160E+01 | 2.31968E+01  | 4.81958E+00  |
| A4 =  | 6.06617E−03  | −8.78065E−03 | −1.89008E−02 | −1.07656E−02 |
| A6 =  | 5.64062E−04  | 7.40212E−03  | 1.44492E−02  | 8.00276E−03  |
| A8 =  | 3.99231E−05  | −3.15456E−03 | −5.83510E−03 | −9.49354E−04 |
| A10 = | 6.42209E−05  | 7.91812E−04  | 1.48301E−03  | −2.28314E−03 |
| A12 = | −5.19079E−05 | −1.21655E−04 | −1.64080E−04 | 1.93004E−03  |
| A14 = | 1.74106E−05  | 8.02719E−06  | −3.05676E−06 | −6.55478E−04 |
| A16 = | −2.56662E−06 | —            | 3.24309E−06  | 9.13140E−05  |

| Surface # | 6 | 7 | 8 | 9 |
|---|---|---|---|---|
| k =   | 5.41579E+01  | 9.82099E+01  | −2.07653E+01 | 3.38388E+01  |
| A4 =  | −2.27757E−02 | −2.01152E−02 | −1.25387E−02 | −1.94570E−02 |
| A6 =  | −2.14479E−03 | −1.56632E−03 | 3.25602E−03  | 7.35093E−03  |
| A8 =  | −2.95259E−03 | −2.81753E−03 | −7.76219E−03 | −8.93172E−03 |
| A10 = | 2.71045E−03  | 2.17096E−03  | 8.90370E−03  | 6.99508E−03  |
| A12 = | −1.66100E−03 | −8.67683E−04 | −6.91874E−03 | −3.41517E−03 |
| A14 = | 5.97040E−04  | 2.45066E−04  | 3.38427E−03  | 1.00262E−03  |
| A16 = | −7.63675E−05 | −6.95490E−06 | −9.62673E−04 | −1.64635E−04 |
| A18 = | —            | −4.55172E−06 | 1.47727E−04  | 1.24213E−05  |
| A20 = | —            | —            | −9.51188E−06 | −1.70734E−07 |

| Surface # | 11 | 12 | 13 | 14 |
|---|---|---|---|---|
| k =   | −2.58420E+01 | −9.90000E+01 | −9.90000E+01 | −9.12908E+01 |
| A4 =  | −2.15912E−03 | 5.10234E−03  | −2.78245E−03 | −2.12336E−02 |
| A6 =  | 4.39385E−03  | 1.50339E−03  | −5.65706E−04 | 1.26719E−02  |
| A8 =  | −1.34701E−02 | −8.71164E−05 | −4.59677E−04 | −8.97277E−03 |
| A10 = | 9.77796E−03  | 5.12384E−03  | 2.19860E−03  | 3.43080E−03  |
| A12 = | −4.22458E−03 | −1.65768E−03 | −4.01045E−04 | −7.37297E−04 |
| A14 = | 1.12348E−03  | 3.21062E−04  | 1.51585E−05  | 9.38647E−05  |
| A16 = | −1.80351E−04 | −3.61612E−05 | 5.49515E−06  | −7.12770E−06 |
| A18 = | 1.59308E−05  | 2.18037E−06  | −8.97542E−07 | 3.08316E−07  |
| A20 = | −5.86791E−07 | −5.49634E−08 | 5.46107E−08  | −6.60976E−09 |
| A22 = | —            | 4.08203E−11  | −1.22459E−09 | 4.59000E−11  |

| Surface # | 15 | 16 | 17 | 18 |
|---|---|---|---|---|
| k =  | −5.92915E+01 | −1.58467E+01 | −1.75899E+01 | −8.11859E−01 |
| A4 = | −5.69598E−02 | −2.62893E−02 | −2.46541E−02 | −5.49748E−02 |
| A6 = | 2.44318E−02  | 1.53869E−02  | 4.01345E−03  | 1.10932E−02  |

TABLE 6-continued

| Aspheric Coefficients | | | | |
|---|---|---|---|---|
| A8 = | −9.48436E−03 | −5.17080E−03 | 1.48379E−03 | −1.85652E−03 |
| A10 = | 2.38690E−03 | 1.11666E−03 | −7.57002E−04 | 2.31603E−04 |
| A12 = | −3.77611E−04 | −1.66212E−04 | 1.56362E−04 | −1.89887E−05 |
| A14 = | 3.90168E−05 | 1.70050E−05 | −1.93725E−05 | 8.83626E−07 |
| A16 = | −2.68353E−06 | −1.17681E−06 | 1.57070E−06 | −1.47433E−08 |
| A18 = | 1.21727E−07 | 5.37242E−08 | −8.52600E−08 | −5.28207E−10 |
| A20 = | −3.48444E−09 | −1.54277E−09 | 3.07180E−09 | 3.01093E−11 |
| A22 = | 5.66494E−11 | 2.51726E−11 | −7.05081E−11 | −4.52863E−13 |
| A24 = | −3.94544E−13 | −1.77581E−13 | 9.33565E−13 | −8.01582E−16 |
| A26 = | — | — | −5.42822E−15 | 5.48495E−17 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.76 | f/f7 | −1.41 |
| Fno | 1.78 | f/f8 | 0.37 |
| HFOV [deg.] | 38.8 | f1/f8 | 0.31 |
| Nmax | 1.686 | \|f/fi\|max | 1.41 |
| Vmin | 18.4 | CTmax/ImgH | 0.19 |
| V2 + V3 | 38.8 | ATmax/ImgH | 0.11 |
| V5 | 37.4 | f/ImgH | 1.20 |
| V5/V8 | 0.67 | f/EPD | 1.78 |
| (CT1 + CT8)/CT7 | 2.93 | SD/TD | 0.88 |
| R9/f | 0.94 | ImgH/BL | 4.96 |
| f/R11 | −0.87 | Y11/Y82 | 0.38 |
| R16/f | 0.40 | Yc72/Yc82 | 0.98 |
| (R7 + R8)/(R7 − R8) | 2.47 | TL [mm] | 8.00 |
| (R9 − R10)/(R9 + R10) | −0.33 | TL/f | 1.18 |
| (R14 − R15)/(R14 + R15) | −0.09 | TL/ImgH | 1.42 |
| (R15 − R16)/(R15 + R16) | −0.08 | ImgH [mm] | 5.64 |
| f/R14 + f/R16 | 6.06 | — | — |

4th Embodiment

Figure 7:
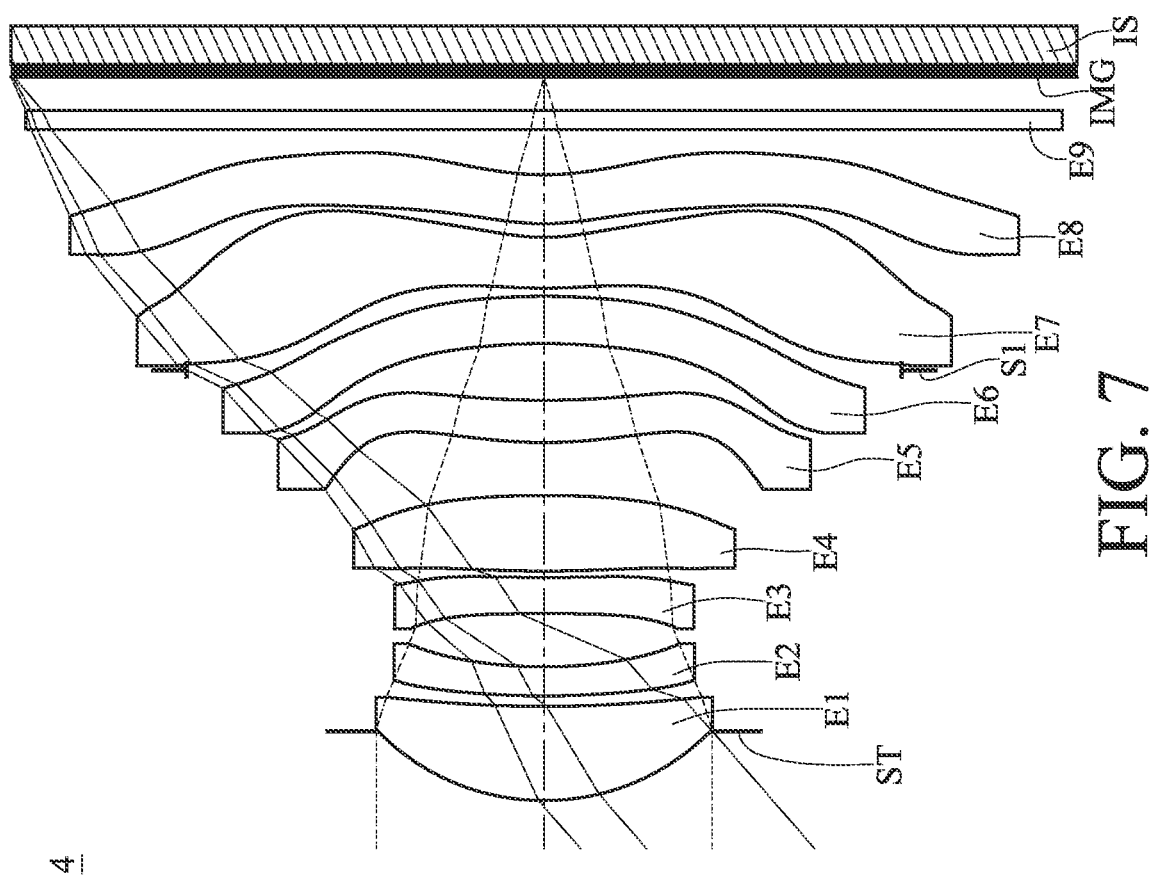
FIG. 7 is a schematic view of an image capturing unit according to the 4th embodiment of the present disclosure.
Figure 8:
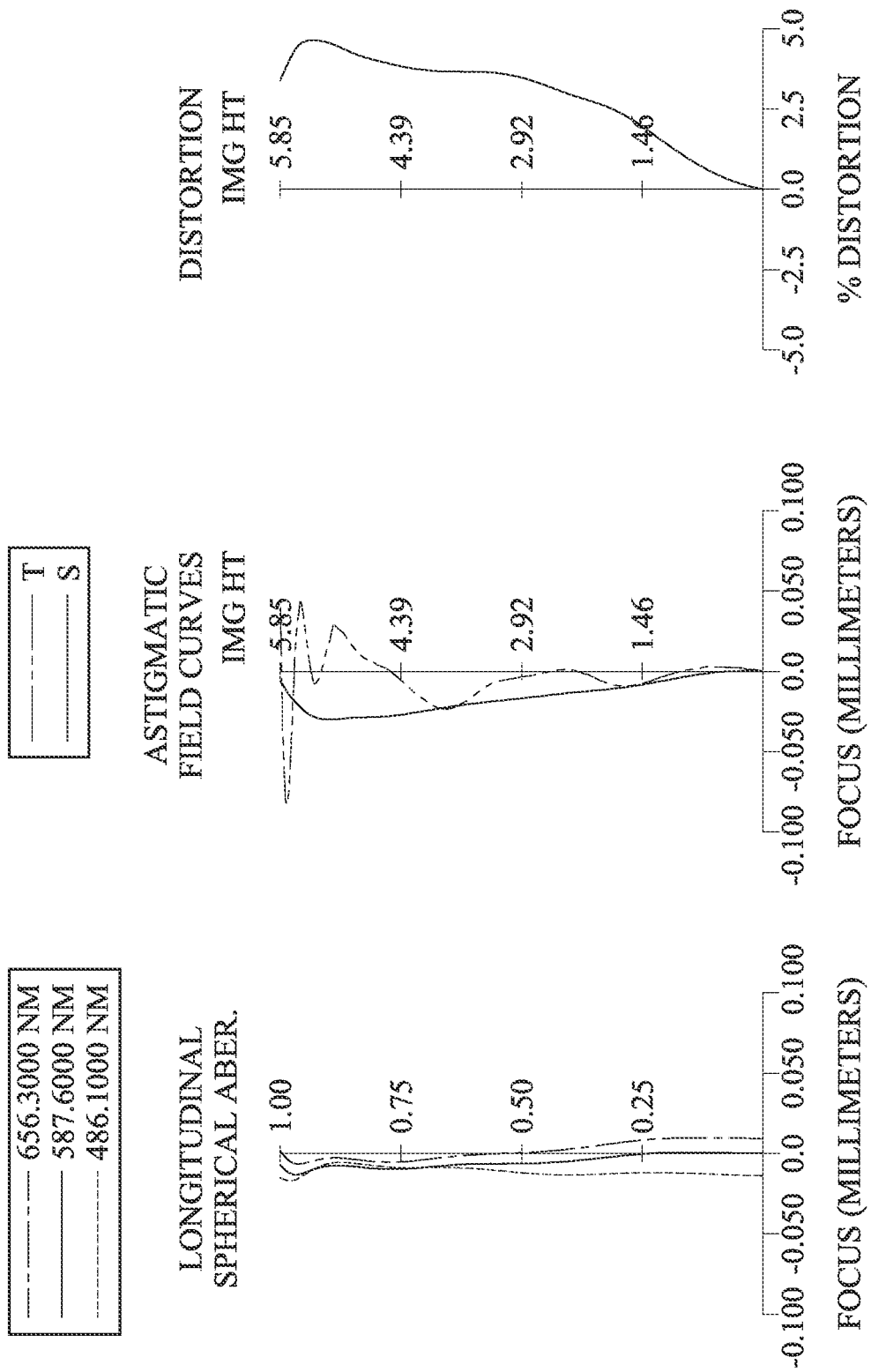
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the photographing lens system (its reference numeral is omitted) of the present disclosure and an image sensor IS. The photographing lens system includes, in order from an object side to an image side along an optical axis, an aperture stop ST, a first lens element E1, a second lens element E2, a third lens element E3, a fourth lens element E4, a fifth lens element E5, a sixth lens element E6, a stop S1, a seventh lens element E7, an eighth lens element E8, a filter E9 and an image surface IMG. The photographing lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one convex shape in an off-axis region thereof. The image-side surface of the seventh lens element E7 has at least one critical point in the off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The image-side surface of the eighth lens element E8 has at least one inflection point. The image-side surface of the eighth lens element E8 has at least one critical point in an off-axis region thereof.

The filter E9 is made of glass material and located between the eighth lens element E8 and the image surface IMG, and will not affect the focal length of the photographing lens system. The image sensor IS is disposed on or near the image surface IMG of the photographing lens system.

The detailed optical data of the 4th embodiment are shown in Table 7 and the aspheric surface data are shown in Table 8 below.

TABLE 7

4th Embodiment
f = 6.51 mm, Fno = 1.76, HFOV = 41.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.768 |  |  |  |  |
| 2 | Lens 1 | 2.5978 | (ASP) | 1.038 | Plastic | 1.545 | 56.1 | 5.81 |
| 3 |  | 12.4057 | (ASP) | 0.116 |  |  |  |  |
| 4 | Lens 2 | 9.0707 | (ASP) | 0.320 | Plastic | 1.660 | 20.4 | −18.51 |
| 5 |  | 5.1321 | (ASP) | 0.587 |  |  |  |  |
| 6 | Lens 3 | −42.4561 | (ASP) | 0.398 | Plastic | 1.686 | 18.4 | −15.64 |
| 7 |  | 14.4162 | (ASP) | 0.071 |  |  |  |  |
| 8 | Lens 4 | 12.0968 | (ASP) | 0.832 | Plastic | 1.566 | 37.4 | 11.33 |
| 9 |  | −13.3226 | (ASP) | 0.586 |  |  |  |  |
| 10 | Lens 5 | 5.4522 | (ASP) | 0.465 | Plastic | 1.660 | 20.4 | 17.44 |
| 11 |  | 10.0072 | (ASP) | 0.626 |  |  |  |  |
| 12 | Lens 6 | −6.2500 | (ASP) | 0.520 | Plastic | 1.656 | 21.3 | −52.78 |
| 13 |  | −7.8778 | (ASP) | −0.812 |  |  |  |  |
| 14 | Stop | Plano |  | 0.902 |  |  |  |  |
| 15 | Lens 7 | 5.7550 | (ASP) | 0.560 | Plastic | 1.587 | 28.3 | −5.85 |
| 16 |  | 2.0741 | (ASP) | 0.150 |  |  |  |  |
| 17 | Lens 8 | 2.5012 | (ASP) | 0.540 | Plastic | 1.639 | 23.5 | 16.20 |
| 18 |  | 3.0214 | (ASP) | 0.500 |  |  |  |  |
| 19 | Filter | Plano |  | 0.210 | Glass | 1.517 | 64.2 | — |
| 20 |  | Plano |  | 0.367 |  |  |  |  |
| 21 | Image | Plano |  | — |  |  |  |  |

Note:
Reference wavelength is 587.6 nm (d-line).
An effective radius of the stop S1 (Surface 14) is 3.937 mm.

TABLE 8

Aspheric Coefficients

| Surface # | 2 | 3 | 4 | 5 |
|---|---|---|---|---|
| k = | −7.45800E−01 | −2.55821E+01 | 1.94017E+01 | 4.99827E+00 |
| A4 = | 5.51463E−03 | −4.99905E−03 | −1.25106E−02 | −4.80836E−03 |
| A6 = | 1.09842E−03 | 3.79294E−03 | 7.53869E−03 | 7.55414E−04 |
| A8 = | −1.73373E−04 | −1.49884E−03 | −3.35105E−03 | 6.11703E−03 |
| A10 = | 2.68454E−05 | 3.71718E−04 | 1.17331E−03 | −8.15174E−03 |
| A12 = | 2.09442E−05 | −7.01016E−05 | −2.79502E−04 | 5.08626E−03 |
| A14 = | −6.60911E−06 | 7.70899E−06 | 4.15819E−05 | −1.59077E−03 |
| A16 = | 1.32270E−07 | — | −1.15858E−07 | 2.06558E−04 |

| Surface # | 6 | 7 | 8 | 9 |
|---|---|---|---|---|
| k = | 9.90000E+01 | 4.92667E+01 | 1.74570E+01 | −2.06234E+01 |
| A4 = | −2.58987E−02 | −3.67898E−02 | −1.99723E−02 | −2.01009E−02 |
| A6 = | 1.61443E−03 | 1.90141E−02 | 1.26464E−02 | 4.70936E−03 |
| A8 = | −6.03632E−03 | −2.69876E−02 | −1.09135E−02 | −1.70593E−03 |
| A10 = | 4.87994E−03 | 2.11083E−02 | 4.38130E−03 | 5.94924E−04 |
| A12 = | −2.38224E−03 | −1.04608E−02 | −8.02391E−04 | −1.79966E−04 |
| A14 = | 6.58238E−04 | 3.33725E−03 | 6.63595E−05 | 3.02802E−05 |
| A16 = | −6.98573E−05 | −5.95905E−04 | −1.87470E−06 | −1.71626E−06 |
| A18 = | — | 4.50262E−05 | — | — |

| Surface # | 10 | 11 | 12 | 13 |
|---|---|---|---|---|
| k = | −1.88205E+01 | −2.69274E+01 | −4.28768E+01 | −9.85072E+01 |
| A4 = | 2.74402E−03 | 5.26905E−03 | −9.86107E−03 | −2.22801E−02 |
| A6 = | −2.06283E−03 | 4.45048E−03 | 1.12091E−02 | 1.29849E−02 |
| A8 = | −4.49427E−03 | −1.03081E−02 | −1.58990E−02 | −1.25286E−02 |
| A10 = | 2.69696E−03 | 5.47738E−03 | 8.77229E−03 | 6.08771E−03 |
| A12 = | −1.00601E−03 | −1.74924E−03 | −2.63713E−03 | −1.60745E−03 |
| A14 = | 2.53457E−04 | 3.67488E−04 | 4.74249E−04 | 2.52362E−04 |
| A16 = | −4.07668E−05 | −5.03333E−05 | −5.22609E−05 | −2.43311E−05 |
| A18 = | 3.67013E−06 | 4.33416E−06 | 3.46204E−06 | 1.41738E−06 |

TABLE 8-continued

| Aspheric Coefficients | | | | |
|---|---|---|---|---|
| A20 = | −1.36403E−07 | −2.13895E−07 | −1.26822E−07 | −4.58786E−08 |
| A22 = | — | 4.62171E−09 | 1.97807E−09 | 6.34601E−10 |

| Surface # | 15 | 16 | 17 | 18 |
|---|---|---|---|---|
| k = | −7.85117E+01 | −1.63826E+01 | −2.04159E+01 | −7.70520E−01 |
| A4 = | −4.78526E−02 | −4.02702E−02 | −2.32309E−02 | −4.47136E−02 |
| A6 = | 1.69030E−02 | 2.62749E−02 | 3.25955E−03 | 8.23064E−03 |
| A8 = | −6.83927E−03 | −9.65022E−03 | 1.01533E−03 | −1.99931E−03 |
| A10 = | 1.88202E−03 | 2.22928E−03 | −4.95498E−04 | 4.54383E−04 |
| A12 = | −3.27105E−04 | −3.48969E−04 | 9.66348E−05 | −7.10864E−05 |
| A14 = | 3.78682E−05 | 3.75268E−05 | −1.13107E−05 | 7.39584E−06 |
| A16 = | −3.00358E−06 | −2.74798E−06 | 8.68105E−07 | −5.23280E−07 |
| A18 = | 1.62080E−07 | 1.33703E−07 | −4.46704E−08 | 2.54580E−08 |
| A20 = | −5.68941E−09 | −4.11441E−09 | 1.52615E−09 | −8.40911E−10 |
| A22 = | 1.16903E−10 | 7.22003E−11 | −3.31919E−11 | 1.80291E−11 |
| A24 = | −1.06386E−12 | −5.48978E−13 | 4.15689E−13 | −2.26180E−13 |
| A26 = | — | — | −2.28039E−15 | 1.25875E−15 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.51 | f/f7 | −1.11 |
| Fno | 1.76 | f/f8 | 0.40 |
| HFOV [deg.] | 41.0 | f1/f8 | 0.36 |
| Nmax | 1.686 | \|f/fi\|max | 1.12 |
| Vmin | 18.4 | CTmax/ImgH | 0.18 |
| V2 + V3 | 38.8 | ATmax/ImgH | 0.11 |
| V5 | 20.4 | f/ImgH | 1.11 |
| V5/V8 | 0.87 | f/EPD | 1.76 |
| (CT1 + CT8)/CT7 | 2.82 | SD/TD | 0.89 |
| R9/f | 0.84 | ImgH/BL | 5.43 |
| f/R11 | −1.04 | Y11/Y82 | 0.35 |
| R16/f | 0.46 | Yc72/Yc82 | 1.14 |
| (R7 + R8)/(R7 − R8) | −0.05 | TL [mm] | 7.98 |
| (R9 − R10)/(R9 + R10) | −0.29 | TL/f | 1.22 |
| (R14 − R15)/(R14 + R15) | −0.09 | TL/ImgH | 1.36 |
| (R15 − R16)/(R15 + R16) | −0.09 | ImgH [mm] | 5.85 |
| f/R14 + f/R16 | 5.30 | | |

5th Embodiment

Figure 9:
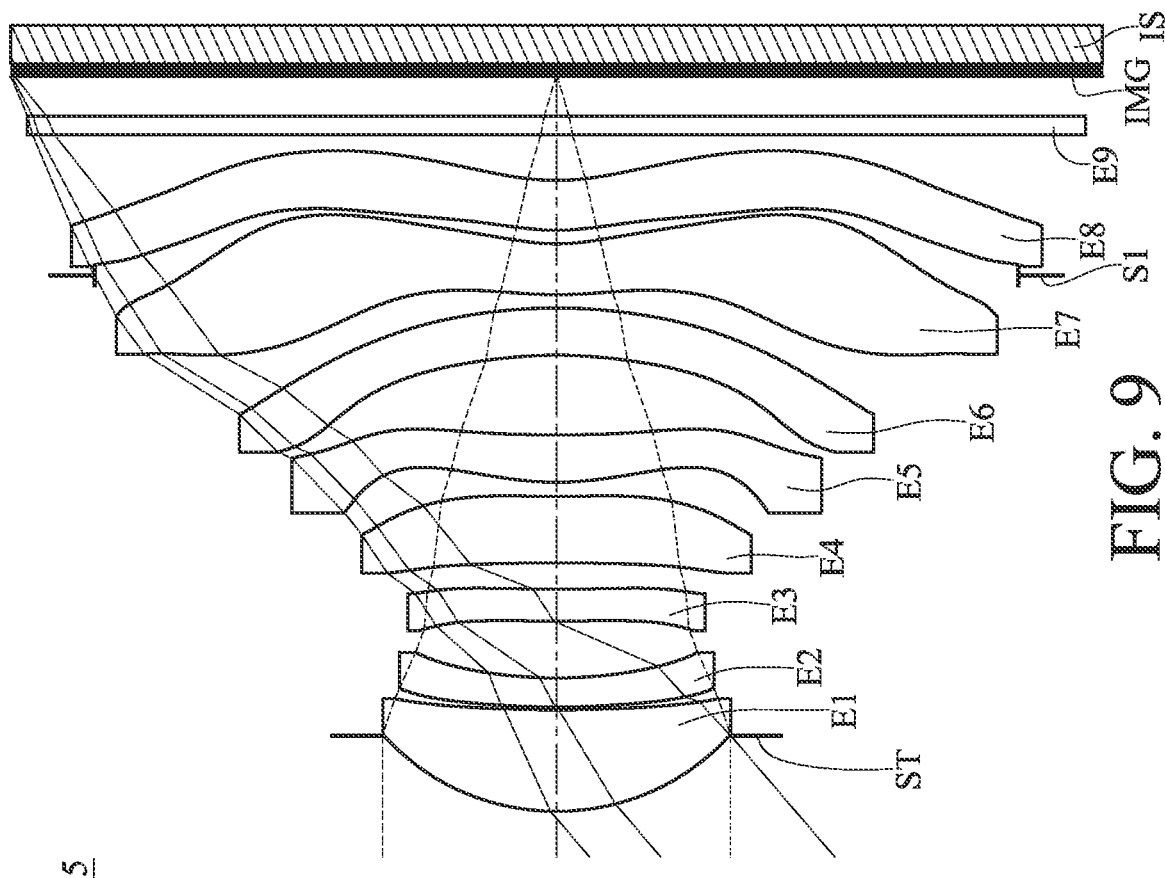
FIG. 9 is a schematic view of an image capturing unit according to the 5th embodiment of the present disclosure.
Figure 10:
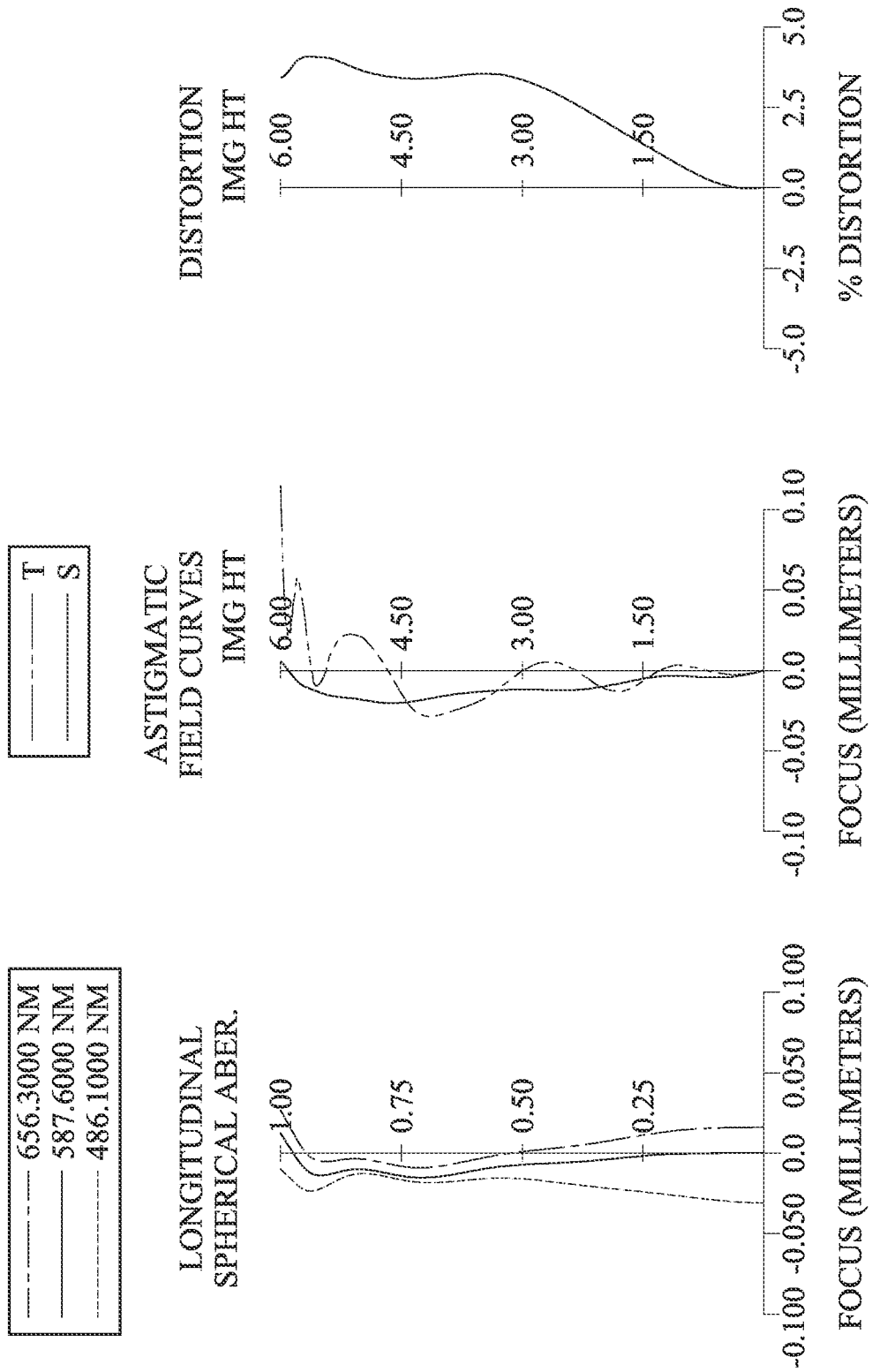
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the photographing lens system (its reference numeral is omitted) of the present disclosure and an image sensor IS. The photographing lens system includes, in order from an object side to an image side along an optical axis, an aperture stop ST, a first lens element E1, a second lens element E2, a third lens element E3, a fourth lens element E4, a fifth lens element E5, a sixth lens element E6, a seventh lens element E7, a stop S1, an eighth lens element E8, a filter E9 and an image surface IMG. The photographing lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one convex shape in an off-axis region thereof. The image-side surface of the seventh lens element E7 has at least one critical point in the off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The image-side surface of the eighth lens element E8 has at least one inflection point. The image-side surface of the eighth lens element E8 has at least one critical point in an off-axis region thereof.

The filter E9 is made of glass material and located between the eighth lens element E8 and the image surface IMG, and will not affect the focal length of the photographing lens system. The image sensor IS is disposed on or near the image surface IMG of the photographing lens system.

The detailed optical data of the 5th embodiment are shown in Table 9 and the aspheric surface data are shown in Table 10 below.

TABLE 9

5th Embodiment
f = 6.78 mm, Fno = 1.77, HFOV = 40.6 deg.

| Surface # |          | Curvature Radius |       | Thickness | Material | Index | Abbe # | Focal Length |
|-----------|----------|------------------|-------|-----------|----------|-------|--------|--------------|
| 0         | Object   | Plano            |       | Infinity  |          |       |        |              |
| 1         | Ape. Stop| Plano            |       | −0.836    |          |       |        |              |
| 2         | Lens 1   | 2.6305           | (ASP) | 1.118     | Plastic  | 1.545 | 56.1   | 5.89         |
| 3         |          | 12.3492          | (ASP) | 0.032     |          |       |        |              |
| 4         | Lens 2   | 8.3657           | (ASP) | 0.320     | Plastic  | 1.686 | 18.4   | −18.67       |
| 5         |          | 4.9819           | (ASP) | 0.628     |          |       |        |              |
| 6         | Lens 3   | 27.0270          | (ASP) | 0.350     | Plastic  | 1.686 | 18.4   | −64.96       |
| 7         |          | 16.7355          | (ASP) | 0.290     |          |       |        |              |
| 8         | Lens 4   | −31.2500         | (ASP) | 0.734     | Plastic  | 1.544 | 56.0   | −16.61       |
| 9         |          | 12.8205          | (ASP) | 0.156     |          |       |        |              |
| 10        | Lens 5   | 3.2625           | (ASP) | 0.522     | Plastic  | 1.562 | 44.6   | 6.85         |
| 11        |          | 20.2030          | (ASP) | 0.879     |          |       |        |              |
| 12        | Lens 6   | −4.4509          | (ASP) | 0.520     | Plastic  | 1.544 | 56.0   | −101.20      |
| 13        |          | −5.0417          | (ASP) | 0.146     |          |       |        |              |
| 14        | Lens 7   | 4.4845           | (ASP) | 0.560     | Plastic  | 1.544 | 56.0   | −6.89        |
| 15        |          | 1.9512           | (ASP) | −0.350    |          |       |        |              |
| 16        | Stop     | Plano            |       | 0.500     |          |       |        |              |
| 17        | Lens 8   | 2.3622           | (ASP) | 0.550     | Plastic  | 1.566 | 37.4   | 27.34        |
| 18        |          | 2.5531           | (ASP) | 0.500     |          |       |        |              |
| 19        | Filter   | Plano            |       | 0.210     | Glass    | 1.517 | 64.2   | —            |
| 20        |          | Plano            |       | 0.437     |          |       |        |              |
| 21        | Image    | Plano            |       | —         |          |       |        |              |

Note:
Reference wavelength is 587.6 nm (d-line).
An effective radius of the stop S1 (Surface 16) is 5.087 mm.

TABLE 10

Aspheric Coefficients

| Surface # | 2 | 3 | 4 | 5 |
|-----------|---|---|---|---|
| k =  | −6.90038E−01 | −9.87151E+00 | 7.85874E+00 | 2.06780E+00 |
| A4 = | 5.42092E−03  | −2.20039E−02 | −2.53265E−02 | −5.77387E−03 |
| A6 = | 9.38893E−04  | 2.11257E−02  | 2.11312E−02  | 3.06611E−03 |
| A8 = | −4.69706E−04 | −9.02202E−03 | −8.20198E−03 | 3.34122E−03 |
| A10 = | 4.47881E−04 | 1.89583E−03  | 1.51516E−03  | −5.21649E−03 |
| A12 = | −1.84567E−04 | −1.20881E−04 | −2.14496E−05 | 3.39896E−03 |
| A14 = | 3.95478E−05 | −7.78599E−06 | −9.71175E−06 | −1.07708E−03 |
| A16 = | −3.49635E−06 | —           | −3.85640E−07 | 1.45111E−04 |

| Surface # | 6 | 7 | 8 | 9 |
|-----------|---|---|---|---|
| k =  | 6.06487E−02  | 5.02936E+01  | −1.00000E+00 | −6.35128E+01 |
| A4 = | −1.97917E−02 | −1.45631E−02 | −4.47711E−03 | −7.18441E−02 |
| A6 = | −1.05266E−02 | −1.00194E−02 | −1.46745E−03 | 3.07787E−02 |
| A8 = | 8.06144E−03  | 6.43731E−03  | 5.26633E−03  | −1.15416E−02 |
| A10 = | −5.89440E−03 | −3.40999E−03 | −5.36494E−03 | 3.15386E−03 |
| A12 = | 2.52469E−03 | 7.01919E−04  | 2.13234E−03  | −6.26584E−04 |
| A14 = | −5.03650E−04 | 2.27163E−04 | −3.65249E−04 | 7.68080E−05 |
| A16 = | 4.48986E−05 | −1.03320E−04 | 2.30616E−05  | −3.86302E−06 |
| A18 = | —           | 1.11110E−05  | —            | —           |

| Surface # | 10 | 11 | 12 | 13 |
|-----------|----|----|----|----|
| k =  | −1.34860E+01 | 1.04908E+01 | −5.40140E+01 | −9.90000E+01 |
| A4 = | −4.43064E−03 | 2.08942E−02 | −2.29092E−02 | −3.98373E−02 |

TABLE 10-continued

| Aspheric Coefficients | | | | |
|---|---|---|---|---|
| A6 = | −2.69481E−03 | −9.57007E−03 | 1.64695E−02 | 2.55840E−02 |
| A8 = | −4.16772E−03 | −2.35175E−03 | −1.20831E−02 | −1.40086E−02 |
| A10 = | 3.61517E−03 | 2.68268E−03 | 4.93379E−03 | 5.12257E−03 |
| A12 = | −1.66459E−03 | −1.03684E−03 | −1.16295E−03 | −1.22693E−03 |
| A14 = | 4.55099E−04 | 2.31387E−04 | 1.54909E−04 | 1.95284E−04 |
| A16 = | −7.32852E−05 | −3.16556E−05 | −1.04609E−05 | −2.08155E−05 |
| A18 = | 6.35763E−06 | 2.62984E−06 | 1.93724E−07 | 1.47158E−06 |
| A20 = | −2.25932E−07 | −1.22865E−07 | 1.35630E−08 | −6.63981E−08 |
| A22 = | — | 2.49540E−09 | −5.68719E−10 | 1.73653E−09 |
| A24 = | — | — | — | −2.00883E−11 |

| Surface # | 14 | 15 | 17 | 18 |
|---|---|---|---|---|
| k = | −2.73399E+01 | −1.80863E+01 | −1.97008E+01 | −9.90674E−01 |
| A4 = | −5.28428E−02 | −3.37385E−02 | −5.04194E−02 | −6.78135E−02 |
| A6 = | 1.92898E−02 | 1.90128E−02 | 2.49241E−02 | 2.08936E−02 |
| A8 = | −6.85113E−03 | −5.57649E−03 | −6.49930E−03 | −5.30904E−03 |
| A10 = | 1.66241E−03 | 9.58115E−04 | 1.04213E−03 | 9.85247E−04 |
| A12 = | −2.56518E−04 | −1.04027E−04 | −1.10278E−04 | −1.30298E−04 |
| A14 = | 2.59858E−05 | 7.20745E−06 | 7.91137E−06 | 1.22503E−05 |
| A16 = | −1.76428E−06 | −3.06996E−07 | −3.89319E−07 | −8.17706E−07 |
| A18 = | 7.98369E−08 | 7.04597E−09 | 1.32619E−08 | 3.83718E−08 |
| A20 = | −2.31516E−09 | −4.00858E−11 | −3.17232E−10 | −1.23428E−09 |
| A22 = | 3.89623E−11 | −1.56799E−12 | 5.41151E−12 | 2.58477E−11 |
| A24 = | −2.89518E−13 | 2.47788E−14 | −6.32397E−14 | −3.16739E−13 |
| A26 = | — | — | 3.85671E−16 | 1.72002E−15 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.78 | f/f7 | −0.99 |
| Fno | 1.77 | f/f8 | 0.25 |
| HFOV [deg.] | 40.6 | f1/f8 | 0.22 |
| Nmax | 1.686 | |f/fi|max | 1.15 |
| Vmin | 18.4 | CTmax/ImgH | 0.19 |
| V2 + V3 | 36.8 | ATmax/ImgH | 0.15 |
| V5 | 44.6 | f/ImgH | 1.13 |
| V5/V8 | 1.19 | f/EPD | 1.77 |
| (CT1 + CT8)/CT7 | 2.98 | SD/TD | 0.88 |
| R9/f | 0.48 | ImgH/BL | 5.23 |
| f/R11 | −1.52 | Y11/Y82 | 0.36 |
| R16/f | 0.38 | Yc72/Yc82 | 1.02 |
| (R7 + R8)/(R7 − R8) | 0.42 | TL [mm] | 8.10 |
| (R9 − R10)/(R9 + R10) | −0.72 | TL/f | 1.19 |
| (R14 − R15)/(R14 + R15) | −0.10 | TL/ImgH | 1.35 |
| (R15 − R16)/(R15 + R16) | −0.04 | ImgH [mm] | 6.00 |
| f/R14 + f/R16 | 6.13 | — | — |

6th Embodiment

Figure 11:
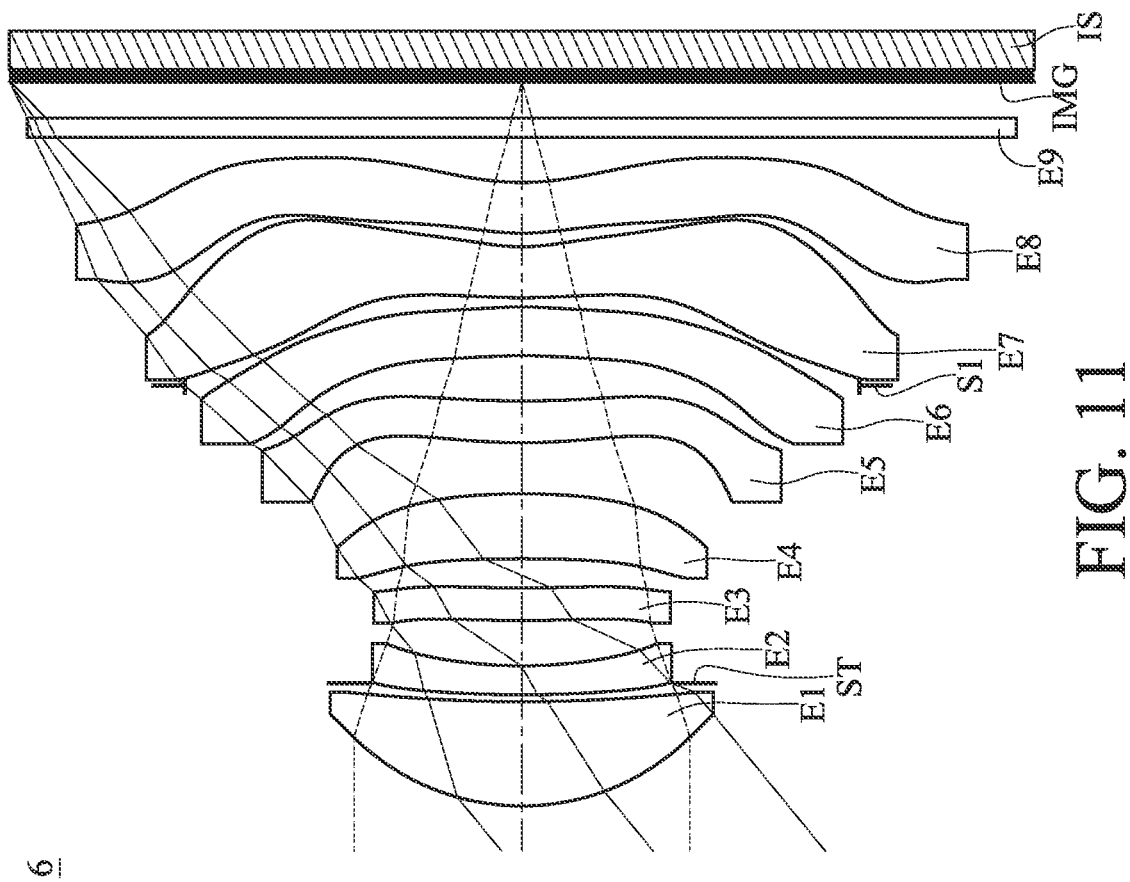
FIG. 11 is a schematic view of an image capturing unit according to the 6th embodiment of the present disclosure.
Figure 12:
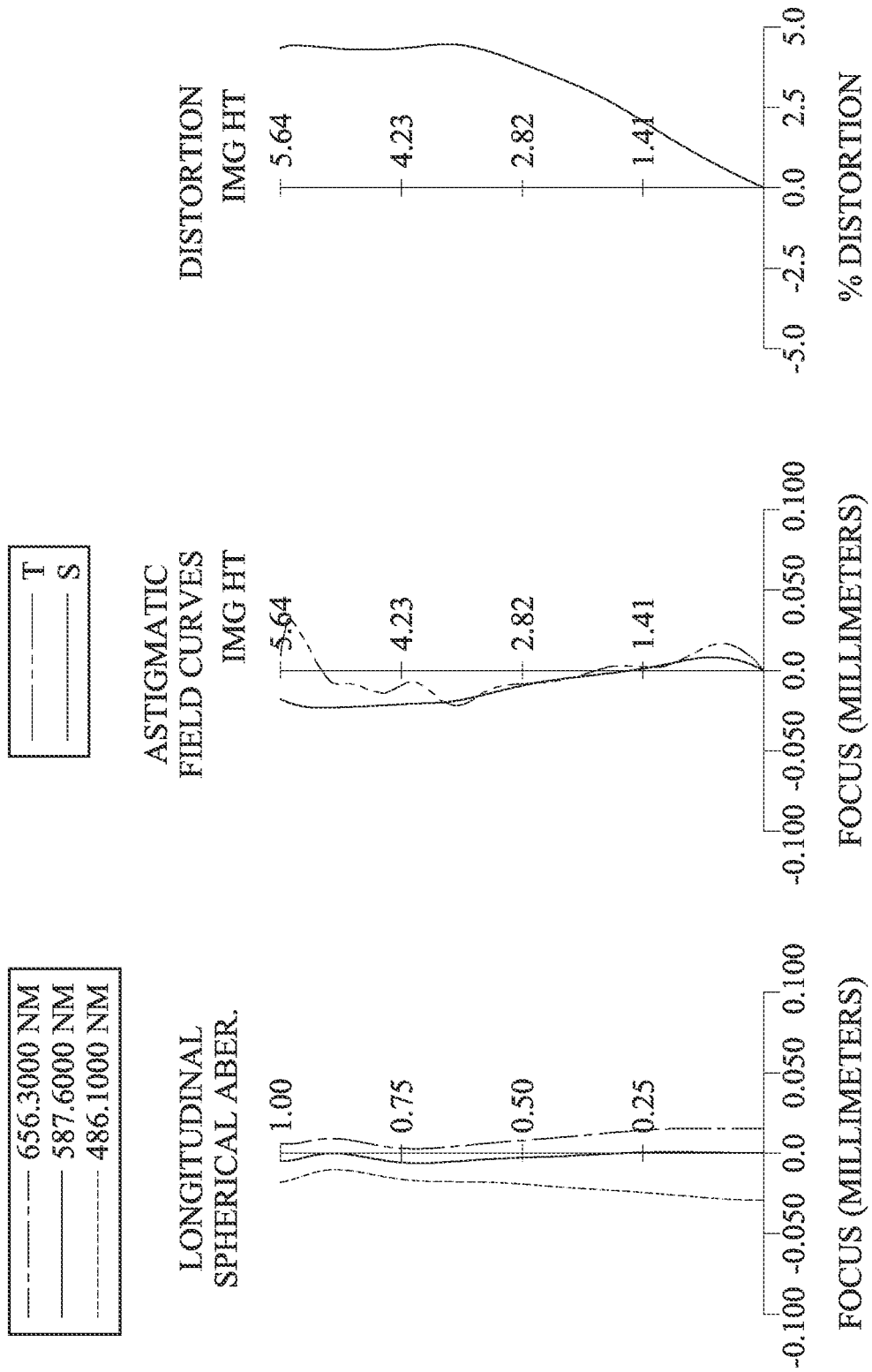
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the photographing lens system (its reference numeral is omitted) of the present disclosure and an image sensor IS. The photographing lens system includes, in order from an object side to an image side along an optical axis, a first lens element E1, an aperture stop ST, a second lens element E2, a third lens element E3, a fourth lens element E4, a fifth lens element E5, a sixth lens element E6, a stop S1, a seventh lens element E7, an eighth lens element E8, a filter E9 and an image surface IMG. The photographing lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one convex shape in an off-axis region thereof. The image-side surface of the seventh lens element E7 has at least one critical point in the off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The image-side surface of the eighth lens element E8 has at least one inflection point. The image-side surface of the eighth lens element E8 has at least one critical point in an off-axis region thereof.

The filter E9 is made of glass material and located between the eighth lens element E8 and the image surface IMG, and will not affect the focal length of the photographing lens system. The image sensor IS is disposed on or near the image surface IMG of the photographing lens system.

The detailed optical data of the 6th embodiment are shown in Table 11 and the aspheric surface data are shown in Table 12 below.

TABLE 11

6th Embodiment
f = 6.60 mm, Fno = 1.77, HFOV = 40.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.6537 | (ASP) | 1.148 | Plastic | 1.545 | 56.1 | 5.83 |
| 2 | | 13.6925 | (ASP) | 0.202 | | | | |
| 3 | Ape. Stop | Plano | | −0.125 | | | | |
| 4 | Lens 2 | 10.9017 | (ASP) | 0.320 | Plastic | 1.686 | 18.4 | −14.88 |
| 5 | | 5.2093 | (ASP) | 0.498 | | | | |
| 6 | Lens 3 | 11.8647 | (ASP) | 0.360 | Plastic | 1.660 | 20.4 | 94.91 |
| 7 | | 14.4607 | (ASP) | 0.322 | | | | |
| 8 | Lens 4 | −17.9710 | (ASP) | 0.715 | Plastic | 1.544 | 56.0 | 28.02 |
| 9 | | −8.3635 | (ASP) | 0.564 | | | | |
| 10 | Lens 5 | 6.9855 | (ASP) | 0.460 | Plastic | 1.566 | 37.4 | 23.57 |
| 11 | | 14.3156 | (ASP) | 0.498 | | | | |
| 12 | Lens 6 | −5.7220 | (ASP) | 0.537 | Plastic | 1.566 | 37.4 | 26.85 |
| 13 | | −4.2981 | (ASP) | −0.870 | | | | |
| 14 | Stop | Plano | | 0.973 | | | | |
| 15 | Lens 7 | 7.1488 | (ASP) | 0.560 | Plastic | 1.544 | 56.0 | −4.64 |
| 16 | | 1.8148 | (ASP) | 0.150 | | | | |
| 17 | Lens 8 | 2.3531 | (ASP) | 0.560 | Plastic | 1.544 | 56.0 | 17.87 |
| 18 | | 2.8444 | (ASP) | 0.500 | | | | |
| 19 | Filter | Plano | | 0.210 | Glass | 1.517 | 64.2 | — |
| 20 | | Plano | | 0.397 | | | | |
| 21 | Image | Plano | | — | | | | |

Note:
Reference wavelength is 587.6 nm (d-line).
An effective radius of the stop S1 (Surface 14) is 3.713 mm.

TABLE 12

Aspheric Coefficients

| Surface # | 1 | 2 | 4 | 5 |
|---|---|---|---|---|
| k = | −8.04851E−01 | −7.53963E+01 | 1.34843E+01 | 2.15284E+00 |
| A4 = | 5.97358E−03 | −8.20563E−03 | −1.83496E−02 | −8.21824E−03 |
| A6 = | 5.18257E−04 | 7.60875E−03 | 1.45655E−02 | 8.06177E−03 |
| A8 = | 3.07399E−05 | −3.13347E−03 | −5.79009E−03 | −8.97878E−04 |
| A10 = | 6.29064E−05 | 7.96995E−04 | 1.49316E−03 | −2.27071E−03 |
| A12 = | −5.17779E−05 | −1.20457E−04 | −1.67533E−04 | 1.95775E−03 |
| A14 = | 1.77292E−05 | 7.28700E−06 | −5.49558E−06 | −6.45013E−04 |
| A16 = | −2.30812E−06 | — | 3.07760E−06 | 8.29422E−05 |

| Surface # | 6 | 7 | 8 | 9 |
|---|---|---|---|---|
| k = | 1.53891E+01 | 2.27222E+01 | 3.26606E+01 | 5.86490E+00 |
| A4 = | −2.33241E−02 | −2.03717E−02 | −1.11575E−02 | −1.94938E−02 |
| A6 = | −1.59266E−03 | −1.28159E−03 | 2.52541E−03 | 6.89828E−03 |
| A8 = | −2.83549E−03 | −2.65508E−03 | −7.82593E−03 | −8.92221E−03 |
| A10 = | 2.78260E−03 | 2.17481E−03 | 8.92394E−03 | 6.98056E−03 |

TABLE 12-continued

| Aspheric Coefficients | | | | |
|---|---|---|---|---|
| A12 = | −1.65487E−03 | −8.75834E−04 | −6.91405E−03 | −3.41621E−03 |
| A14 = | 5.88867E−04 | 2.42829E−04 | 3.38438E−03 | 1.00329E−03 |
| A16 = | −7.80552E−05 | −7.06432E−06 | −9.62750E−04 | −1.64441E−04 |
| A18 = | — | −4.54141E−06 | 1.47728E−04 | 1.24096E−05 |
| A20 = | — | — | −9.52052E−06 | −2.00830E−07 |

| Surface # | 10 | 11 | 12 | 13 |
|---|---|---|---|---|
| k = | −9.36047E+00 | −1.00000E+00 | −9.34651E+01 | −9.90000E+01 |
| A4 = | −1.51215E−03 | 2.19186E−02 | 4.53073E−02 | 5.06390E−02 |
| A6 = | −1.47089E−02 | −2.78122E−02 | −4.67924E−02 | −4.61833E−02 |
| A8 = | 9.46886E−03 | 1.18328E−02 | 1.83781E−02 | 1.66996E−02 |
| A10 = | −5.76322E−03 | −3.80608E−03 | −5.22618E−03 | −3.52129E−03 |
| A12 = | 2.52455E−03 | 9.41605E−04 | 1.40855E−03 | 5.08308E−04 |
| A14 = | −7.63203E−04 | −1.77138E−04 | −3.24575E−04 | −5.72762E−05 |
| A16 = | 1.46560E−04 | 2.38227E−05 | 5.09230E−05 | 5.20316E−06 |
| A18 = | −1.59126E−05 | −2.04476E−06 | −4.80912E−06 | −3.41076E−07 |
| A20 = | 7.36581E−07 | 9.65836E−08 | 2.45823E−07 | 1.33747E−08 |
| A22 = | — | −1.86499E−09 | −5.23988E−09 | −2.27749E−10 |

| Surface # | 15 | 16 | 17 | 18 |
|---|---|---|---|---|
| k = | −1.28763E+01 | −2.10224E+01 | −2.94001E+01 | −9.18070E−01 |
| A4 = | −5.20529E−02 | −6.49712E−02 | −4.17537E−02 | −4.69337E−02 |
| A6 = | 2.61772E−02 | 5.38195E−02 | 1.56737E−02 | 7.08167E−03 |
| A8 = | −1.30547E−02 | −2.32843E−02 | −2.26927E−03 | −5.82709E−04 |
| A10 = | 3.73895E−03 | 6.27197E−03 | 1.18353E−05 | −5.17030E−05 |
| A12 = | −6.22348E−04 | −1.12052E−03 | 4.72824E−05 | 2.78323E−05 |
| A14 = | 6.25718E−05 | 1.34728E−04 | −8.87884E−06 | −4.79061E−06 |
| A16 = | −3.67880E−06 | −1.09002E−05 | 9.08593E−07 | 4.71133E−07 |
| A18 = | 1.01622E−07 | 5.84068E−07 | −5.90108E−08 | −2.90325E−08 |
| A20 = | 7.03985E−10 | −1.98611E−08 | 2.47979E−09 | 1.14195E−09 |
| A22 = | −1.18371E−10 | 3.88168E−10 | −6.53405E−11 | −2.79262E−11 |
| A24 = | 2.16556E−12 | −3.32243E−12 | 9.82278E−13 | 3.87842E−13 |
| A26 = | — | — | −6.43483E−15 | −2.34165E−15 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.60 | f/f7 | −1.42 |
| Fno | 1.78 | f/f8 | 0.37 |
| HFOV [deg.] | 39.3 | f1/f8 | 0.33 |
| Nmax | 1.686 | \|f/fi\|max | 1.42 |
| Vmin | 18.4 | CTmax/ImgH | 0.20 |
| V2 + V3 | 38.8 | ATmax/ImgH | 0.10 |
| V5 | 37.4 | f/ImgH | 1.17 |
| V5/V8 | 0.67 | f/EPD | 1.78 |
| (CT1 + CT8)/CT7 | 3.05 | SD/TD | 0.80 |
| R9/f | 1.06 | ImgH/BL | 5.10 |
| f/R11 | −1.15 | Y11/Y82 | 0.43 |
| R16/f | 0.43 | Yc72/Yc82 | 1.06 |
| (R7 + R8)/(R7 − R8) | 2.74 | TL [mm] | 7.98 |
| (R9 − R10)/(R9 + R10) | −0.34 | TL/f | 1.21 |
| (R14 − R15)/(R14 + R15) | −0.13 | TL/ImgH | 1.41 |
| (R15 − R16)/(R15 + R16) | −0.09 | ImgH [mm] | 5.64 |
| f/R14 + f/R16 | 5.96 | — | — |

7th Embodiment

Figure 13:
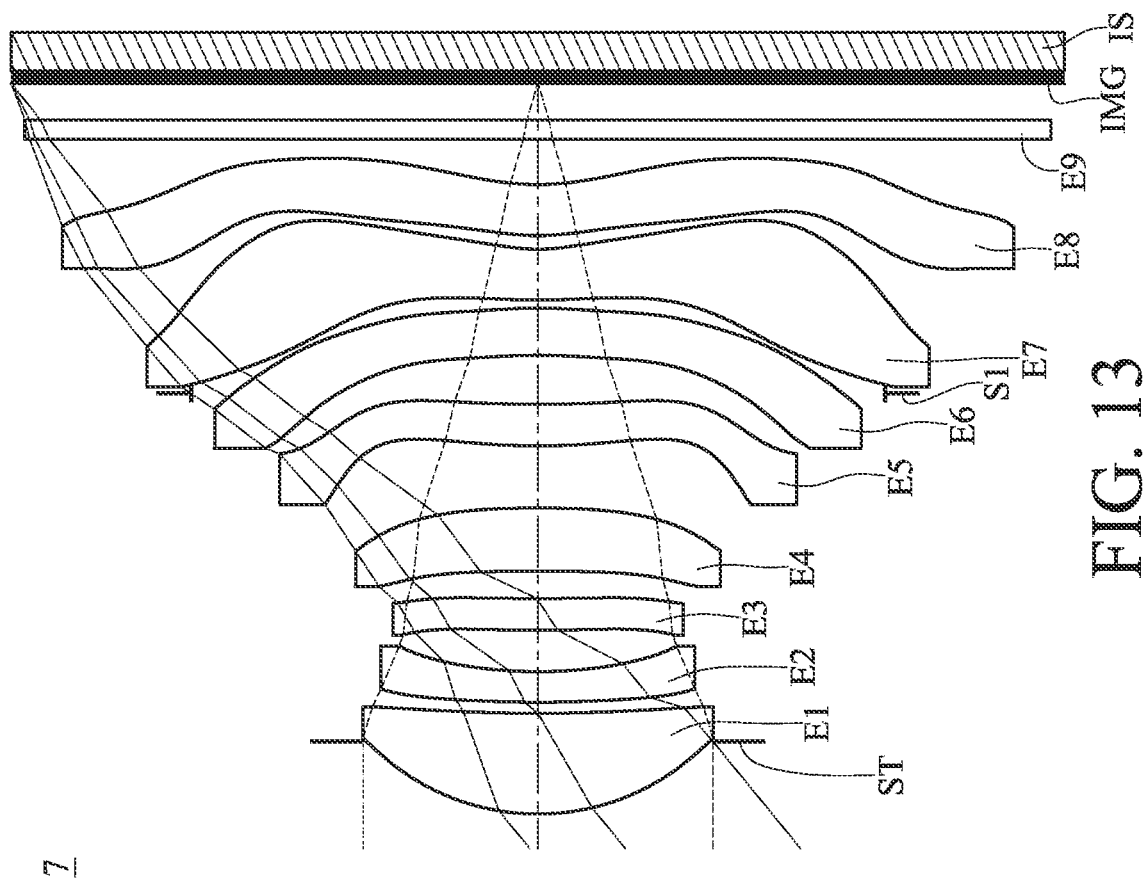
FIG. 13 is a schematic view of an image capturing unit according to the 7th embodiment of the present disclosure.
Figure 14:
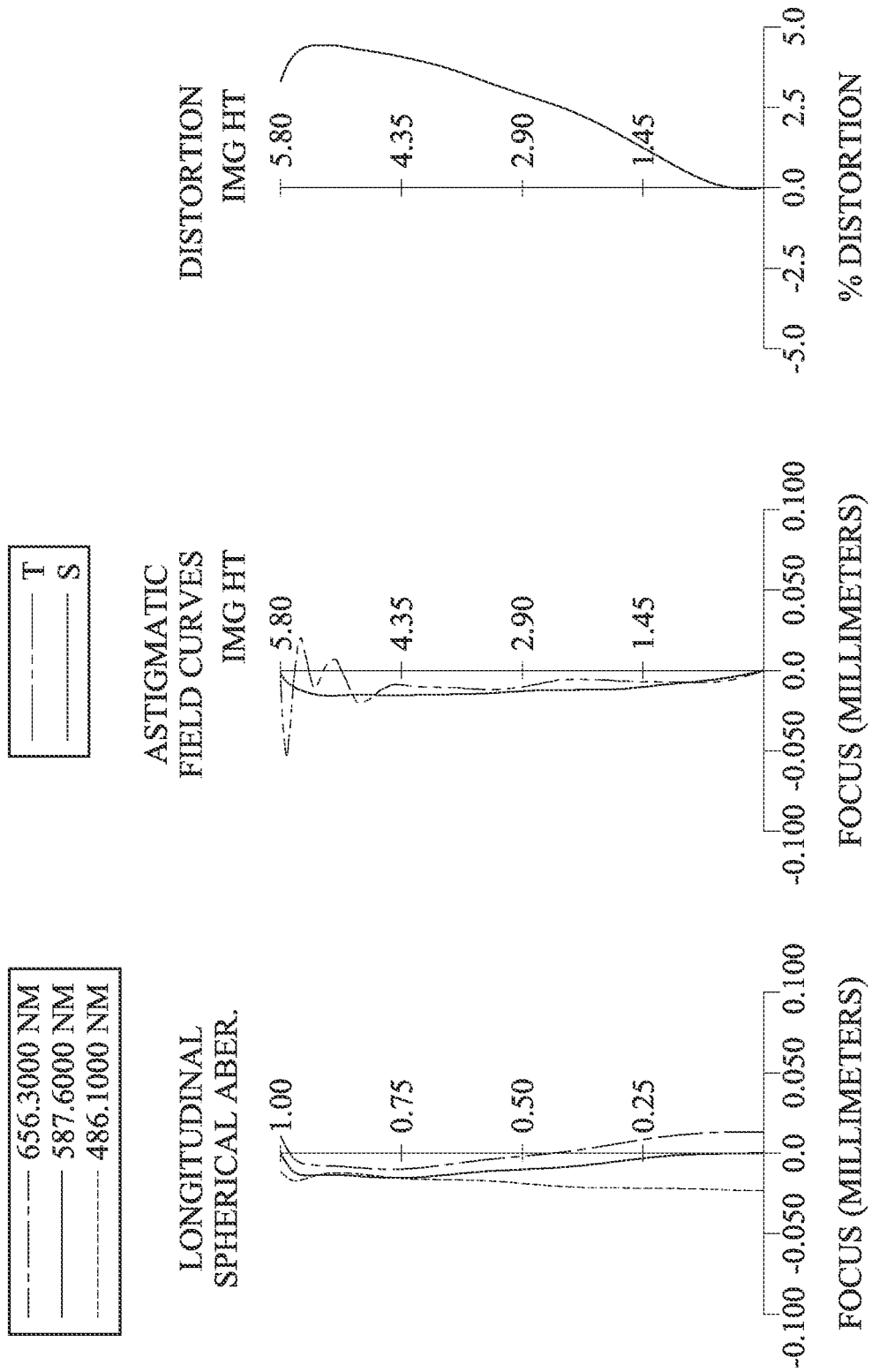
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the photographing lens system (its reference numeral is omitted) of the present disclosure and an image sensor IS. The photographing lens system includes, in order from an object side to an image side along an optical axis, an aperture stop ST, a first lens element E1, a second lens element E2, a third lens element E3, a fourth lens element E4, a fifth lens element E5, a sixth lens element E6, a stop S1, a seventh lens element E7, an eighth lens element E8, a filter E9 and an image surface IMG. The photographing lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of glass material and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one convex shape in an off-axis region thereof. The image-side surface of the seventh lens element E7 has at least one critical point in the off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The image-side surface of the eighth lens element E8 has at least one inflection point. The image-side surface of the eighth lens element E8 has at least one critical point in an off-axis region thereof.

The filter E9 is made of glass material and located between the eighth lens element E8 and the image surface IMG, and will not affect the focal length of the photographing lens system. The image sensor IS is disposed on or near the image surface IMG of the photographing lens system.

The detailed optical data of the 7th embodiment are shown in Table 13 and the aspheric surface data are shown in Table 14 below.

TABLE 13

7th Embodiment
f = 6.88 mm, Fno = 1.78, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.799 | | | | |
| 2 | Lens 1 | 2.6138 | (ASP) | 1.110 | Plastic | 1.545 | 56.1 | 5.62 |
| 3 | | 15.0990 | (ASP) | 0.123 | | | | |
| 4 | Lens 2 | 12.0872 | (ASP) | 0.337 | Plastic | 1.686 | 18.4 | −12.72 |
| 5 | | 5.0107 | (ASP) | 0.455 | | | | |
| 6 | Lens 3 | 14.3383 | (ASP) | 0.350 | Plastic | 1.660 | 20.4 | 98.91 |
| 7 | | 18.1961 | (ASP) | 0.302 | | | | |
| 8 | Lens 4 | −31.2113 | (ASP) | 0.697 | Glass | 1.548 | 45.8 | 32.96 |
| 9 | | −11.5327 | (ASP) | 0.684 | | | | |
| 10 | Lens 5 | 7.2295 | (ASP) | 0.460 | Plastic | 1.566 | 37.4 | 20.66 |
| 11 | | 18.5026 | (ASP) | 0.540 | | | | |
| 12 | Lens 6 | −5.2958 | (ASP) | 0.520 | Plastic | 1.566 | 37.4 | 31.52 |
| 13 | | −4.2286 | (ASP) | −0.942 | | | | |
| 14 | Stop | Plano | | 1.031 | | | | |
| 15 | Lens 7 | 7.3332 | (ASP) | 0.560 | Plastic | 1.544 | 56.0 | −4.56 |
| 16 | | 1.8034 | (ASP) | 0.150 | | | | |
| 17 | Lens 8 | 2.3426 | (ASP) | 0.563 | Plastic | 1.544 | 56.0 | 18.62 |
| 18 | | 2.7891 | (ASP) | 0.500 | | | | |
| 19 | Filter | Plano | | 0.210 | Glass | 1.517 | 64.2 | — |
| 20 | | Plano | | 0.402 | | | | |
| 21 | Image | Plano | | — | | | | |

Note:
Reference wavelength is 587.6 nm (d-line).
An effective radius of the stop S1 (Surface 14) is 3.821 mm.

TABLE 14

Aspheric Coefficients

| Surface # | 2 | 3 | 4 | 5 |
|---|---|---|---|---|
| k = | −8.01779E−01 | −7.78897E+01 | 2.36768E+01 | 4.76106E+00 |
| A4 = | 5.97328E−03 | −9.07659E−03 | −1.88988E−02 | −1.09103E−02 |
| A6 = | 5.55658E−04 | 7.39656E−03 | 1.45018E−02 | 8.22941E−03 |
| A8 = | 3.79680E−05 | −3.14287E−03 | −5.82191E−03 | −9.22639E−04 |
| A10 = | 6.30048E−05 | 7.93435E−04 | 1.48706E−03 | −2.29936E−03 |
| A12 = | −5.21733E−05 | −1.21494E−04 | −1.65215E−04 | 1.93550E−03 |

TABLE 14-continued

| Aspheric Coefficients | | | | |
|---|---|---|---|---|
| A14 = | 1.74482E−05 | 7.79000E−06 | −4.00071E−06 | −6.50142E−04 |
| A16 = | −2.49784E−06 | — | 3.17741E−06 | 8.94033E−05 |

| Surface # | 6 | 7 | 8 | 9 |
|---|---|---|---|---|
| k = | 6.32233E+01 | 8.94038E+01 | 8.45673E+01 | 2.59446E+01 |
| A4 = | −2.32259E−02 | −2.04789E−02 | −1.33757E−02 | −1.74825E−02 |
| A6 = | −1.77432E−03 | −1.41792E−03 | 3.07492E−03 | 6.89255E−03 |
| A8 = | −3.02238E−03 | −2.75400E−03 | −7.79059E−03 | −8.91187E−03 |
| A10 = | 2.71784E−03 | 2.16506E−03 | 8.91175E−03 | 6.99620E−03 |
| A12 = | −1.65572E−03 | −8.73603E−04 | −6.91643E−03 | −3.41452E−03 |
| A14 = | 5.94092E−04 | 2.43586E−04 | 3.38457E−03 | 1.00293E−03 |
| A16 = | −7.87008E−05 | −7.13127E−06 | −9.62605E−04 | −1.64575E−04 |
| A18 = | — | −4.58177E−06 | 1.47745E−04 | 1.24178E−05 |
| A20 = | — | — | −9.52198E−06 | −1.77096E−07 |

| Surface # | 10 | 11 | 12 | 13 |
|---|---|---|---|---|
| k = | −6.01018E+00 | −1.00000E+00 | −9.90000E+01 | −9.87651E+01 |
| A4 = | −2.77225E−03 | 1.99186E−02 | 3.41402E−02 | 4.61207E−02 |
| A6 = | −7.29707E−03 | −2.00648E−02 | −2.86206E−02 | −4.17765E−02 |
| A8 = | 2.14718E−04 | 5.72805E−03 | 4.75783E−03 | 1.51271E−02 |
| A10 = | 9.13785E−04 | −1.06055E−03 | 1.38935E−03 | −3.29067E−03 |
| A12 = | −6.38994E−04 | 9.63910E−05 | −8.96949E−04 | 5.03106E−04 |
| A14 = | 2.02875E−04 | −1.11142E−05 | 2.29238E−04 | −5.92322E−05 |
| A16 = | −3.72501E−05 | 5.24258E−06 | −3.47862E−05 | 5.32379E−06 |
| A18 = | 3.83423E−06 | −1.06476E−06 | 3.21167E−06 | −3.30613E−07 |
| A20 = | −1.63900E−07 | 8.93164E−08 | −1.64956E−07 | 1.21289E−08 |
| A22 = | — | −2.72205E−09 | 3.58945E−09 | −1.93979E−10 |

| Surface # | 15 | 16 | 17 | 18 |
|---|---|---|---|---|
| k = | −2.54825E+01 | −2.05955E+01 | −2.41414E+01 | −8.16248E−01 |
| A4 = | −4.92878E−02 | −4.87261E−02 | −3.99200E−02 | −5.44941E−02 |
| A6 = | 1.87081E−02 | 3.73774E−02 | 2.02829E−02 | 1.27522E−02 |
| A8 = | −7.67789E−03 | −1.48603E−02 | −5.84031E−03 | −2.76567E−03 |
| A10 = | 2.13797E−03 | 3.62248E−03 | 1.14711E−03 | 4.61707E−04 |
| A12 = | −3.85391E−04 | −5.79964E−04 | −1.59863E−04 | −5.33954E−05 |
| A14 = | 4.71045E−05 | 6.19107E−05 | 1.55986E−05 | 4.14669E−06 |
| A16 = | −3.97943E−06 | −4.39576E−06 | −1.05832E−06 | −2.16068E−07 |
| A18 = | 2.29076E−07 | 2.03580E−07 | 4.97043E−08 | 7.54278E−09 |
| A20 = | −8.55688E−09 | −5.86444E−09 | −1.59008E−09 | −1.73610E−10 |
| A22 = | 1.86497E−10 | 9.45684E−11 | 3.31951E−11 | 2.52608E−12 |
| A24 = | −1.79719E−12 | −6.44785E−13 | −4.09156E−13 | −2.11391E−14 |
| A26 = | — | — | 2.26451E−15 | 7.85900E−17 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.88 | f/f7 | −1.51 |
| Fno | 1.78 | f/f8 | 0.37 |
| HFOV [deg.] | 39.3 | f1/f8 | 0.30 |
| Nmax | 1.686 | \|f/fi\|max | 1.51 |
| Vmin | 18.4 | CTmax/ImgH | 0.19 |
| V2 + V3 | 38.8 | ATmax/ImgH | 0.12 |
| V5 | 37.4 | f/ImgH | 1.19 |
| V5/V8 | 0.67 | f/EPD | 1.78 |
| (CT1 + CT8)/CT7 | 2.99 | SD/TD | 0.88 |
| R9/f | 1.05 | ImgH/BL | 5.21 |
| f/R11 | −1.30 | Y11/Y82 | 0.37 |
| R16/f | 0.41 | Yc72/Yc82 | 1.03 |
| (R7 + R8)/(R7 − R8) | 2.17 | TL [mm] | 8.05 |
| (R9 − R10)/(R9 + R10) | −0.44 | TL/f | 1.17 |
| (R14 − R15)/(R14 + R15) | −0.13 | TL/ImgH | 1.39 |
| (R15 − R16)/(R15 + R16) | −0.09 | ImgH [mm] | 5.80 |
| f/R14 + f/R16 | 6.28 | | |

8th Embodiment

Figure 15:
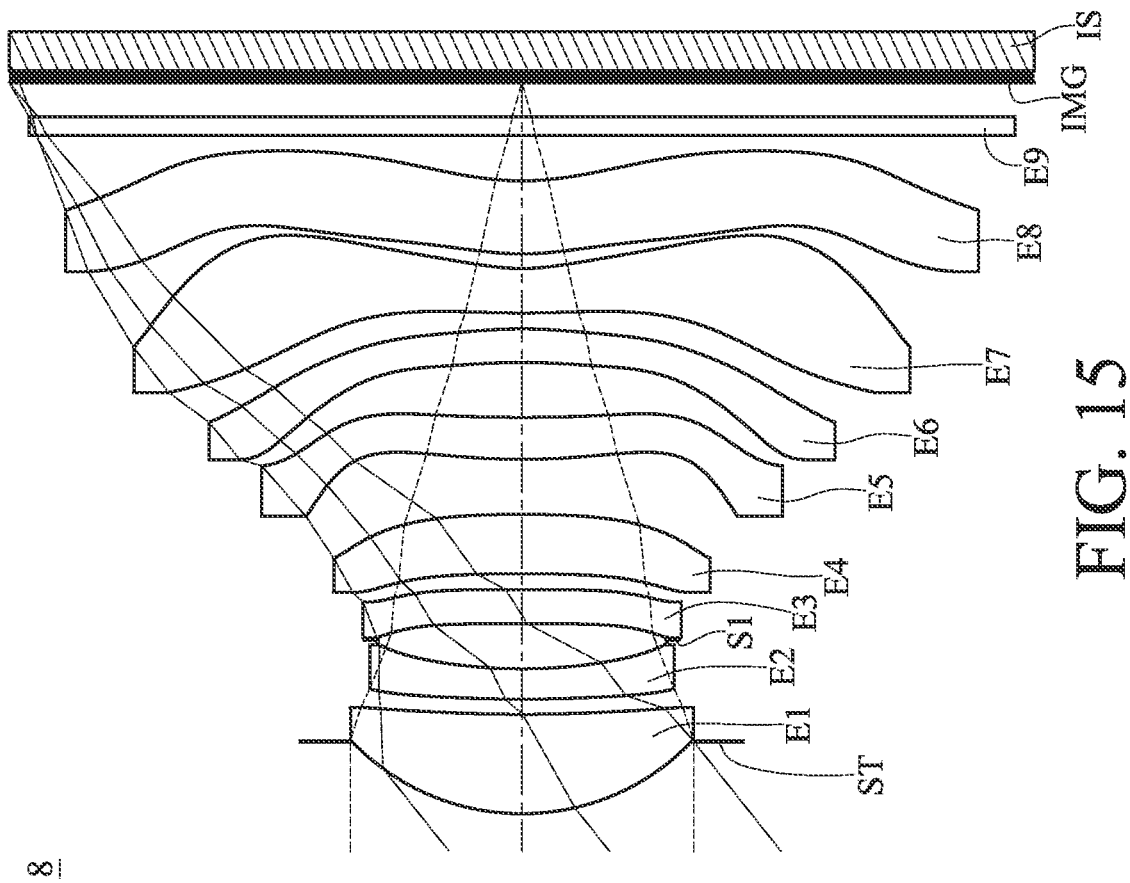
FIG. 15 is a schematic view of an image capturing unit according to the 8th embodiment of the present disclosure.
Figure 16:
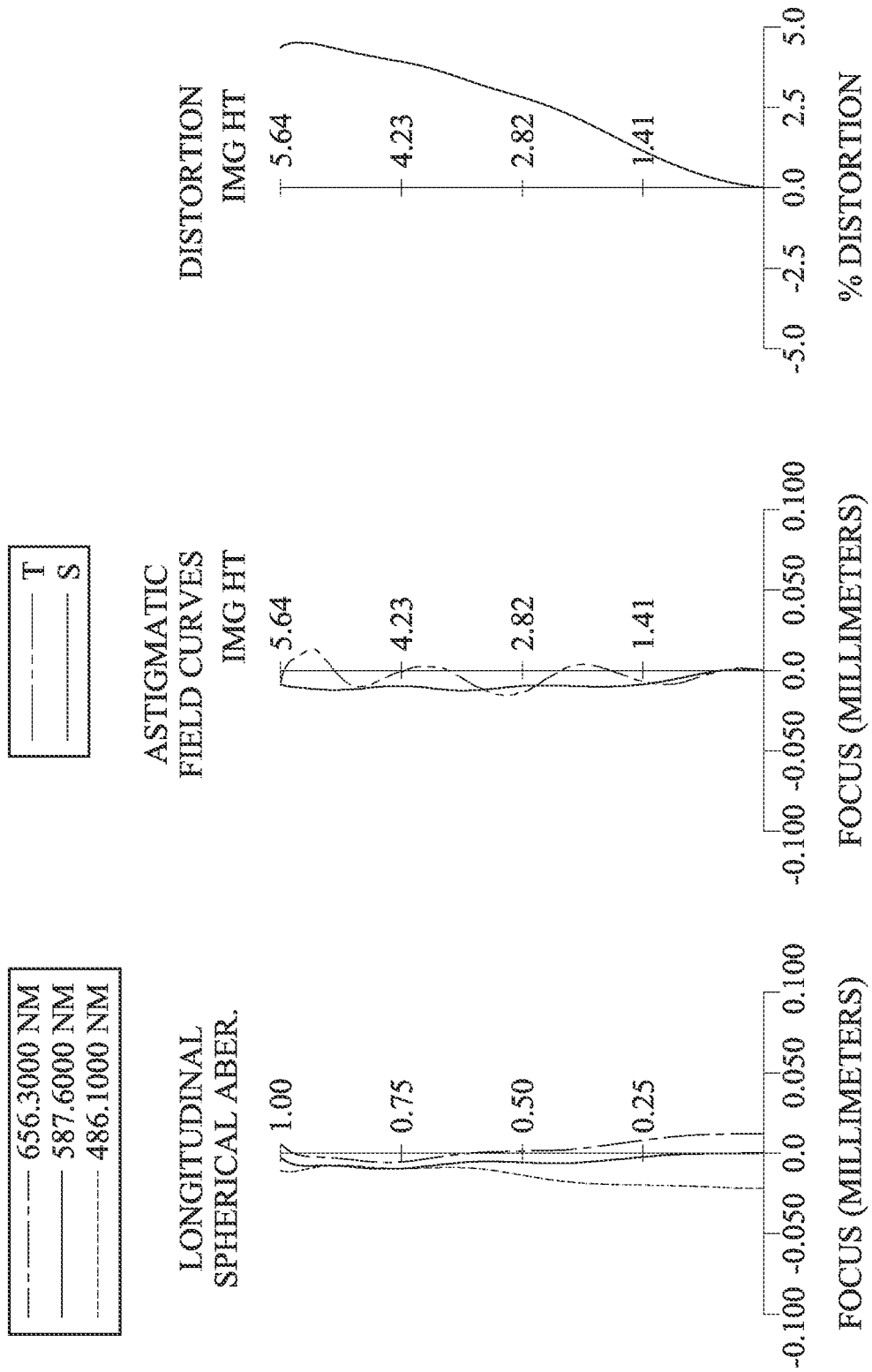
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the photographing lens system (its reference numeral is omitted) of the present disclosure and an image sensor IS. The photographing lens system includes, in order from an object side to an image side along an optical axis, an aperture stop ST, a first lens element E1, a second lens element E2, a stop S1, a third lens element E3, a fourth lens element E4, a fifth lens element E5, a sixth lens element E6, a seventh lens element E7, an eighth lens element E8, a filter E9 and an image surface IMG. The photographing lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one convex shape in an off-axis region thereof. The image-side surface of the seventh lens element E7 has at least one critical point in the off-axis region thereof.

The eighth lens element E8 with positive refractive power has an object-side surface being convex in a paraxial region thereof and an image-side surface being concave in a paraxial region thereof. The eighth lens element E8 is made of plastic material and has the object-side surface and the image-side surface being both aspheric. The image-side surface of the eighth lens element E8 has at least one inflection point. The image-side surface of the eighth lens element E8 has at least one critical point in an off-axis region thereof.

The filter E9 is made of glass material and located between the eighth lens element E8 and the image surface IMG, and will not affect the focal length of the photographing lens system. The image sensor IS is disposed on or near the image surface IMG of the photographing lens system.

The detailed optical data of the 8th embodiment are shown in Table 15 and the aspheric surface data are shown in Table 16 below.

TABLE 15

8th Embodiment
f = 6.80 mm, Fno = 1.80, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.799 | | | | |
| 2 | Lens 1 | 2.6204 | (ASP) | 1.095 | Plastic | 1.545 | 56.1 | 5.63 |
| 3 | | 15.2674 | (ASP) | 0.167 | | | | |
| 4 | Lens 2 | 13.0610 | (ASP) | 0.335 | Plastic | 1.700 | 17.0 | −14.00 |
| 5 | | 5.5395 | (ASP) | 0.322 | | | | |
| 6 | Stop | Plano | | 0.174 | | | | |
| 7 | Lens 3 | 189.7075 | (ASP) | 0.378 | Plastic | 1.660 | 20.4 | 95.86 |
| 8 | | −94.8479 | (ASP) | 0.175 | | | | |
| 9 | Lens 4 | −19.6633 | (ASP) | 0.655 | Plastic | 1.544 | 56.0 | 69.94 |
| 10 | | −13.1161 | (ASP) | 0.606 | | | | |
| 11 | Lens 5 | 7.6704 | (ASP) | 0.463 | Plastic | 1.566 | 37.4 | 19.65 |
| 12 | | 24.1602 | (ASP) | 0.606 | | | | |
| 13 | Lens 6 | −5.6097 | (ASP) | 0.370 | Plastic | 1.566 | 37.4 | 27.30 |
| 14 | | −4.2139 | (ASP) | 0.174 | | | | |
| 15 | Lens 7 | 8.8197 | (ASP) | 0.491 | Plastic | 1.544 | 56.0 | −5.37 |
| 16 | | 2.1512 | (ASP) | 0.161 | | | | |
| 17 | Lens 8 | 2.8292 | (ASP) | 0.805 | Plastic | 1.544 | 56.0 | 40.10 |
| 18 | | 2.9250 | (ASP) | 0.500 | | | | |
| 19 | Filter | Plano | | 0.210 | Glass | 1.517 | 64.2 | — |
| 20 | | Plano | | 0.367 | | | | |
| 21 | Image | Plano | | — | | | | |

Note:
Reference wavelength is 587.6 nm (d-line).
An effective radius of the stop S1 (Surface 6) is 1.590 mm.

TABLE 16

Aspheric Coefficients

| Surface # | 2 | 3 | 4 | 5 |
|---|---|---|---|---|
| k = | −7.69826E−01 | −6.23873E+01 | 2.14205E+01 | 4.68000E+00 |
| A4 = | 5.78428E−03 | −6.68837E−03 | −1.82011E−02 | −1.16058E−02 |
| A6 = | 8.39328E−04 | 4.79566E−03 | 1.19994E−02 | 7.02300E−03 |
| A8 = | −1.65747E−04 | −1.66609E−03 | −3.74322E−03 | 1.11837E−03 |
| A10 = | 1.74522E−04 | 3.41445E−04 | 5.48602E−04 | −3.69655E−03 |
| A12 = | −7.68800E−05 | −4.84816E−05 | 9.37324E−05 | 2.48974E−03 |
| A14 = | 1.90421E−05 | 3.73786E−06 | −4.34954E−05 | −7.72298E−04 |
| A16 = | −2.21399E−06 | — | 5.95080E−06 | 1.01784E−04 |

| Surface # | 7 | 8 | 9 | 10 |
|---|---|---|---|---|
| k = | 9.90000E+01 | −1.00000E+00 | 9.90000E+01 | 3.28634E+01 |
| A4 = | −1.71556E−02 | −1.21675E−02 | −9.76103E−03 | −2.15045E−02 |
| A6 = | −4.28787E−03 | −5.64321E−03 | 5.41803E−03 | 1.98459E−02 |
| A8 = | 6.62731E−05 | 4.69636E−04 | −1.70058E−02 | −3.14978E−02 |
| A10 = | 1.90646E−04 | −1.73889E−04 | 2.13431E−02 | 2.88197E−02 |
| A12 = | −5.74472E−04 | −2.48432E−04 | −1.73961E−02 | −1.62145E−02 |
| A14 = | 3.86572E−04 | 3.55669E−04 | 8.78029E−03 | 5.65024E−03 |
| A16 = | −6.32099E−05 | −8.22233E−05 | −2.57260E−03 | −1.18339E−03 |
| A18 = | — | 4.53418E−06 | 4.04825E−04 | 1.35837E−04 |
| A20 = | — | — | −2.65735E−05 | −6.50949E−06 |

| Surface # | 11 | 12 | 13 | 14 |
|---|---|---|---|---|
| k = | −3.52455E+00 | −1.00000E+00 | −9.90000E+01 | −7.19803E+01 |
| A4 = | −4.71293E−04 | 1.95033E−02 | 2.22462E−02 | 1.49603E−02 |
| A6 = | −5.52776E−03 | −1.54964E−02 | −1.43300E−02 | −7.91367E−03 |
| A8 = | −1.71407E−03 | 4.65441E−03 | −1.45952E−03 | −2.57702E−03 |
| A10 = | 1.77101E−03 | −1.96505E−03 | 1.99893E−03 | 2.06747E−03 |
| A12 = | −8.68301E−04 | 8.22179E−04 | −5.45223E−04 | −5.23482E−04 |
| A14 = | 2.52552E−04 | −2.49092E−04 | 7.96984E−05 | 6.93016E−05 |
| A16 = | −4.55509E−05 | 4.84212E−05 | −7.33634E−06 | −5.14684E−06 |
| A18 = | 4.62783E−06 | −5.57706E−06 | 4.54008E−07 | 2.03814E−07 |
| A20 = | −1.94189E−07 | 3.44281E−07 | −1.80479E−08 | −3.41258E−09 |
| A22 = | — | −8.76989E−09 | 3.43445E−10 | 3.28655E−12 |

| Surface # | 15 | 16 | 17 | 18 |
|---|---|---|---|---|
| k = | −5.04493E+01 | −1.80132E+01 | −2.27850E+01 | −7.80535E−01 |
| A4 = | −4.70851E−02 | −3.05266E−02 | −2.73304E−02 | −4.60448E−02 |
| A6 = | 2.24411E−02 | 2.13296E−02 | 1.01305E−02 | 9.81482E−03 |
| A8 = | −8.75002E−03 | −7.83613E−03 | −1.75476E−03 | −1.87980E−03 |
| A10 = | 2.12110E−03 | 1.76651E−03 | 1.39773E−04 | 2.69283E−04 |
| A12 = | −3.23997E−04 | −2.62939E−04 | 3.44480E−06 | −2.69271E−05 |
| A14 = | 3.24381E−05 | 2.62607E−05 | −2.22032E−06 | 1.87750E−06 |
| A16 = | −2.16046E−06 | −1.75711E−06 | 2.67287E−07 | −9.44589E−08 |
| A18 = | 9.46722E−08 | 7.72897E−08 | −1.76950E−08 | 3.56180E−09 |
| A20 = | −2.61767E−09 | −2.13232E−09 | 7.17582E−10 | −1.01374E−10 |
| A22 = | 4.14298E−11 | 3.32265E−11 | −1.77578E−11 | 2.06057E−12 |
| A24 = | −2.87945E−13 | −2.21031E−13 | 2.46924E−13 | −2.60761E−14 |
| A26 = | — | — | −1.48219E−15 | 1.50569E−16 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.80 | f/f7 | −1.27 |
| Fno | 1.80 | f/f8 | 0.17 |
| HFOV [deg.] | 38.5 | f1/f8 | 0.14 |
| Nmax | 1.700 | \|f/f\|max | 1.27 |
| Vmin | 17.0 | CTmax/ImgH | 0.19 |
| V2 + V3 | 37.4 | ATmax/ImgH | 0.11 |
| V5 | 37.4 | f/ImgH | 1.20 |
| V5/V8 | 0.67 | f/EPD | 1.80 |
| (CT1 + CT8)/CT7 | 3.87 | SD/TD | 0.89 |
| R9/f | 1.13 | ImgH/BL | 5.24 |
| f/R11 | −1.21 | Y11/Y82 | 0.38 |
| R16/f | 0.43 | Yc72/Yc82 | 0.99 |
| (R7 + R8)/(R7 − R8) | 5.01 | TL [mm] | 8.05 |
| (R9 − R10)/(R9 + R10) | −0.52 | TL/f | 1.18 |
| (R14 − R15)/(R14 + R15) | −0.14 | TL/ImgH | 1.43 |
| (R15 − R16)/(R15 + R16) | −0.02 | ImgH [mm] | 5.64 |
| f/R14 + f/R16 | 5.48 | — | — |

9th Embodiment

Figure 17:
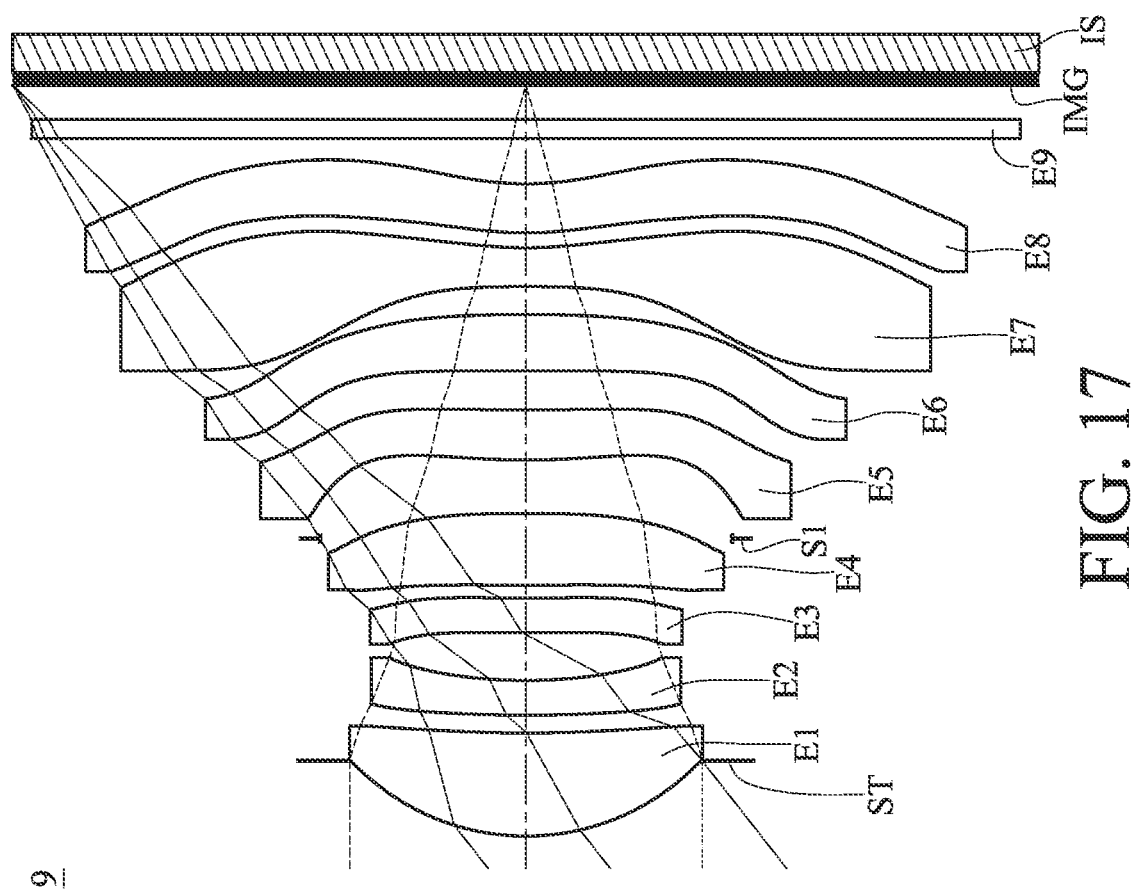
FIG. 17 is a schematic view of an image capturing unit according to the 9th embodiment of the present disclosure.
Figure 18:
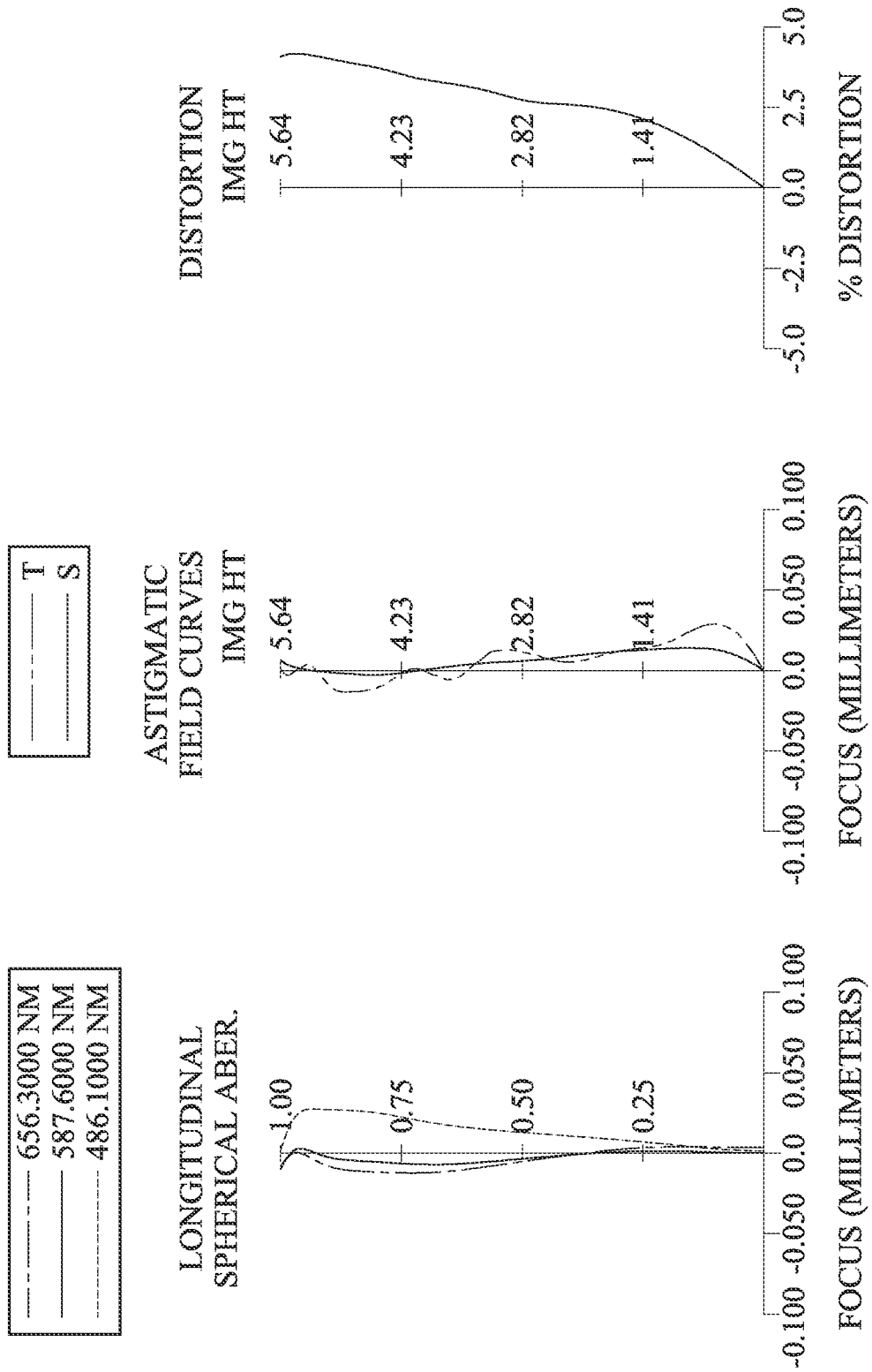
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the photographing lens system (its reference numeral is omitted) of the present disclosure and an image sensor IS. The photographing lens system includes, in order from an object side to an image side along an optical axis, an aperture stop ST, a first lens element E1, a second lens element E2, a third lens element E3, a fourth lens element E4, a stop S1, a fifth lens element E5, a sixth lens element E6, a seventh lens element E7, an eighth lens element E8, a filter E9 and an image surface IMG. The photographing lens system includes eight lens elements (E1, E2, E3, E4, E5, E6, E7 and E8) with no additional lens element disposed between each of the adjacent eight lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has at least one convex shape in an off-axis region thereof. The image-side surface of the seventh lens element E7 has at least one critical point in the off-axis region thereof.

The eighth lens element E8 with negative refractive power has an object-side surface being convex in a paraxial region thereof and an image-side surface being concave in a paraxial region thereof. The eighth lens element E8 is made of plastic material and has the object-side surface and the image-side surface being both aspheric. The image-side surface of the eighth lens element E8 has at least one inflection point. The image-side surface of the eighth lens element E8 has at least one critical point in an off-axis region thereof.

The filter E9 is made of glass material and located between the eighth lens element E8 and the image surface IMG, and will not affect the focal length of the photographing lens system. The image sensor IS is disposed on or near the image surface IMG of the photographing lens system.

The detailed optical data of the 9th embodiment are shown in Table 17 and the aspheric surface data are shown in Table 18 below.

TABLE 17

9th Embodiment
f = 6.93 mm, Fno = 1.78, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.830 | | | | |
| 2 | Lens 1 | 2.6521 | (ASP) | 1.136 | Plastic | 1.545 | 56.1 | 5.83 |
| 3 | | 13.6249 | (ASP) | 0.196 | | | | |
| 4 | Lens 2 | 12.3705 | (ASP) | 0.383 | Plastic | 1.715 | 15.0 | −13.81 |
| 5 | | 5.4202 | (ASP) | 0.530 | | | | |
| 6 | Lens 3 | 58.6885 | (ASP) | 0.379 | Plastic | 1.671 | 37.7 | −55.19 |
| 7 | | 22.6578 | (ASP) | 0.142 | | | | |
| 8 | Lens 4 | 32.9628 | (ASP) | 0.792 | Plastic | 1.544 | 56.0 | 23.45 |
| 9 | | −20.6356 | (ASP) | −0.279 | | | | |
| 10 | Stop | Plano | | 0.866 | | | | |
| 11 | Lens 5 | 7.6814 | (ASP) | 0.554 | Plastic | 1.560 | 47.6 | 17.26 |
| 12 | | 36.3689 | (ASP) | 0.430 | | | | |
| 13 | Lens 6 | 182.8154 | (ASP) | 0.622 | Plastic | 1.634 | 23.8 | 23.97 |
| 14 | | −16.5527 | (ASP) | 0.307 | | | | |
| 15 | Lens 7 | −20.6979 | (ASP) | 0.427 | Plastic | 1.577 | 41.9 | −5.84 |
| 16 | | 4.0568 | (ASP) | 0.164 | | | | |
| 17 | Lens 8 | 3.5128 | (ASP) | 0.541 | Plastic | 1.530 | 55.8 | −324.35 |
| 18 | | 3.2587 | (ASP) | 0.500 | | | | |
| 19 | Filter | Plano | | 0.210 | Glass | 1.517 | 64.2 | — |

TABLE 17-continued

9th Embodiment
f = 6.93 mm, Fno = 1.78, HFOV = 38.0 deg.

| Surface # | | Curvature Radius | Thickness | Material | Index | Abbe # | Focal Length |
|---|---|---|---|---|---|---|---|
| 20 | | Plano | 0.377 | | | | |
| 21 | Image | Plano | — | | | | |

Note:
Reference wavelength is 587.6 nm (d-line).
An effective radius of the stop S1 (Surface 10) is 2.270 mm.

TABLE 18

| Aspheric Coefficients | | | | |
|---|---|---|---|---|
| Surface # | 2 | 3 | 4 | 5 |
| k = | −8.32662E−01 | −6.63456E+01 | 2.02927E+01 | 5.29305E+00 |
| A4 = | 5.71907E−03 | −5.49545E−03 | −1.52470E−02 | −9.81959E−03 |
| A6 = | 8.43107E−04 | 2.95509E−03 | 7.73578E−03 | 6.62330E−03 |
| A8 = | −3.00067E−04 | −7.16320E−04 | −4.51547E−04 | 2.19339E−04 |
| A10 = | 2.48190E−04 | 2.27912E−05 | −1.19015E−03 | −2.02291E−03 |
| A12 = | −1.02328E−04 | 1.83167E−05 | 6.89033E−04 | 1.38700E−03 |
| A14 = | 2.25147E−05 | −3.00520E−06 | −1.59223E−04 | −4.30286E−04 |
| A16 = | −2.27562E−06 | — | 1.47673E−05 | 5.95842E−05 |
| Surface # | 6 | 7 | 8 | 9 |
| k = | 9.12304E+01 | 2.88341E+01 | 9.89858E+01 | 7.52272E+01 |
| A4 = | −2.53816E−02 | −3.35698E−02 | −2.74158E−02 | −2.70329E−02 |
| A6 = | 5.30962E−03 | 1.75410E−02 | 2.02003E−02 | 1.08435E−02 |
| A8 = | −9.80533E−03 | −1.92001E−02 | −1.63241E−02 | −7.35165E−03 |
| A10 = | 7.08388E−03 | 1.24535E−02 | 9.63588E−03 | 4.41754E−03 |
| A12 = | −3.35279E−03 | −5.51842E−03 | −4.41696E−03 | −1.86005E−03 |
| A14 = | 9.23881E−04 | 1.64477E−03 | 1.50951E−03 | 5.02161E−04 |
| A16 = | −1.01160E−04 | −2.69626E−04 | −3.30154E−04 | −8.27867E−05 |
| A18 = | — | 1.79861E−05 | 3.98276E−05 | 7.53475E−06 |
| A20 = | — | — | −2.00345E−06 | −2.77095E−07 |
| Surface # | 11 | 12 | 13 | 14 |
| k = | −5.17269E+01 | −1.48435E+01 | −7.34709E+01 | −9.90000E+01 |
| A4 = | −1.19824E−02 | −1.56568E−02 | −1.30744E−02 | −6.73180E−03 |
| A6 = | 1.00702E−02 | 2.12515E−02 | 1.31450E−02 | −1.37350E−03 |
| A8 = | −1.39871E−02 | −2.01797E−02 | −1.12417E−02 | −1.47731E−03 |
| A10 = | 8.36689E−03 | 9.95499E−03 | 4.93364E−03 | 1.32910E−03 |
| A12 = | −3.20885E−03 | −3.18048E−03 | −1.32202E−03 | −4.27552E−04 |
| A14 = | 7.93824E−04 | 6.76753E−04 | 2.22504E−04 | 7.32164E−05 |
| A16 = | −1.20959E−04 | −9.35940E−05 | −2.34218E−05 | −7.33227E−06 |
| A18 = | 1.01780E−05 | 8.02647E−06 | 1.49698E−06 | 4.32414E−07 |
| A20 = | −3.56221E−07 | −3.86868E−07 | −5.32335E−08 | −1.39622E−08 |
| A22 = | — | 8.00406E−09 | 8.09710E−10 | 1.90880E−10 |
| Surface # | 15 | 16 | 17 | 18 |
| k = | 1.84654E+01 | −3.81804E+01 | −4.58522E+01 | −7.18374E−01 |
| A4 = | −4.22340E−02 | −1.33512E−02 | 1.82512E−02 | −2.68792E−02 |
| A6 = | 8.21460E−03 | 4.71816E−03 | −2.55380E−02 | −3.80566E−03 |
| A8 = | −1.28375E−03 | −2.65824E−04 | 1.26880E−02 | 2.92520E−03 |
| A10 = | 2.50625E−04 | −2.89454E−04 | −3.50219E−03 | −7.51736E−04 |
| A12 = | −4.11764E−05 | 8.91357E−05 | 6.02081E−04 | 1.14925E−04 |
| A14 = | 4.99966E−06 | −1.26774E−05 | −6.81562E−05 | −1.16101E−05 |
| A16 = | −4.54424E−07 | 1.05538E−06 | 5.21761E−06 | 8.03265E−07 |
| A18 = | 3.00157E−08 | −5.42280E−08 | −2.71758E−07 | −3.83695E−08 |
| A20 = | −1.32781E−09 | 1.69527E−09 | 9.48975E−09 | 1.24749E−09 |
| A22 = | 3.44708E−11 | −2.95993E−11 | −2.12624E−10 | −2.64174E−11 |
| A24 = | −3.92899E−13 | 2.21486E−13 | 2.76273E−12 | 3.29124E−13 |
| A26 = | — | — | −1.58288E−14 | −1.83236E−15 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

9th Embodiment

| | | | |
|---|---|---|---|
| f [mm] | 6.93 | f/f7 | −1.19 |
| Fno | 1.78 | f/f8 | −0.02 |
| HFOV [deg.] | 38.1 | f1/f8 | −0.02 |
| Nmax | 1.715 | \|f/fi\|max | 1.19 |
| Vmin | 15.0 | CTmax/ImgH | 0.20 |
| V2 + V3 | 52.7 | ATmax/ImgH | 0.10 |
| V5 | 47.6 | f/ImgH | 1.23 |
| V5/V8 | 0.85 | f/EPD | 1.78 |
| (CT1 + CT8)/CT7 | 3.93 | SD/TD | 0.88 |
| R9/f | 1.11 | ImgH/BL | 5.19 |
| f/R11 | 0.04 | Y11/Y82 | 0.40 |
| R16/f | 0.47 | Yc72/Yc82 | 1.04 |
| (R7 + R8)/(R7 − R8) | 0.23 | TL [mm] | 8.28 |
| (R9 − R10)/(R9 + R10) | −0.65 | TL/f | 1.19 |
| (R14 − R15)/(R14 + R15) | 0.07 | TL/ImgH | 1.47 |
| (R15 − R16)/(R15 + R16) | 0.04 | ImgH [mm] | 5.64 |
| f/R14 + f/R16 | 3.84 | — | — |

10th Embodiment

Figure 19:
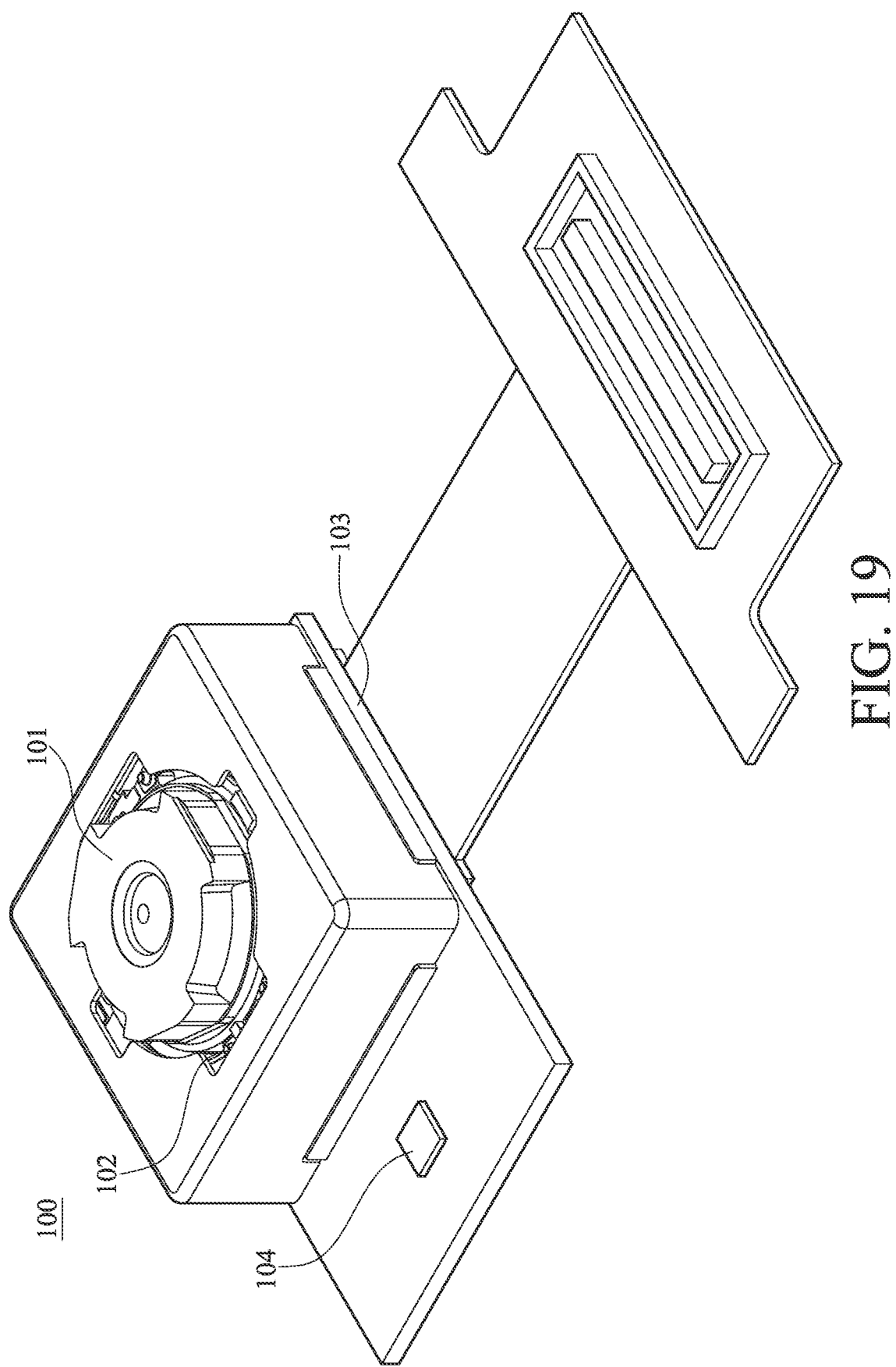
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 100 is a camera module including a lens unit 101, a driving device 102, an image sensor 103 and an image stabilizer 104. The lens unit 101 includes the photographing lens system disclosed in the 1st embodiment, a barrel and a holder member (their reference numerals are omitted) for holding the photographing lens system. However, the lens unit 101 may alternatively be provided with the photographing lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the photographing lens system to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

11th Embodiment

Figure 20:
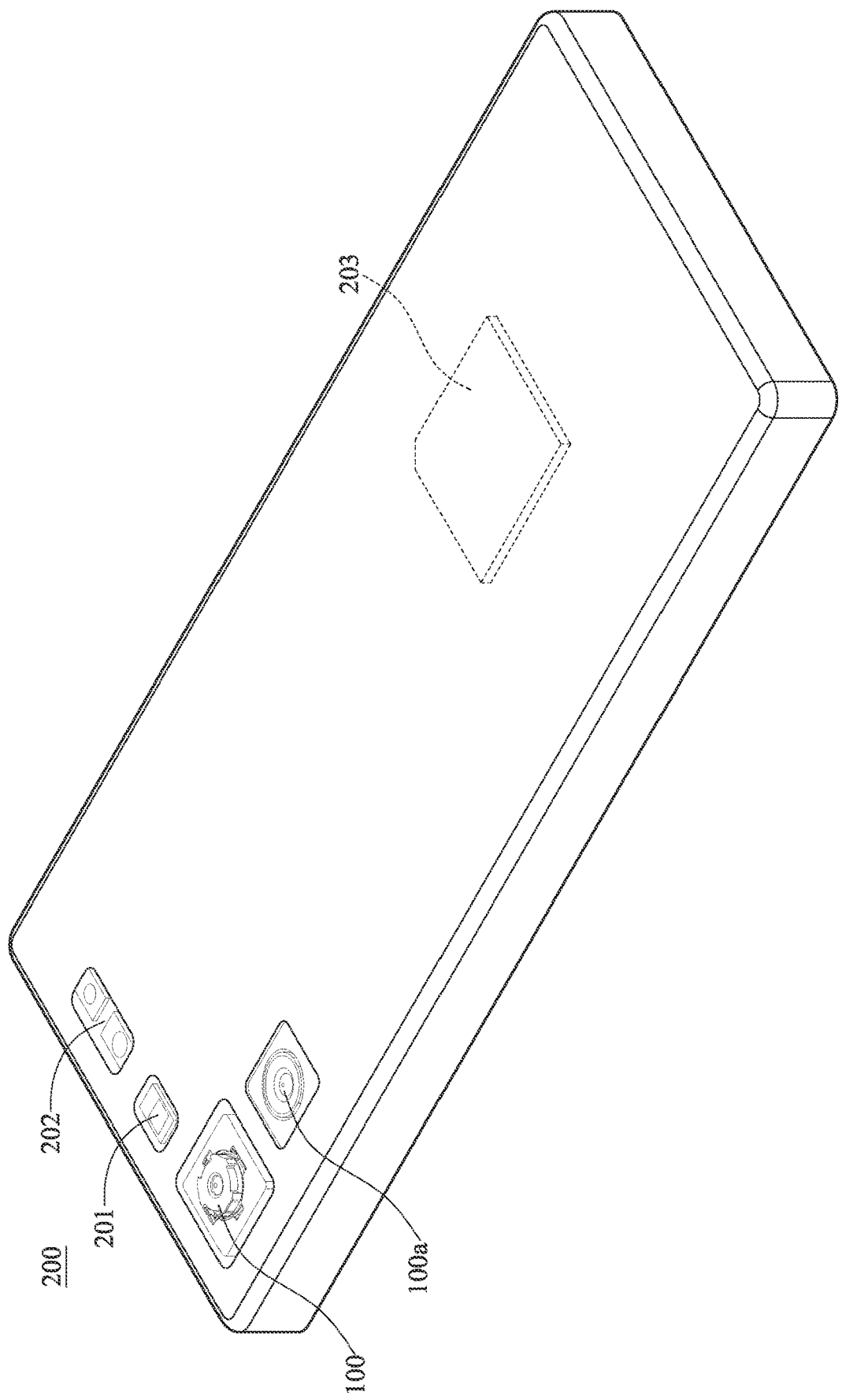
FIG. 20 is one perspective view of an electronic device according to the 11th embodiment of the present disclosure.
Figure 21:
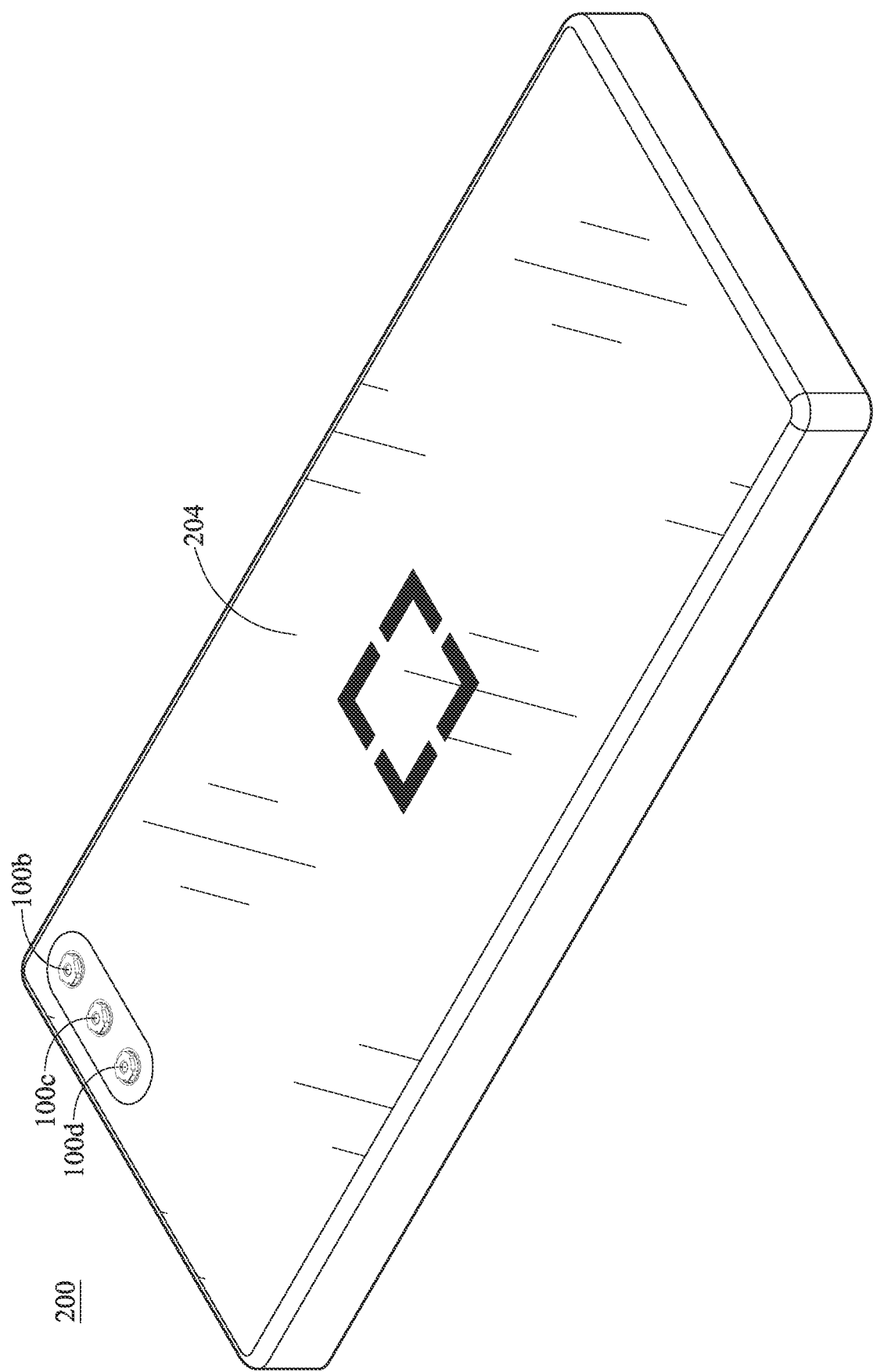
FIG. 21 is another perspective view of the electronic device in FIG. 20.
Figure 22:
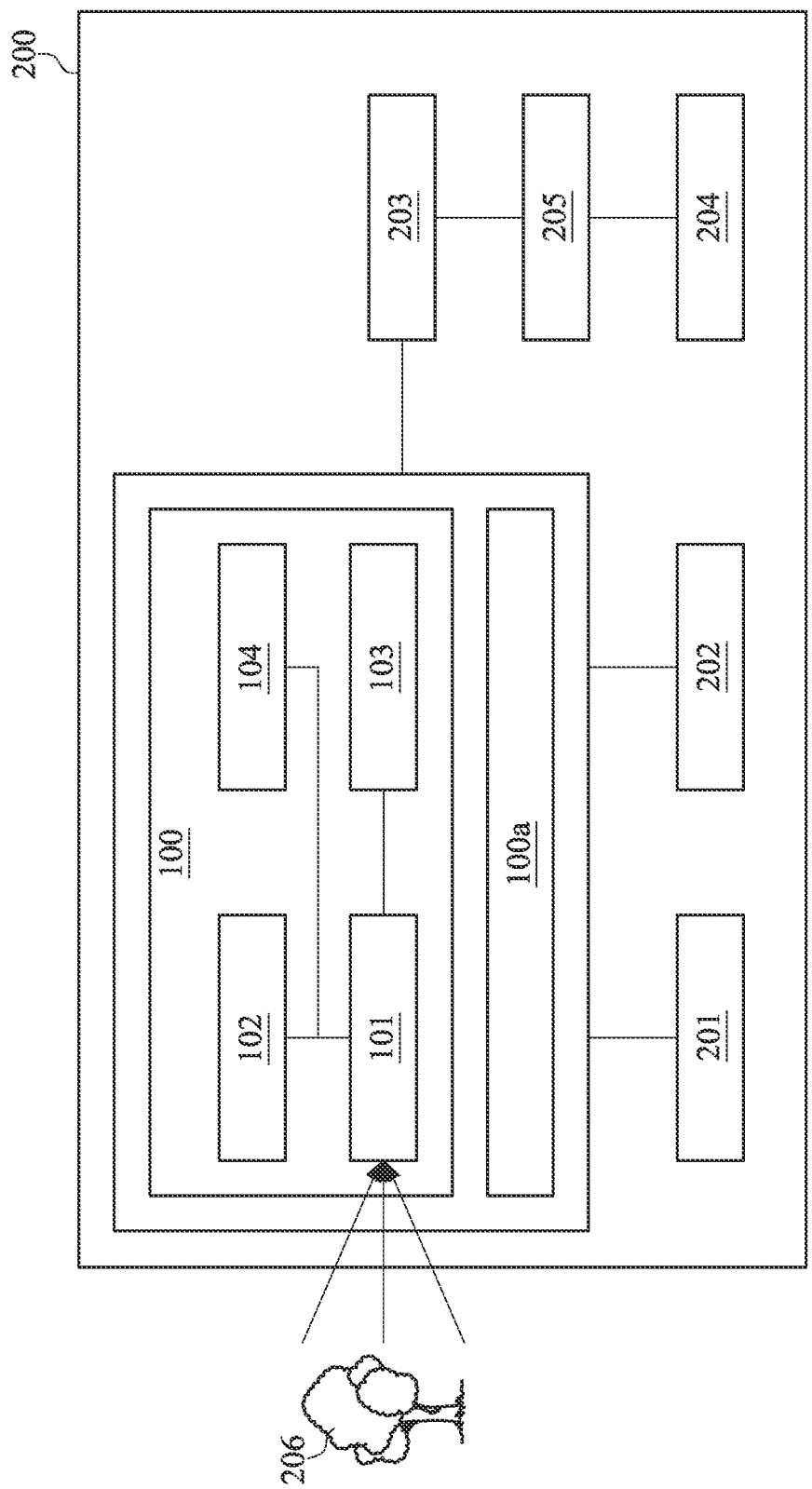
FIG. 22 is a block diagram of the electronic device in FIG. 20.

FIG. 20 is one perspective view of an electronic device according to the 11th embodiment of the present disclosure. FIG. 21 is another perspective view of the electronic device in FIG. 20. FIG. 22 is a block diagram of the electronic device in FIG. 20.

In this embodiment, an electronic device 200 is a smartphone including the image capturing unit 100 disclosed in the 10th embodiment, an image capturing unit 100a, an image capturing unit 100b, an image capturing unit 100c, an image capturing unit 100d, a flash module 201, a focus assist module 202, an image signal processor 203, a display module 204 and an image software processor 205. The image capturing unit 100 and the image capturing unit 100a are disposed on the same side of the electronic device 200. The focus assist module 202 can be a laser rangefinder or a ToF (time of flight) module, but the present disclosure is not limited thereto. The image capturing unit 100b, the image capturing unit 100c, the image capturing unit 100d and the display module 204 are disposed on the opposite side of the electronic device 200, and the display module 204 can be a user interface, such that the image capturing units 100b, 100c, 100d can be front-facing cameras of the electronic device 200 for taking selfies, but the present disclosure is not limited thereto. Furthermore, each of the image capturing units 100a, 100b, 100c and 100d can include the photographing lens system of the present disclosure and can have a configuration similar to that of the image capturing unit 100. In detail, each of the image capturing units 100a, 100b, 100c and 100d can include a lens unit, a driving device, an image sensor and an image stabilizer, and each of the lens unit can include an optical lens assembly such as the photographing lens system of the present disclosure, a barrel and a holder member for holding the optical lens assembly.

The image capturing unit 100 is a wide-angle image capturing unit, the image capturing unit 100a is an ultra-wide-angle image capturing unit, the image capturing unit 100b is a wide-angle image capturing unit, the image capturing unit 100c is an ultra-wide-angle image capturing unit, and the image capturing unit 100d is a ToF image capturing unit. In this embodiment, the image capturing units 100, 100a, 100b and 100c have different fields of view, such that the electronic device 200 can have various magnification ratios so as to meet the requirement of optical zoom functionality. Moreover, a maximum field of view of the image capturing unit 100 and a maximum field of view of the image capturing unit 100a can differ by at least 30 degrees. Therefore, it is favorable for meeting various usage scenarios while maintaining good image quality. In addition, the image capturing unit 100d can determine depth information of the imaged object. In this embodiment, the electronic device 200 includes multiple image capturing units 100, 100a, 100b, 100c and 100d, but the present disclosure is not limited to the number and arrangement of image capturing units.

When a user captures images of an object 206, the light rays converge in the image capturing unit 100 or the image capturing unit 100a to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100b, 100c or 100d to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

12th Embodiment

Figure 23:
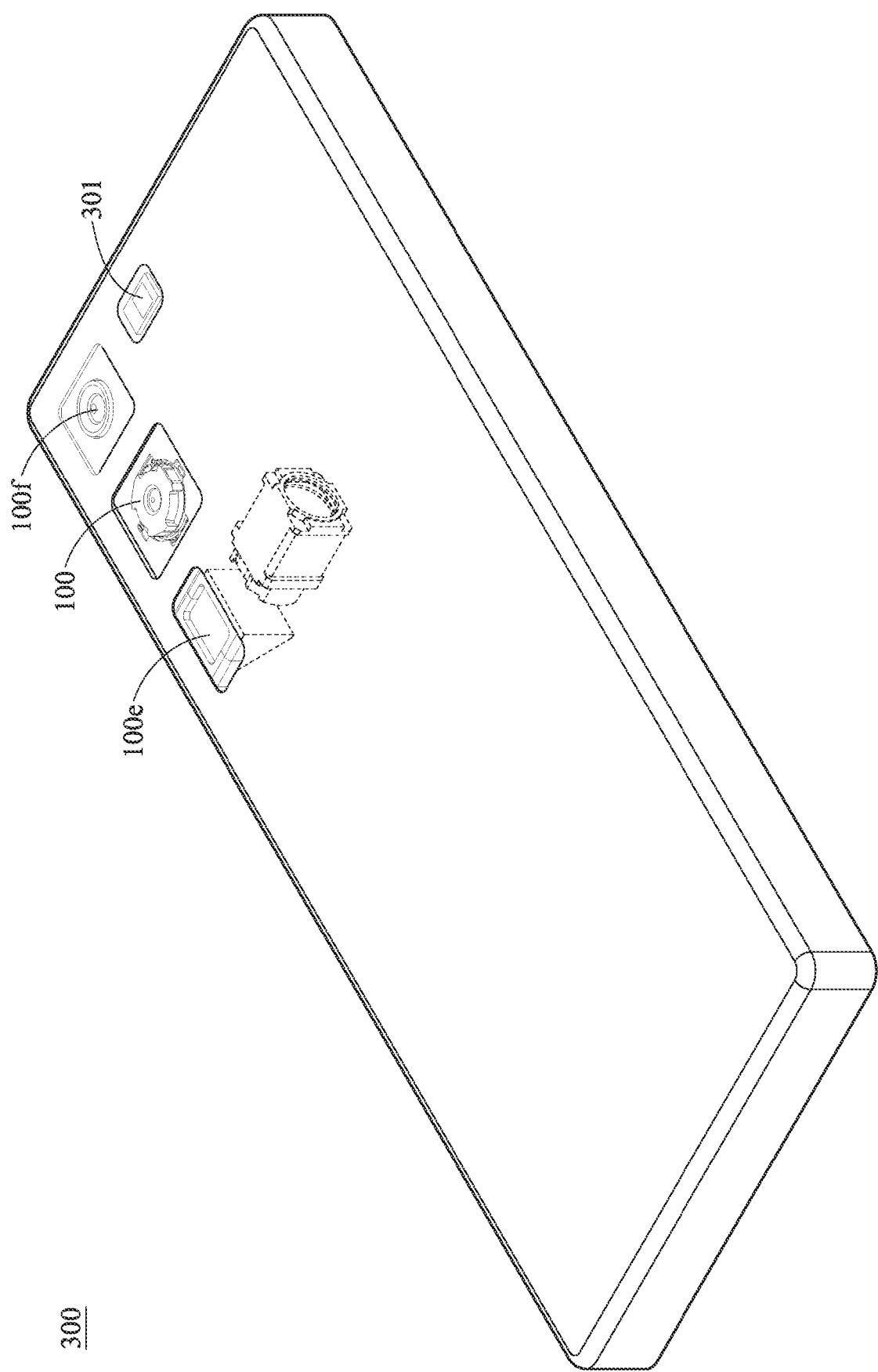
FIG. 23 is one perspective view of an electronic device according to the 12th embodiment of the present disclosure.

FIG. 23 is one perspective view of an electronic device according to the 12th embodiment of the present disclosure.

In this embodiment, an electronic device 300 is a smartphone including the image capturing unit 100 disclosed in the 10th embodiment, an image capturing unit 100e, an image capturing unit 100f, a flash module 301, a focus assist module, an image signal processor, a display module and an image software processor (not shown). The image capturing unit 100, the image capturing unit 100e and the image capturing unit 100f are disposed on the same side of the electronic device 300, while the display module is disposed on the opposite side of the electronic device 300. Furthermore, each of the image capturing units 100e and 100f can include the photographing lens system of the present disclosure and can have a configuration similar to that of the image capturing unit 100, and the details in this regard will not be provided again.

The image capturing unit 100 is a wide-angle image capturing unit, the image capturing unit 100e is a telephoto image capturing unit, and the image capturing unit 100f is an ultra-wide-angle image capturing unit. In this embodiment, the image capturing units 100, 100e and 100f have different fields of view, such that the electronic device 300 can have various magnification ratios so as to meet the requirement of optical zoom functionality. Moreover, the image capturing unit 100e can be a telephoto image capturing unit having a light-folding element configuration, such that the total track length of the image capturing unit 100e is not limited by the thickness of the electronic device 300. Moreover, the light-folding element configuration of the image capturing unit 100e can be similar to, for example, one of the structures shown in FIG. 26 to FIG. 28, which can be referred to foregoing descriptions corresponding to FIG. 26 to FIG. 28, and the details in this regard will not be provided again. In this embodiment, the electronic device 30 includes multiple image capturing units 100, 100e and 100f, but the present disclosure is not limited to the number and arrangement of image capturing units. When a user captures images of an object, light rays converge in the image capturing unit 100, 100e or 100f to generate images, and the flash module 301 is activated for light supplement. Further, the subsequent processes are performed in a manner similar to the abovementioned embodiment, so the details in this regard will not be provided again.

13th Embodiment

Figure 24:
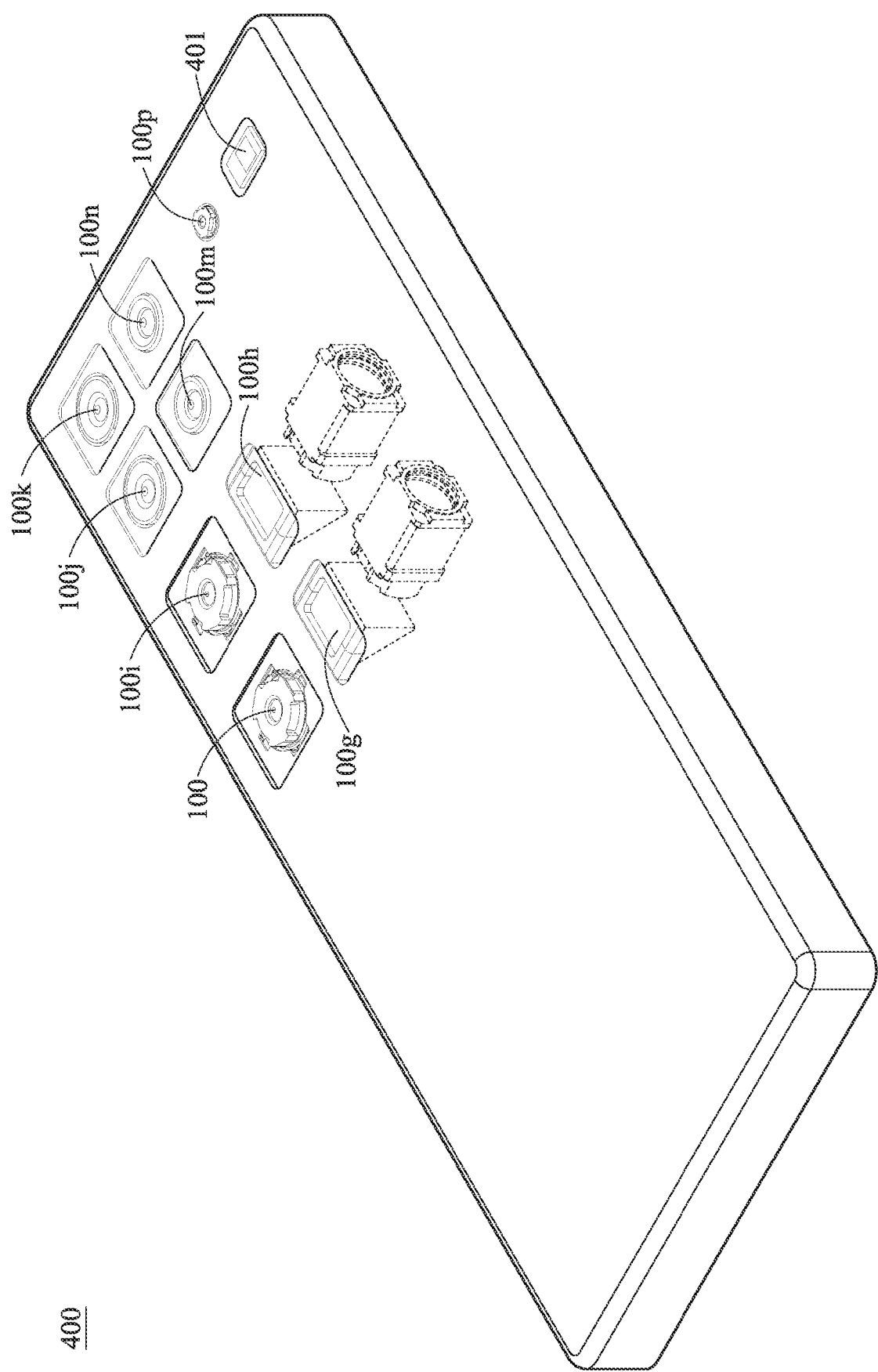
FIG. 24 is one perspective view of an electronic device according to the 13th embodiment of the present disclosure.

FIG. 24 is one perspective view of an electronic device according to the 13th embodiment of the present disclosure.

In this embodiment, an electronic device 400 is a smartphone including the image capturing unit 100 disclosed in the 10th embodiment, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 401, a focus assist module, an image signal processor, a display module and an image software processor (not shown). The image capturing units 100, 100g, 100h, 100i, 100j, 100k, 100m, 100n and 100p are disposed on the same side of the electronic device 400, while the display module is disposed on the opposite side of the electronic device 400. Furthermore, each of the image capturing units 100g, 100h, 100i, 100j, 100k, 100m, 100n and 100p can include the photographing lens system of the present disclosure and can have a configuration similar to that of the image capturing unit 100, and the details in this regard will not be provided again.

The image capturing unit 100 is a wide-angle image capturing unit, the image capturing unit 100g is a telephoto image capturing unit, the image capturing unit 100h is a telephoto image capturing unit, the image capturing unit 100i is a wide-angle image capturing unit, the image capturing unit 100j is an ultra-wide-angle image capturing unit, the image capturing unit 100k is an ultra-wide-angle image capturing unit, the image capturing unit 100m is a telephoto image capturing unit, the image capturing unit 100n is a telephoto image capturing unit, and the image capturing unit 100p is a ToF image capturing unit. In this embodiment, the image capturing units 100, 100g, 100h, 100i, 100j, 100k, 100m and 100n have different fields of view, such that the electronic device 400 can have various magnification ratios so as to meet the requirement of optical zoom functionality. Moreover, each of the image capturing units 100g and 100h can be a telephoto image capturing unit having a light-folding element configuration. Moreover, the light-folding element configuration of each of the image capturing unit 100g and 100h can be similar to, for example, one of the structures shown in FIG. 26 to FIG. 28, which can be referred to foregoing descriptions corresponding to FIG. 26 to FIG. 28, and the details in this regard will not be provided again. In addition, the image capturing unit 100p can determine depth information of the imaged object. In this embodiment, the electronic device 400 includes multiple image capturing units 100, 100g, 100h, 100i, 100j, 100k, 100m, 100n and 100p, but the present disclosure is not limited to the number and arrangement of image capturing units. When a user captures images of an object, the light rays converge in the image capturing unit 100, 100g, 100h, 100i, 100j, 100k, 100m, 100n or 100p to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the photographing lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein the first lens element has positive refractive power, the second lens element has negative refractive power, the seventh lens element has negative refractive power, the image-side surface of the eighth lens element is concave in a paraxial region thereof, and the image-side surface of the eighth lens element has at least one inflection point;

wherein a focal length of the photographing lens system is f, a focal length of the seventh lens element is f7, a focal length of the eighth lens element is f8, an axial distance between the object-side surface of the first lens element and an image surface is TL, a maximum image height of the photographing lens system is ImgH, a curvature radius of the object-side surface of the sixth lens element is R11, an entrance pupil diameter of the photographing lens system is EPD, and the following conditions are satisfied:

$-0.30 < f/f8 < 5.0;$ $-2.30 < f/f7 < -0.42;$ $0.50 < TL/ImgH < 1.70;$ $-3.0 < f/R11 < 0.25;$ and $0.80 < f/EPD < 2.0.$ 2. The photographing lens system of claim 1, wherein the object-side surface of the first lens element is convex in a paraxial region thereof, the image-side surface of the first lens element is concave in a paraxial region thereof, the object-side surface of the second lens element is convex in a paraxial region thereof, and the image-side surface of the second lens element is concave in a paraxial region thereof.

3. The photographing lens system of claim 1, wherein the image-side surface of the seventh lens element is concave in a paraxial region thereof, the image-side surface of the seventh lens element has at least one convex shape in an off-axis region thereof, and the image-side surface of the eighth lens element has at least one critical point in an off-axis region thereof.

4. The photographing lens system of claim 1, wherein a minimum value among Abbe numbers of all lens elements of the photographing lens system is Vmin, a maximum value among refractive indices of all lens elements of the photographing lens system is Nmax, and the following conditions are satisfied:

$5.0 < V\mathrm{min} < 21.0;$ and $1.50 < N\mathrm{max} < 1.80.$

5. The photographing lens system of claim 1, wherein the focal length of the photographing lens system is f, the maximum image height of the photographing lens system is ImgH, and the following condition is satisfied:

$0.50 < f/ImgH < 1.50.$

6. The photographing lens system of claim 1, wherein a curvature radius of the object-side surface of the fifth lens element is R9, a curvature radius of the image-side surface of the fifth lens element is R10, and the following condition is satisfied:

$-2.0 < (R9-R10)/(R9+R10) < 0.$

7. The photographing lens system of claim 1, wherein a curvature radius of the image-side surface of the seventh lens element is R14, a curvature radius of the object-side surface of the eighth lens element is R15, and the following condition is satisfied:

$-0.50 < (R14-R15)/(R14+R15) < 0.40.$

8. The photographing lens system of claim 1, wherein a maximum effective radius of the object-side surface of the first lens element is Y11, a maximum effective radius of the image-side surface of the eighth lens element is Y82, and the following condition is satisfied:

$0.10 < Y11/Y82 < 0.55.$

9. The photographing lens system of claim 1, wherein the image-side surface of the eighth lens element has at least one critical point in an off-axis region thereof;

wherein the focal length of the photographing lens system is f, the axial distance between the object-side surface of the first lens element and the image surface is TL, and the following condition is satisfied:

$0.90 < TL/f < 1.30.$

10. The photographing lens system of claim 1, wherein an Abbe number of the fifth lens element is V5, and the following condition is satisfied:

$10.0 < V5 < 50.0.$

11. The photographing lens system of claim 1, wherein a focal length of the first lens element is f1, the focal length of the eighth lens element is f8, and the following condition is satisfied:

$-0.05 < f1/f8 < 0.55.$

12. The photographing lens system of claim 1, wherein a curvature radius of the object-side surface of the eighth lens element is R15, a curvature radius of the image-side surface of the eighth lens element is R16, and the following condition is satisfied:

$-0.30 < (R15-R16)/(R15+R16) < 0.50.$

13. The photographing lens system of claim 1, wherein the focal length of the photographing lens system is f, a curvature radius of the image-side surface of the seventh lens element is R14, a curvature radius of the image-side surface of the eighth lens element is R16, and the following condition is satisfied:

$2.7 < f/R14 + f/R16 < 9.0.$

14. An image capturing unit, comprising:
the photographing lens system of claim 1; and
an image sensor disposed on the image surface of the photographing lens system.

15. An electronic device, comprising at least two image capturing units which face a same side, wherein the at least two image capturing units comprise:
a first image capturing unit, comprising the photographing lens system of claim 1 and an image sensor that is disposed on the image surface of the photographing lens system; and a second image capturing unit, comprising an optical lens assembly and an image sensor that is disposed on an image surface of the optical lens assembly;

wherein a maximum field of view of the first image capturing unit and a maximum field of view of the second image capturing unit differ by at least 30 degrees.

16. A photographing lens system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein the first lens element has positive refractive power, the second lens element has negative refractive power, the object-side surface of the second lens element is convex in a paraxial region thereof, the object-side surface of the fifth lens element is convex in a paraxial region thereof, the seventh lens element has negative refractive power, the eighth lens element has positive refractive power, the object-side surface of the eighth lens element is convex in a paraxial region thereof, the image-side surface of the eighth lens element is concave in a paraxial region thereof, and the image-side surface of the eighth lens element has at least one inflection point;

wherein a focal length of the photographing lens system is f, a focal length of the seventh lens element is f7, a focal length of the eighth lens element is f8, a curvature radius of the object-side surface of the fifth lens element is R9, a central thickness of the first lens element is CT1, a central thickness of the seventh lens element is CT7, a central thickness of the eighth lens element is CT8, and the following conditions are satisfied:

$0 < f/f8 < 5.0;$ $-5.0 < f/f7 < 0;$ $0.35 < R9/f < 2.0;$ and $1.50 < (CT1+CT8)/CT7 < 5.0.$ 17. The photographing lens system of claim 16, wherein the image-side surface of the second lens element is concave in a paraxial region thereof, the object-side surface of the third lens element is convex in a paraxial region thereof, the image-side surface of the third lens element is concave in a paraxial region thereof, and at least four lens elements of the photographing lens system are made of plastic material.

18. The photographing lens system of claim 16, wherein the fifth lens element has positive refractive power, the image-side surface of the seventh lens element is concave in a paraxial region thereof, and the image-side surface of the seventh lens element has at least one convex shape in an off-axis region thereof;

wherein a maximum value among refractive indices of all lens elements of the photographing lens system is Nmax, and the following condition is satisfied:

$1.60 < N\text{max} < 1.75.$

19. The photographing lens system of claim 16, wherein the focal length of the photographing lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, the focal length of the seventh lens element is f7, the focal length of the eighth lens element is f8, a focal length of the i-th lens element is fi, a maximum value of |f/fi| is |f/fi|max, and the following condition is satisfied:

$|f/fi|\text{max} < 1.90,$ wherein $i=1,2,3,4,5,6,7$ or $8$.

20. The photographing lens system of claim 16, wherein an Abbe number of the second lens element is V2, an Abbe number of the third lens element is V3, and the following condition is satisfied:

$10.0 < V2+V3 < 76.0.$

21. The photographing lens system of claim 16, wherein a curvature radius of the image-side surface of the eighth lens element is R16, the focal length of the photographing lens system is f, a maximum image height of the photographing lens system is ImgH, an axial distance between the image-side surface of the eighth lens element and an image surface is BL, and the following conditions are satisfied:

$0 < R16/f < 0.50;$ and $3.50 < ImgH/BL < 10.0.$

22. The photographing lens system of claim 16, wherein a curvature radius of the object-side surface of the fourth lens element is R7, a curvature radius of the image-side surface of the fourth lens element is R8, an axial distance between the object-side surface of the first lens element and an image surface is TL, a maximum image height of the photographing lens system is ImgH, and the following conditions are satisfied:

$-0.80 < (R7+R8)/(R7-R8) < 10.0;$ and $0.50 < TL/ImgH < 1.70.$

23. The photographing lens system of claim 16, wherein a maximum value among central thicknesses of all lens elements of the photographing lens system is CTmax, a maximum image height of the photographing lens system is ImgH, and the following condition is satisfied:

$0.05 < CT\text{max}/ImgH < 0.50.$

24. The photographing lens system of claim 16, wherein a maximum value among axial distances between each of all adjacent lens elements of the photographing lens system is ATmax, a maximum image height of the photographing lens system is ImgH, and the following condition is satisfied:

$0.01 < AT\text{max}/ImgH < 0.30.$

25. The photographing lens system of claim 16, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the i-th lens element is Vi, and at least four lens elements of the photographing lens system satisfy the following condition:

$Vi < 50.0,$ wherein $i=1,2,3,4,5,6,7$ or $8$;

wherein half of a maximum field of view of the photographing lens system is HFOV, and the following condition is satisfied:

$30.0[\text{deg.}] < HFOV < 80.0[\text{deg.}].$

26. The photographing lens system of claim 16, further comprising an aperture stop, wherein an axial distance between the aperture stop and the image-side surface of the eighth lens element is SD, an axial distance between the object-side surface of the first lens element and the image-side surface of the eighth lens element is TD, a maximum image height of the photographing lens system is ImgH, an axial distance between the object-side surface of the first lens element and an image surface is TL, and the following conditions are satisfied:

$0.60 < SD/TD < 1.10$;

$5.0 \text{ [mm]} < ImgH < 10.0 \text{ [mm]}$; and $4.0 \text{ [mm]} < TL < 15.0 \text{ [mm]}$.

27. The photographing lens system of claim 16, wherein a vertical distance between a critical point on the image-side surface of the seventh lens element and an optical axis is Yc72, a vertical distance between a critical point on the image-side surface of the eighth lens element and the optical axis is Yc82, and the following condition is satisfied:

$0.30 < Yc72/Yc82 < 5.0$.

28. The photographing lens system of claim 16, wherein an Abbe number of the fifth lens element is V5, an Abbe number of the eighth lens element is V8, and the following condition is satisfied:

$0.20 < V5/V8 \leq 1.20$.

* * * * *